United States Patent
Konishi et al.

(10) Patent No.: US 10,139,648 B2
(45) Date of Patent: Nov. 27, 2018

(54) LENS BARREL

(71) Applicant: Panasonic Intellectual Property Management Co., Ltd., Osaka (JP)

(72) Inventors: Akio Konishi, Hyogo (JP); Takumi Kuwahara, Nara (JP); Tetsuya Uno, Osaka (JP); Fumio Shinano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/689,018

(22) Filed: Aug. 29, 2017

(65) Prior Publication Data

US 2017/0363882 A1    Dec. 21, 2017

Related U.S. Application Data

(63) Continuation of application No. 14/447,871, filed on Jul. 31, 2014, now Pat. No. 9,778,479, which is a
(Continued)

(30) Foreign Application Priority Data

Feb. 2, 2012 (JP) .................................. 2012-021380
Feb. 2, 2012 (JP) .................................. 2012-021395

(51) Int. Cl.
*G02B 27/64* (2006.01)
*G02B 7/02* (2006.01)
(Continued)

(52) U.S. Cl.
CPC ............. *G02B 27/646* (2013.01); *G02B 7/04* (2013.01); *G02B 7/102* (2013.01); *G03B 3/10* (2013.01);
(Continued)

(58) Field of Classification Search
CPC ........... G02B 27/646; G02B 7/04; G02B 7/10
(Continued)

(56) References Cited

U.S. PATENT DOCUMENTS 5,486,889 A    1/1996    Shintani
5,570,153 A    10/1996    Shono
(Continued)

FOREIGN PATENT DOCUMENTS

JP    63-138320 A    6/1988
JP    05-090416    12/1993
(Continued)

OTHER PUBLICATIONS

International Search Report for corresponding International Application No. PCT/JP2013/000588 dated May 7, 2013.
(Continued)

*Primary Examiner* — Nicholas R Pasko
(74) *Attorney, Agent, or Firm* — Renner, Otto, Boisselle & Sklar, LLP

(57) ABSTRACT

A lens barrel includes a first frame body, a second frame body, a support frame, and a retracting lens frame. The support frame is supported by the second frame body and moves with respect to the second frame body within a first plane for image blur correction in an imaging enabled state, the first plane being perpendicular to an optical axis. The retracting lens frame moves around a retraction shaft during a transition period between an imaging enabled state and a housed state, the retraction shaft being substantially parallel to the optical axis. The support frame has a protrusion which comes into contact with a groove included in the first frame body and restricts a movable range of the support frame in the first plane and a second plane that is parallel to the first plane.

4 Claims, 69 Drawing Sheets

US 10,139,648 B2
Page 2

Related U.S. Application Data continuation of application No. PCT/JP2013/000588, filed on Feb. 1, 2013.

(51) Int. Cl.
*G03B 5/00* (2006.01)
*G03B 17/04* (2006.01)
*G02B 7/10* (2006.01)
*G03B 3/10* (2006.01)
*G02B 7/04* (2006.01)

(52) U.S. Cl.
CPC .............. *G03B 5/00* (2013.01); *G03B 17/04* (2013.01); *G03B 2205/0015* (2013.01); *G03B 2205/0092* (2013.01)

(58) Field of Classification Search
USPC .................................. 359/557, 813, 822–826
See application file for complete search history.

(56) References Cited

U.S. PATENT DOCUMENTS

| | | |
|---|---|---|
| 5,614,973 A | 3/1997 | Azegami |
| 5,668,670 A | 9/1997 | Nakayama |
| 5,734,935 A | 3/1998 | Imanari |
| 6,008,954 A * | 12/1999 | Shintani ............... G02B 27/646 359/557 |
| 6,018,426 A | 1/2000 | Funahashi |
| 6,959,148 B2 | 10/2005 | Nomura |
| 7,088,523 B2 | 8/2006 | Hamasaki et al. |
| 7,102,831 B2 | 9/2006 | Omiya et al. |
| 7,194,203 B2 | 3/2007 | Omiya et al. |
| 7,265,913 B2 | 9/2007 | Nagai et al. |
| 7,338,219 B2 | 3/2008 | Ishizuka et al. |
| 7,372,638 B2 | 5/2008 | Yoshii |
| 7,454,129 B2 | 11/2008 | Fukai |
| 7,455,465 B2 | 11/2008 | Nuno et al. |
| 7,477,308 B2 | 1/2009 | Omiya et al. |
| 7,492,536 B2 | 2/2009 | Nagai et al. |
| 7,507,040 B2 | 3/2009 | Nomura et al. |
| 7,515,182 B2 | 4/2009 | Omiya et al. |
| 7,515,195 B2 | 4/2009 | Endo et al. |
| 7,527,438 B2 | 5/2009 | Nomura et al. |
| 7,536,091 B2 | 5/2009 | Nomura |
| 7,551,376 B2 | 6/2009 | Koyama |
| 7,689,110 B2 | 3/2010 | Yumiki et al. |
| 7,744,294 B2 | 6/2010 | Tsurukawa |
| 7,746,584 B2 | 6/2010 | Honsho et al. |
| 7,753,598 B2 | 7/2010 | Ishizuke et al. |
| 7,755,855 B2 | 7/2010 | Shimazaki et al. |
| 7,773,871 B2 | 8/2010 | Ishizuka |
| 7,777,976 B2 | 8/2010 | Nomura et al. |
| 7,780,362 B2 | 8/2010 | Nomura et al. |
| 7,860,383 B2 | 12/2010 | Nomura et al. |
| 7,864,241 B2 | 1/2011 | Iwasaki |
| 7,872,683 B2 | 1/2011 | Iwasaki |
| 7,920,345 B2 | 4/2011 | Honsho et al. |
| 8,041,204 B2 | 10/2011 | Nomura |
| 8,090,249 B2 | 1/2012 | Suzuka |
| 8,218,255 B2 | 7/2012 | Katano |
| 8,228,619 B2 | 7/2012 | Koyama |
| 8,351,775 B2 | 1/2013 | Nagae |
| 8,396,358 B2 | 3/2013 | Suzuka |
| 8,422,152 B2 | 4/2013 | Onishi |
| 8,432,477 B2 | 4/2013 | Honsho et al. |
| 8,441,742 B2 | 5/2013 | Koyama |
| 8,451,544 B2 | 5/2013 | Suzuki |
| 8,472,127 B2 | 6/2013 | Onishi |
| 8,498,528 B2 | 7/2013 | Suzuka |
| 8,665,535 B2 | 3/2014 | Shinano et al. |
| 8,730,600 B2 | 5/2014 | Iwasaki et al. |
| 8,773,762 B2 | 7/2014 | Suzuka |
| 8,776,615 B2 | 7/2014 | Kempainen et al. |
| 9,046,744 B2 | 6/2015 | Konishi |
| 9,116,283 B2 | 8/2015 | Konishi |
| 9,383,542 B2 | 7/2016 | Uno |
| 9,411,125 B2 * | 8/2016 | Shinano ............... G03B 17/04 |
| 9,519,120 B2 | 12/2016 | Konishi |
| 9,664,875 B2 | 5/2017 | Uno |
| 9,778,479 B2 * | 10/2017 | Konishi ............... G02B 27/646 |
| 2005/0207748 A1 | 9/2005 | Ishizuka et al. |
| 2006/0034001 A1 | 2/2006 | Nagai et al. |
| 2006/0034604 A1 | 2/2006 | Nomura et al. |
| 2006/0092526 A1 | 5/2006 | Hamasaki et al. |
| 2007/0253689 A1 | 11/2007 | Nagai et al. |
| 2008/0180812 A1 | 7/2008 | Honsho et al. |
| 2009/0207509 A1 | 8/2009 | Nomura et al. |
| 2009/0231709 A1 | 9/2009 | Nomura et al. |
| 2010/0067896 A1 | 3/2010 | Murakami |
| 2010/0142939 A1 | 6/2010 | Honsho et al. |
| 2011/0001872 A1 | 1/2011 | Honsho et al. |
| 2011/0013897 A1 | 1/2011 | Nagae |
| 2011/0019290 A1 | 1/2011 | Shinano et al. |
| 2011/0026143 A1 | 2/2011 | Katano |
| 2011/0032627 A1 | 2/2011 | Koyama |
| 2011/0141566 A1 * | 6/2011 | Suzuka ............... G02B 27/646 359/557 |
| 2012/0045198 A1 | 2/2012 | Miyoshi et al. |
| 2012/0070138 A1 | 3/2012 | Onishi |
| 2012/0257286 A1 | 10/2012 | Koyama |
| 2013/0215316 A1 | 8/2013 | Honsho et al. |
| 2014/0340751 A1 | 11/2014 | Konishi et al. |
| 2014/0340754 A1 | 11/2014 | Uno et al. |
| 2014/0340772 A1 | 11/2014 | Shinano |
| 2015/0043088 A1 | 2/2015 | Uemura |

FOREIGN PATENT DOCUMENTS

| | | |
|---|---|---|
| JP | 06-034865 A | 2/1994 |
| JP | 06-051178 | 2/1994 |
| JP | 08-152659 A | 6/1996 |
| JP | 10-003103 A | 1/1998 |
| JP | 11-160606 A | 6/1999 |
| JP | 2000-292848 | 10/2000 |
| JP | 2001-042189 | 2/2001 |
| JP | 2001-235670 | 8/2001 |
| JP | 2003-315861 A | 11/2003 |
| JP | 2004-233916 A | 8/2004 |
| JP | 2005-172953 A | 6/2005 |
| JP | 2005-227597 A | 8/2005 |
| JP | 2005-266345 A | 9/2005 |
| JP | 2006-053444 | 2/2006 |
| JP | 2006-053445 A | 2/2006 |
| JP | 2006-058455 A | 3/2006 |
| JP | 2006-126537 A | 5/2006 |
| JP | 2006-330657 A | 12/2006 |
| JP | 2007-163961 A | 6/2007 |
| JP | 2007-178751 | 7/2007 |
| JP | 2007-199320 | 8/2007 |
| JP | 2007-206210 A | 8/2007 |
| JP | 2008-015387 A | 1/2008 |
| JP | 2008-046504 A | 2/2008 |
| JP | 2008-139802 | 6/2008 |
| JP | 2008-158288 A | 7/2008 |
| JP | 2008-185786 A | 8/2008 |
| JP | 2009-157245 A | 7/2009 |
| JP | 2009-216881 A | 9/2009 |
| JP | 2009-217243 A | 9/2009 |
| JP | 2009-244874 A | 10/2009 |
| JP | 2009-251063 | 10/2009 |
| JP | 2009-251064 A | 10/2009 |
| JP | 2010-026163 A | 2/2010 |
| JP | 2010-164695 A | 7/2010 |
| JP | 2010-217511 A | 9/2010 |
| JP | 2011-013613 B | 1/2011 |
| JP | 2011-022234 A | 2/2011 |
| JP | 2011-033667 A | 2/2011 |
| JP | 2011-039090 A | 2/2011 |
| JP | 2011-039527 A | 2/2011 |
| JP | 2011-048346 A | 3/2011 |
| JP | 2011-150132 A | 8/2011 |
| JP | 2011-154204 | 8/2011 |
| JP | 2011-158592 A | 8/2011 |

(56) References Cited

FOREIGN PATENT DOCUMENTS

| JP | 2011-170262 A | 9/2011 |
|---|---|---|
| JP | 2011-209348 A | 10/2011 |
| JP | 2011-209652 A | 10/2011 |
| JP | 2011-215389 | 10/2011 |
| JP | 2012-018325 A | 1/2012 |

OTHER PUBLICATIONS

International Search Report for related International Application No. PCT/JP2013/000592 dated Mar. 5, 2013.
International Search Report for related International Application No. PCT/JP2013/000586 dated May 7, 2013.
International Search Report for related International Application No. PCT/JP2013/000589 dated May 7, 2013.
International Search Report for related International Application No. PCT/JP2013/000595 dated May 7, 2013.
International Search Report for related International Application No. PCT/JP2012/008448 dated Feb. 12, 2013.
International Search Report for related International Application No. PCT/JP2013/000594 dated Mar. 12, 2013.
U.S. Appl. No. 14/447,744, filed Jul. 31, 2014.
U.S. Appl. No. 14/447,791, filed Jul. 31, 2014.
U.S. Appl. No. 14/447,843, filed Jul. 31, 2014.
U.S. Appl. No. 14/447,907, filed Jul. 31, 2014.
U.S. Appl. No. 14/448,069, filed Jul. 31, 2014.
U.S. Appl. No. 14/448,112, filed Jul. 31, 2014.
Notice of Allowance dated Jan. 21, 2015 for U.S. Appl. No. 14/447,843.
Notice of Allowance dated Jan. 26, 2015 for U.S. Appl. No. 14/447,791.
Office Action dated Feb. 20, 2015 for U.S. Appl. No. 14/447,907.
Office Action dated Mar. 12, 2015 for U.S. Appl. No. 14/448,112.
Office Action dated Aug. 27, 2015 for U.S. Appl. No. 14/448,112.
Office Action dated Apr. 7, 2016 for U.S. Appl. No. 14/696,419.
Notice of Allowance dated Mar. 30, 2016 for U.S. Appl. No. 14/688,250.
Office Action dated May 26, 2016 for U.S. Appl. No. 14/448,069.
Office Action dated Jul. 27, 2016 for U.S. Appl. No. 14/448,112.
Notice of Allowance dated Aug. 16, 2016 for U.S. Appl. No. 14/696,419.
Office Action dated Jun. 2, 2017 for U.S. Appl. No. 14/448,069.
Co-pending U.S. Appl. No. 15/489,973, filed Apr. 18, 2017.
Office Action dated Aug. 23, 2017 for co-pending U.S. Appl. No. 15/489,973.

* cited by examiner

LENS BARREL

CROSS-REFERENCE TO RELATED APPLICATIONS

This is a continuation application of U.S. patent application Ser. No. 14/447,871, filed on Jul. 31, 2014, which is a continuation application of International Application PCT/JP2013/000588, with an international filing date of Feb. 1, 2013 which claims priority to Japanese Patent Application No. 2012-021380 filed on Feb. 2, 2012 and Japanese Patent Application No. 2012-021395 filed on Feb. 2, 2012. The entire disclosures of U.S. patent application Ser. No. 14/447,871, International Application PCT/JP2013/000588, Japanese Patent Application No. 2012-021380, and Japanese Patent Application No. 2012-021395 are hereby incorporated herein by reference.

BACKGROUND

Technical Field

The technology disclosed herein relates to a lens barrel equipped with an optical system.

Background Information

A lens barrel in which a blur correction lens group chamber was able to retract to the outside of a fourth lens group chamber in a direction perpendicular to the optical axis has been disclosed in the past (see Japanese Laid-Open Patent Application 2007-163961).

With prior art, in the imaging state, a blur correcting lens group chamber (corresponds to the retracting lens frame) is shifted and displaced by a blur correction mechanism of a third lens group chamber in a direction perpendicular to the optical axis. This reduces image blur. In the housed state, this blur correcting lens group chamber is retracted outward in the radial direction of fourth lens group chamber. In this state, clearance must be provided between the fourth lens group chamber and the blur correcting lens group chamber so that the blur correcting lens group chamber does not touch the fourth lens group chamber. This clearance hindered attempts to make the lens barrel more compact.

The technology disclosed herein was conceived in light of the above problem, and it is an object of the present technology to reduce the size of a lens barrel.

SUMMARY

The lens barrel herein includes a first frame body including a groove formed along a direction substantially parallel to an optical axis on an inner circumferential surface; a second frame body configured to be engaged by the first frame body; a support frame configured to be supported by the second frame body and move with respect to the second frame body within a first plane for image blur correction in an imaging enabled state, the first plane being perpendicular to an optical axis, the support frame having a protrusion protruding outwardly in a radial direction; and a retracting lens frame configured to be supported by the support frame and move around a retraction shaft during a transition period between an imaging enabled state and a housed state, the retraction shaft being substantially parallel to the optical axis. The second frame body, the support frame, and the retracting lens frame are configured to move in the optical axis direction with respect to the first frame body during the transition period between the imaging enabled state and the housed state. The protrusion comes into contact with the groove and restricts a movable range of the support frame in the first plane so that the movable range of the support frame in the transition period is narrower than the movable range in the imaging enabled state, and the protrusion engages the groove to restrict a movement of the support frame within a second plane that is parallel to the first plane, during the transition period between the imaging enabled state and the housed state.

The technology disclosed herein provides a lens barrel that can be made more compact.

BRIEF DESCRIPTION OF THE DRAWINGS

Referring now to the attached drawings, which form a part of this original disclosure.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

Embodiments will now be described through reference to the drawings.

First Embodiment

A first embodiment will be described through reference to FIGS. 1 to 22. The numbers and symbols used in the following description of the first embodiment correspond to the numbers and symbols in FIGS. 1 to 22.

In the following embodiment, a digital camera will be described as an example of an imaging device. In the following description, assuming that the digital camera is in its landscape orientation, the subject side will be referred to as the "front," the opposite side from the subject as the "rear," the vertically upper side as "upper," the vertically lower side as "lower," the right side when facing the subject as "right," and the left side when facing the subject as "left." "Landscape orientation" is a kind of orientation of a digital camera, and when an image is captured in landscape orientation, the long-side direction of a rectangular image that is wider than it is tall substantially coincides with the horizontal direction within the image.

1. Overall Configuration of Digital Camera

Figure 1:
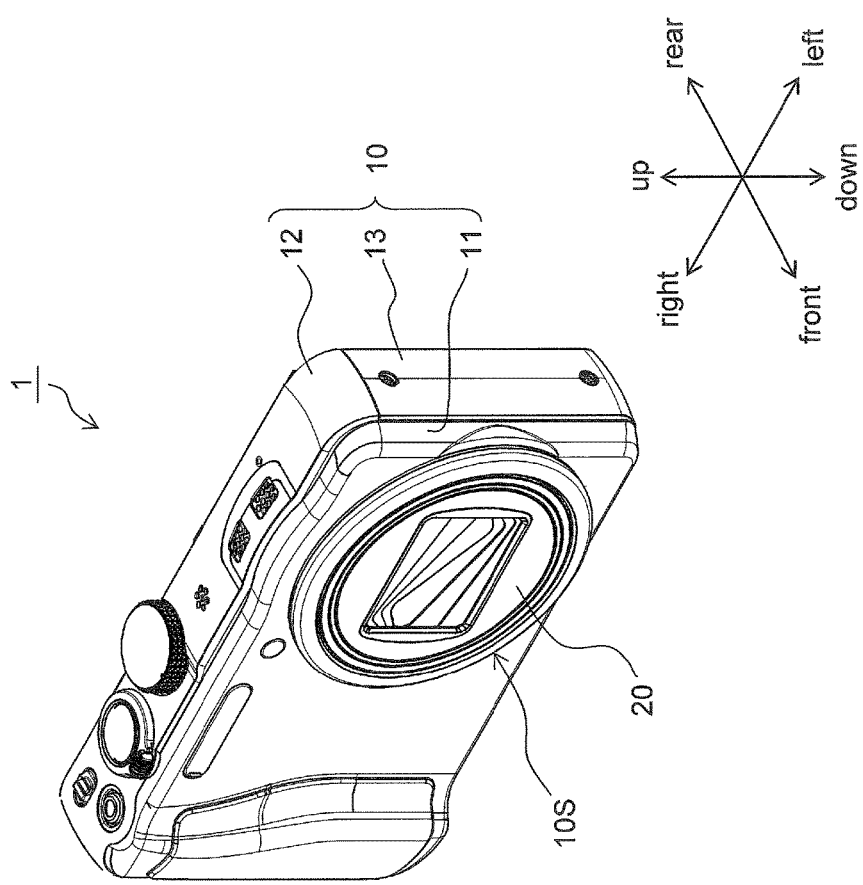
FIG. 1 is an oblique view of a digital camera pertaining to Embodiment 1.
Figure 2:
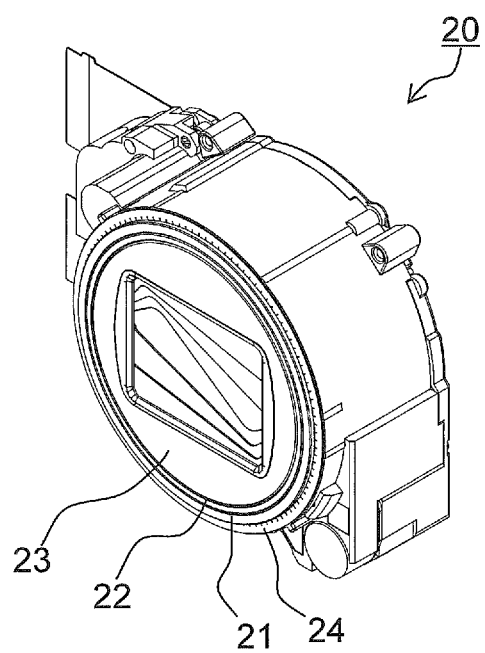
FIG. 2 is an oblique view of a lens barrel in its retracted state.
Figure 3:
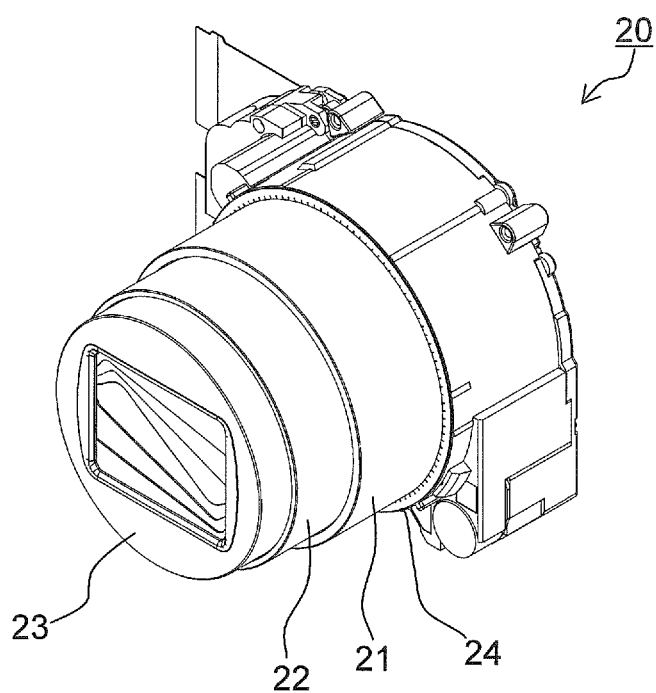
FIG. 3 is an oblique view of the lens barrel in its wide angle state.

The configuration of a digital camera 1 will be described through reference to the drawings. FIG. 1 is an oblique view of the digital camera 1. FIGS. 2 and 3 are oblique views of a lens barrel 20. In FIG. 2, the lens barrel 20 is shown in its retracted state, and in FIG. 3, the lens barrel 20 is shown in its wide angle state.

As shown in FIG. 1, the digital camera 1 comprises a housing 10 and the lens barrel 20.

The housing 10 is made up of a front panel 11, a rear panel 12, and a side panel 13. An opening 10S is formed in the front panel 11.

The lens barrel 20 comprises a three-stage telescoping zoom mechanism. The lens barrel 20 is housed in the housing 10 when not being used for imaging, and is deployed forward from the opening 10S when used for imaging. More specifically, as shown in FIGS. 2 and 3, the lens barrel 20 has a first movable lens barrel part 21, a second movable lens barrel part 22, a third movable lens barrel part 23, and a stationary lens barrel part 24.

The first movable lens barrel part 21 is configured to deploy with respect to the stationary lens barrel part 24. The second movable lens barrel part 22 is configured to deploy with respect to the first movable lens barrel part 21. The third movable lens barrel part 23 is configured to deploy with respect to the second movable lens barrel part 22. The stationary lens barrel part 24 is fixed inside the housing 10. As shown in FIG. 3, when the lens barrel 20 is deployed, the third movable lens barrel part 23 is positioned the farthest forward out of the first to third movable lens barrel parts 21 to 23.

2. Configuration of Lens Barrel

Figure 4:
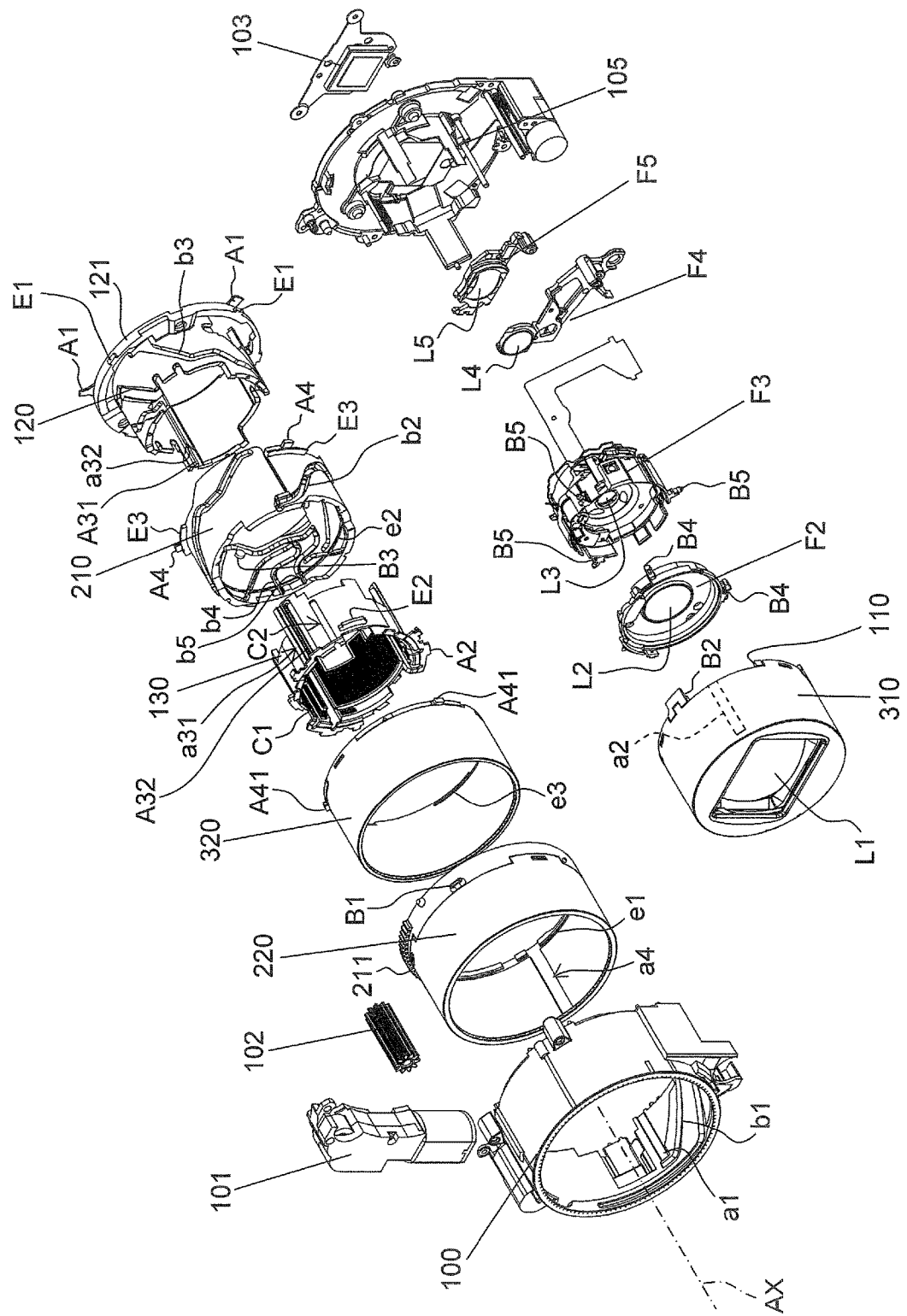
FIG. 4 is an exploded oblique view of the lens barrel.

Next, the configuration of the lens barrel 20 will be described through reference to the drawings. FIG. 4 is an exploded oblique view of the lens barrel 20.

The first to third movable lens barrel parts 21 to 23 of the lens barrel 20 are deployed from the stationary lens barrel part 24 along the optical axis AX of the optical system. The optical system includes first to fifth lens groups L1 to L5. In the following description, a direction parallel to the optical axis AX will be called the "optical axis direction," a direction perpendicular to the optical axis direction will be called the "radial direction," and a direction that follows a circle whose center is the optical axis AX will be called the "peripheral direction." The optical axis AX substantially coincides with the axis of the various frames that make up the lens barrel 20.

As shown in FIG. 4, the lens barrel 20 comprises a stationary frame 100, a master flange 105, a first rectilinear frame 110, a second rectilinear frame 120, a third rectilinear frame 130, a first rotary frame 210, a second rotary frame 220, a first cosmetic frame 310, a second cosmetic frame 320, a second lens group frame F2, a third lens group frame F3, a fourth lens group frame F4, and a fifth lens group frame F5.

In this embodiment, the stationary frame 100 and the master flange 105 constitute the stationary lens barrel part 24. The first rectilinear frame 110 constitutes the third movable lens barrel part 23. The third rectilinear frame 130, the first rotary frame 210, and the second cosmetic frame 320 constitute the second movable lens barrel part 22. The second rectilinear frame 120 and the second rotary frame 220 constitute the first movable lens barrel part 21.

The stationary frame 100 is in the form of a cylinder. The stationary frame 100 has a rectilinear groove a1 and a cam groove b1 formed in its inner peripheral face. A zoom motor 101 and a zoom gear 102 are attached to the outer peripheral face of the stationary frame 100. The zoom motor 101 is a drive source for deploying the first to third movable lens barrel parts 21 to 23. The zoom gear 102 transmits the drive force of the zoom motor 101 to the second rotary frame 220.

The master flange 105 is a flat plastic member that covers the rear of the stationary frame 100. An imaging element 103 is fitted in the center of a master flange 244.

The first rectilinear frame 110 is in the form of a cylinder, and is disposed on the outside of the first rotary frame 210. The first rectilinear frame 110 has a rectilinear groove a2 and a cam protrusion B2. The rectilinear groove a2 is formed along the optical axis direction on the inner peripheral face. The cam protrusion B2 is disposed at the rear end of the inner peripheral face. The cam protrusion B2 is engaged with a cam groove b2 of the first rotary frame 210 (discussed below). The first rectilinear frame 110 supports the first lens group L1 for bringing light into the lens barrel 20. The first rectilinear frame 110 is covered by the first cosmetic frame 310.

The second rectilinear frame 120 is in the form of a cylinder, and is disposed on the inside of the first rectilinear frame 110. The second rectilinear frame 120 has a flange 121, a rectilinear protrusion A1, a bayonet protrusion E1, a rectilinear protrusion A31, a rectilinear groove a32, and a cam groove b3. The flange 121 is formed in an annular shape, and is provided to the rear end part of the outer peripheral face. The rectilinear protrusion A1 is provided to the outer peripheral face of the flange 121. The rectilinear protrusion A1 is engaged with the rectilinear groove a1 of the stationary frame 100. The bayonet protrusion E1 is provided to the outer peripheral face of the flange 121. The bayonet protrusion E1 is engaged with a bayonet groove e1 of the second rotary frame 220 (discussed below). The rectilinear protrusion A31 is formed on the outer peripheral face along the optical axis direction. The rectilinear protrusion A31 is engaged with the rectilinear groove a32 of the third rectilinear frame 130 (discussed below). The rectilinear groove a32 is formed in the outer peripheral face along the rectilinear protrusion A31. A rectilinear protrusion A32 of the third rectilinear frame 130 (discussed below) is engaged with the rectilinear groove a32. The cam groove b3 is formed in the outer peripheral face so as to intersect with the optical axis direction.

The third rectilinear frame 130 is in the form of a cylinder, and is disposed on the inside of the second rectilinear frame 120. The third rectilinear frame 130 has a rectilinear protrusion A2, the rectilinear protrusion A32, a rectilinear groove a31, a bayonet protrusion E2, a through-groove c1, and a through-groove c2. The rectilinear protrusion A2 is provided to the front end part of the outer peripheral face. The rectilinear protrusion A2 is engaged with the rectilinear groove a2 of the first rectilinear frame 110. The rectilinear protrusion A32 is formed in the outer peripheral face along the optical axis direction. The rectilinear protrusion A32 is engaged with the rectilinear groove a32 of the second rectilinear frame 120. The rectilinear groove a31 is formed in the outer peripheral face along the rectilinear protrusion A32. The rectilinear protrusion A31 of the second rectilinear frame 120 is engaged with the rectilinear groove a31. The bayonet protrusion E2 is formed on the outer peripheral face along the peripheral direction. The bayonet protrusion E2 is engaged with a bayonet groove e2 of the first rotary frame 210 (discussed below). The through-groove c1 and the through-groove c2 pass through the frame main body from the inner peripheral face to the outer peripheral face, and are formed along the optical axis direction.

The first rotary frame 210 is in the form of a cylinder, and is disposed on the inside of the first rectilinear frame 110. The first rotary frame 210 has a bayonet protrusion E3, a rectilinear protrusion A4, a cam protrusion B3, the cam groove b2, a cam groove b4, and a cam groove b5. The bayonet protrusion E3 is formed at the rear end part of the outer peripheral face, along the peripheral direction. The bayonet protrusion E3 is engaged with a bayonet groove e3 of the second cosmetic frame 320 (discussed below). The rectilinear protrusion A4 is provided to the outer peripheral face of the bayonet protrusion E3. The rectilinear protrusion A4 is engaged with a rectilinear groove a4 of the second rotary frame 220 (discussed below). The cam protrusion B3 is disposed on the inner peripheral face. The cam protrusion B3 is engaged with the cam groove b3 of the second rectilinear frame 120. The cam groove b2 is formed in the outer peripheral face so as to intersect with the optical axis direction. The cam groove b4 and the cam groove b5 are formed in the inner peripheral face so as to intersect with the optical axis direction. The second rotary frame 220 is in the form of a cylinder, and is disposed on the inside of the stationary frame 100. The second rotary frame 220 has a gear part 221, a cam protrusion B1, the rectilinear groove a4, and the bayonet groove e1. The gear part 221 is formed at the rear end part of the outer peripheral face, along the peripheral direction. When the gear part 221 meshes with a zoom gear 242, the second rotary frame 220 is rotated in the peripheral direction by the drive force of the zoom motor 101. The cam protrusion B1 is engaged with the cam groove b1 of the stationary frame 100. The rectilinear groove a4 is formed in the inner peripheral face along the optical axis direction. The rectilinear protrusion A4 of the first rotary frame 210 is engaged with the rectilinear groove a4. The bayonet groove e1 is formed at the rear end part of the inner peripheral face, along the peripheral direction. The bayonet protrusion E1 of the first rectilinear frame 110 is engaged with the bayonet groove e1.

The first cosmetic frame 310 covers the front face and the outer periphery of the first rectilinear frame 110. An opening is formed in the first cosmetic frame 310 for bringing light in from the outside. The first lens group L1 is disposed inside the opening in the first rectilinear frame 110.

The second cosmetic frame 320 is in the form of a cylinder, and is disposed on the outside of the first rotary frame 210. The second cosmetic frame 320 has a rectilinear protrusion A41 and the bayonet groove e3. The rectilinear protrusion A4 is provided to the rear end part of the outer peripheral face. The rectilinear protrusion A41 is engaged with the rectilinear groove a4 of the second rotary frame 220. The bayonet groove e3 is formed at the rear end part of the inner peripheral face, along the peripheral direction. The bayonet protrusion E3 of the first rotary frame 210 is engaged with the bayonet groove e3.

The second lens group frame F2 is in the form of a disk, and is disposed on the inside of the third rectilinear frame 130. The second lens group frame F2 supports a second lens group L2 used for zooming. The second lens group frame F2 has a cam protrusion B4 that is provided on the outer peripheral face. The cam protrusion B4 is inserted into the through-groove c1 of the third rectilinear frame 130, and is engaged with the cam groove b4 of the first rotary frame 210.

The third lens group frame F3 has a shutter unit and an OIS (optical image stabilizer) unit. The shutter unit supports the OIS unit. The shutter frame is in the form of a cylinder, and is disposed on the inside of the third rectilinear frame 130. The third lens group frame F3 has a built-in shutter mechanism. The third lens group frame F3 has a cam protrusion B5 that is provided on the outer peripheral face. The cam protrusion B5 is inserted into the through-groove c2 of the third rectilinear frame 130, and is engaged with the cam groove b5 of the first rotary frame 210.

The OIS (optical image stabilizer) unit mainly has an OIS frame 400 and a retracting lens frame 401.

The OIS frame 400 is mounted to a shutter frame 335. The OIS frame 400 is movable within a plane that is perpendicular to the optical axis. For example, the OIS frame 400 is moved by an actuator within a plane that is perpendicular to the optical axis.

The retracting lens frame 401 is supported by the OIS frame 400 so as to be movable around a retraction shaft that is substantially parallel to the optical axis. The retracting lens frame 401 supports a third lens group L3 that is used for image blur correction. The third lens group L3 is made up of at least one lens. The position of the retracting lens frame 401 is changed from a correction enabled position (first orientation) in which the third lens group L3 executes image blur correction, to a retracted position (second orientation) in which the third lens group L3 is retracted from the optical axis.

The fourth lens group frame F4 is supported by the stationary frame 100. The fourth lens group frame F4 supports a fourth lens group L4 that is used for focusing.

The fifth lens group frame F5 is supported by the master flange 105. The fifth lens group frame F5 supports a fifth lens group L5.

3. Detailed Configuration of Members Constituting the Lens Barrel

A summary of the various members was given in "2. Configuration of Lens Barrel," but here the configuration of the master flange 105 and the configuration of the third lens group frame F3 will be described in further detail.

3-1. Master Flange

Figure 5:
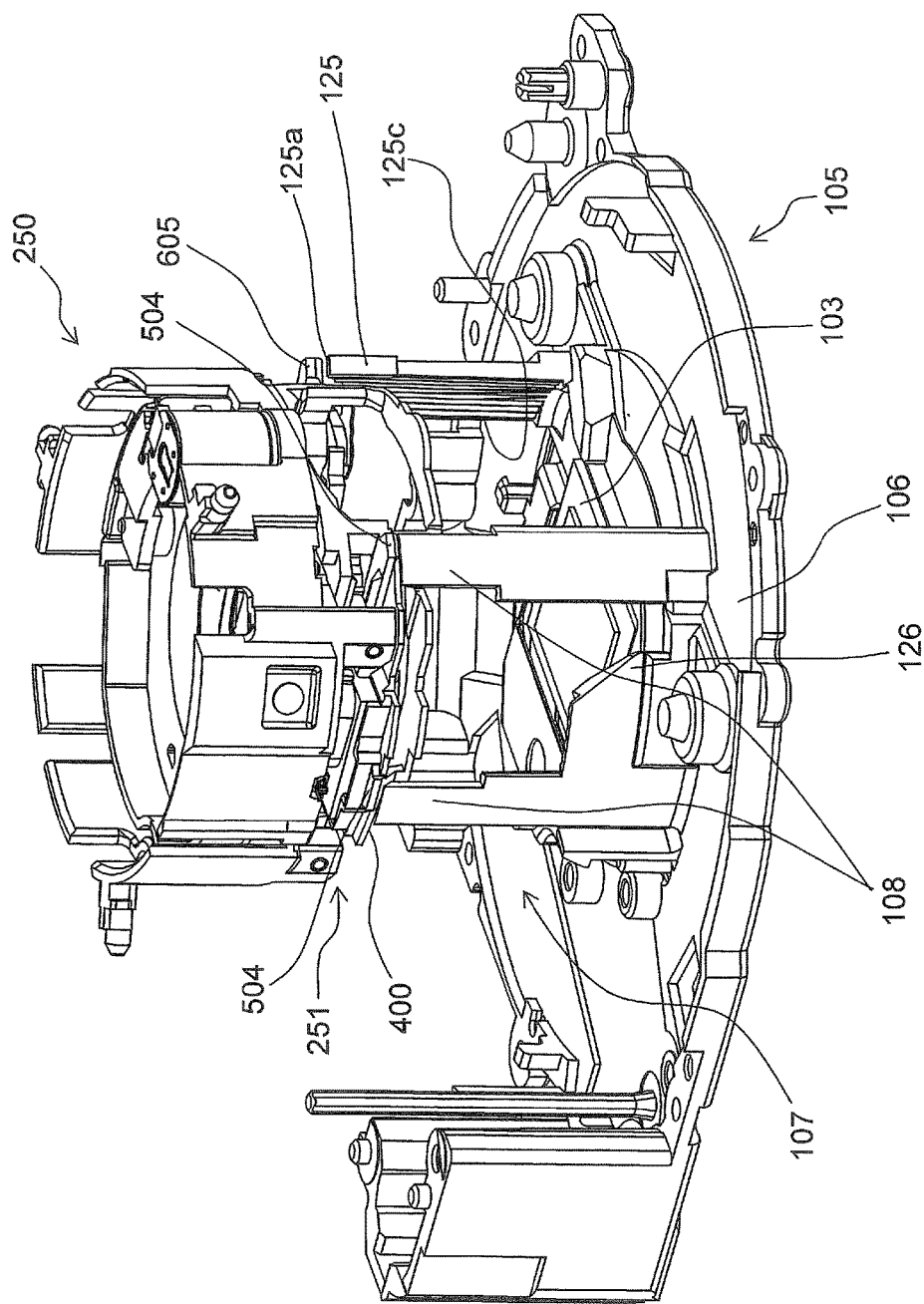
FIG. 5 is an oblique view of a master flange and a shutter unit.

As shown in FIG. 5, the master flange 105 has a master flange main body portion 106 (an example of a first main body portion), a master flange restrictor 107 (first restrictor), a first retracting cam 125, and a second retracting cam 126. The first main body portion 106 is in the form of a disk. The above-mentioned imaging element 103 is mounted in the center of the first main body portion 106.

The first restrictor 107 restricts the movement of the OIS frame 400. More precisely, the first restrictor 107 engages with an OIS unit 251 and restricts the movement of the OIS frame 400. More specifically, the first restrictor 107 engages with an OIS unit 251 and restricts the movement of the OIS frame 400 when the lens barrel 20 changes from the imaging enabled state to the retracted state (or when the lens barrel 20 changes from the retracted state to the imaging enabled state).

Figure 6:
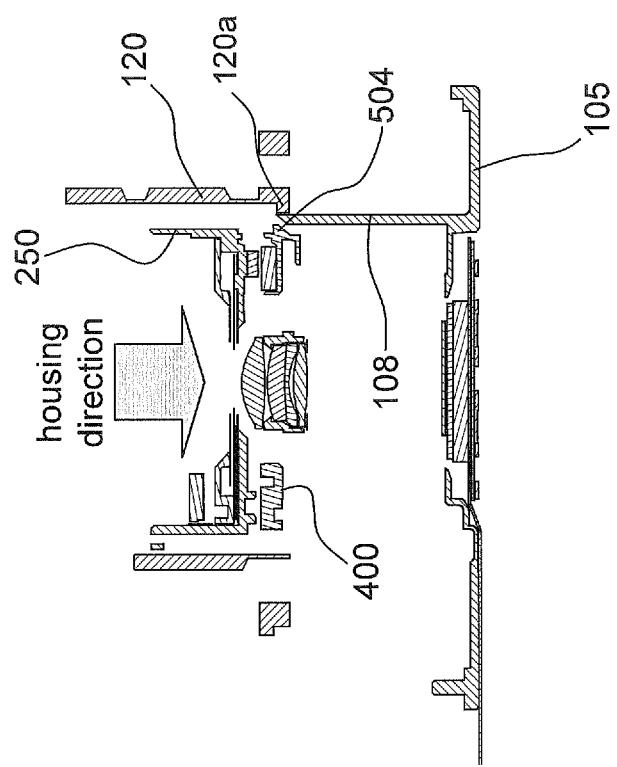
FIG. 6 is a cross section of the master flange and the shutter unit.

As shown in FIGS. 5 and 6, the first restrictor 107 is formed integrally with the first main body portion 106. The first restrictor 107 is constituted by two protrusions 108 that protrude outward from the first main body portion 106. The two protrusions 108 engage with the OIS frame 400 of the OIS unit 251. As shown in FIG. 6, the two protrusions 108 come into contact with the inner peripheral part 120a of the second rectilinear frame 120. This prevents the two protrusions 108 from falling over.

A sloped part is formed on the inner peripheral side of the distal ends of the protrusions 108. These sloped parts guide the OIS frame 400 from a movable orientation in which the OIS frame 400 is movable (the orientation of the imaging enabled state), to a movement restricted orientation in which the movement of the OIS frame 400 is restricted.

The inner peripheral parts on the proximal end side of the protrusions (the portion excluding the above-mentioned distal end (sloped part) and including the middle part) are formed in a planar shape. The inner peripheral parts are the portions that support the OIS frame 400 in its movement restricted orientation. In-plane movement of the OIS frame 400 is reliably restricted by guiding the OIS frame 400 from the sloped parts on the distal end side to the inner peripheral part on the proximal end side. The way in which the in-plane movement of the OIS frame 400 is restricted will be described in detail in the description of the OIS frame 400 (engagement portion).

Figure 7:
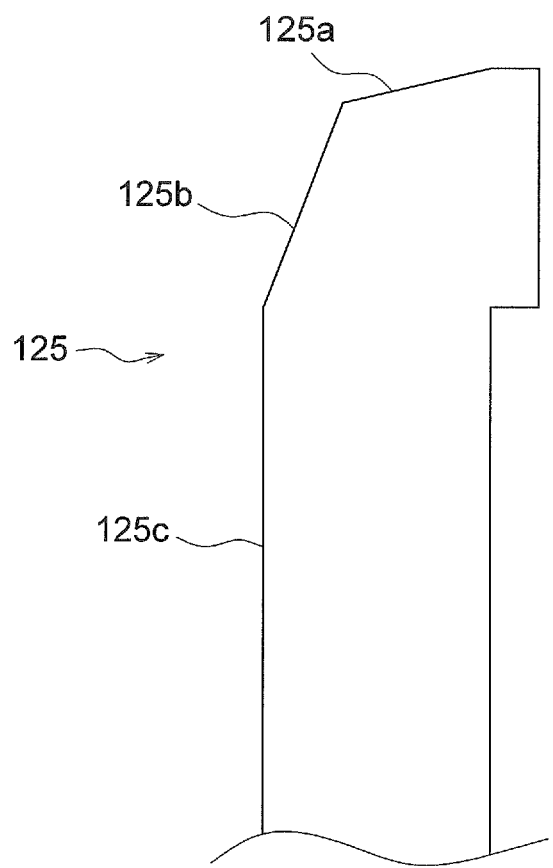
FIG. 7 is a detail side view of a retraction cam of the master flange.

As shown in FIGS. 5 and 7, the first retracting cam 125 is a portion that is longer in one direction and formed integrally with the master flange 105. The first retracting cam 125 has a first guide portion 125a, a second guide portion 125b, and a support portion 125c.

The first guide portion 125a comes into contact with a pressing portion 605 of the retracting lens frame 401, and retracts the retracting lens frame 401. The first guide portion 125a is a portion that is formed inclined to the distal end of the first retracting cam 125.

In a state in which the first guide portion 125a is in contact with the pressing portion 605, the OIS frame 400 is guided by the protrusions 108 from its movable orientation in which the OIS frame 400 is movable (the orientation of the imaging enabled state), to an orientation in which the movement of the OIS frame 400 is restricted (movement restricted orientation).

The second guide portion 125b comes into contact with the pressing portion 605 of the retracting lens frame 401, and further retracts the retracting lens frame 401. The second guide portion 125b is formed continuously with the first guide portion 125a, and is formed at a different angle from that of the first guide portion 125a. In a state in which the second guide portion 125b is in contact with the pressing portion 605 of the retracting lens frame 401, the OIS frame 400 is in its movement restricted orientation.

The support portion 125c is the portion that temporarily supports the retracting lens frame 401 in its retracted position. The retracting lens frame 401 is finally positioned by the second retracting cam 126 (discussed below). The support portion 125c is formed straight in the optical axis direction. In a state in which the support portion 125c has come into contact with the pressing portion 605 of the retracting lens frame 401, the OIS frame 400 is in its movement restricted orientation.

The first retracting cam 125 is the portion that finally positions the retracting lens frame 401. As shown in FIG. 5, the second retracting cam 126 is formed between the two protrusions 108. The first retracting cam 125 has a sloped part. This sloped part guides the retracting lens frame 401 to the retracted position and positions it in the retracted position.

3-2. Third Lens Group Frame
3-2-1. Shutter Unit

Figure 8:
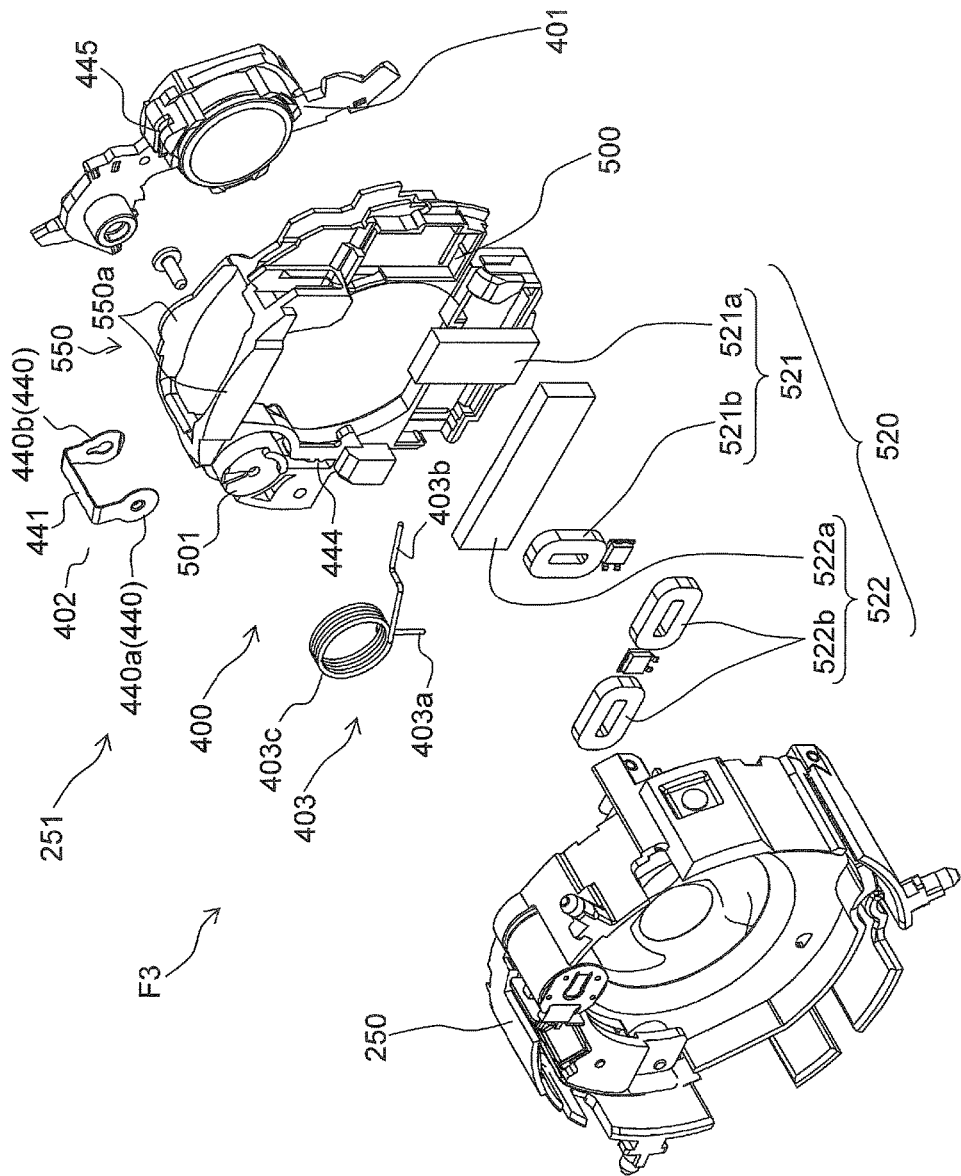
FIG. 8 is an oblique view of the shutter unit, an OIS frame, and a retracting lens frame.

As shown in FIG. 8, a shutter unit 250 is included in the third lens group frame F3. The shutter unit 250 (an example of a second frame body) is engaged with the third rectilinear frame 130 and the first rotary frame 210 as mentioned above. Also, the shutter unit 250 is supported by the master flange 105 (an example of a first body).

Figure 9:
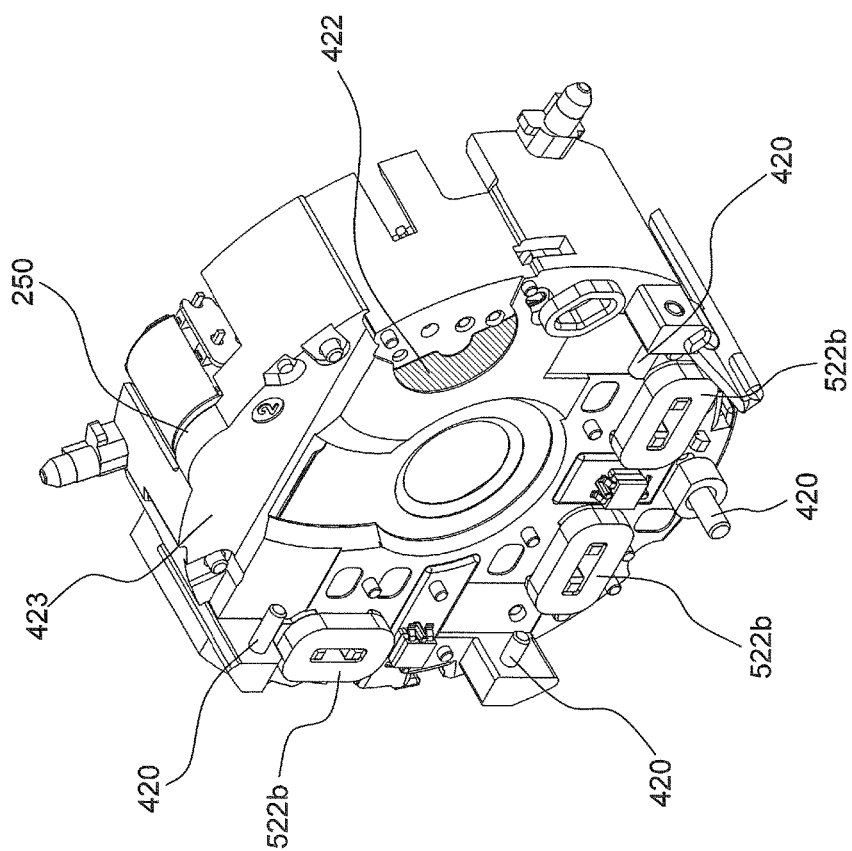
FIG. 9 is a detail oblique view of the shutter unit.

As shown in FIG. 9, the shutter unit 250 has a restrictor 420 (second restrictor) for restricting the movement of the OIS frame 400, and a second stress dispersion portion 422 (the contact portion of the shutter unit) that comes into contact with a first stress dispersion portion 511 (the contact portion of the OIS frame) of the OIS frame 400 (discussed below). The second stress dispersion portion 422 is formed in an arc shape having a specific width. The details of the first stress dispersion portion 511 will be discussed below.

The shutter unit 250 further has a step portion 423. The step portion 423 is formed on the face opposite the OIS frame 400. When the retracting lens frame 401 has changed its orientation (position) from the first orientation to the second orientation (retracted orientation), a housing portion 550 of the retracting lens frame 401 (discussed below) is disposed at the step portion 423. This affords a more compact size in the optical axis direction.

3-2-2. OIS Unit

As shown in FIG. 8, the shutter unit 250 is included in the third lens group frame F3. The OIS unit 251 is disposed between the master flange 105 and the shutter unit 250. The OIS unit 251 is mounted to the shutter unit 250. The OIS unit 251 (an example of a first unit) has the OIS frame 400 (an example of a support frame), the retracting lens frame 401, a thrust spring 402 (an example of a first biasing means), and a rotary spring 403 (an example of a second biasing means, and an example of a biasing member).

OIS Frame

The OIS frame 400 (an example of a support frame) is supported by the shutter unit 250. The OIS frame 400 is configured to be movable within a plane that is perpendicular to the optical axis AX, with respect to the shutter unit 250. The OIS frame 400 is moved by an actuator 520 in a plane that is perpendicular to the optical axis AX.

As shown in FIGS. 8 and 10 to 13, the OIS frame 400 has a main body portion 500 (second main body portion), a retraction shaft portion 501, an anti-rotation portion 502, at least three rail portions 503, and engagement portions 504 (see FIGS. 5 and 6).

As shown in FIG. 8, the second main body portion 500 is substantially in the form of a disk. The second main body portion 500 has the housing portion 550 for housing the retracting lens frame 401. The housing portion 550 has two linking portions 550a that are opposite each other. The linking portions 550a are formed integrally with the second main body portion 500. More precisely, the linking portions 550a are formed integrally with the second main body portion 500 so that the middle between the two linking portions 550a is disposed in the approximate middle of the shutter unit 250 in the optical axis direction (the approximate middle in the thickness direction).

Figure 11:
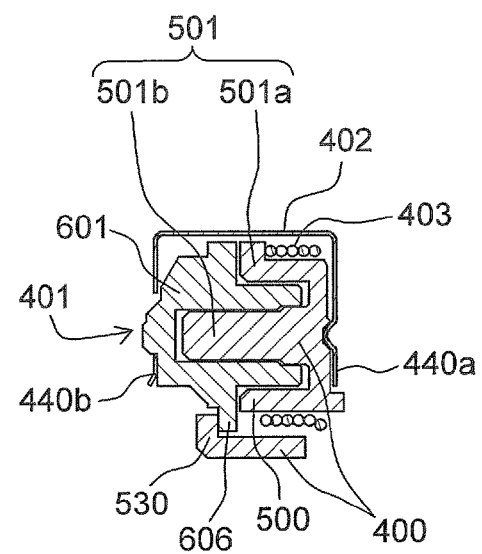
FIG. 11 is a cross section of the area near a shaft support.

As shown in FIGS. 8 and 11, the retraction shaft portion 501 is formed on the second main body portion 500. The retraction shaft portion 501 has a cylindrical part 501a and a retraction shaft 501b. The cylindrical part 501a is formed on the outer peripheral part of the second main body portion 500. The retraction shaft 501b is formed on the second main body portion 500. More specifically, the retraction shaft 501b is formed on the second main body portion 500 so as to protrude toward the inside of the cylindrical part 501a.

Figure 10:
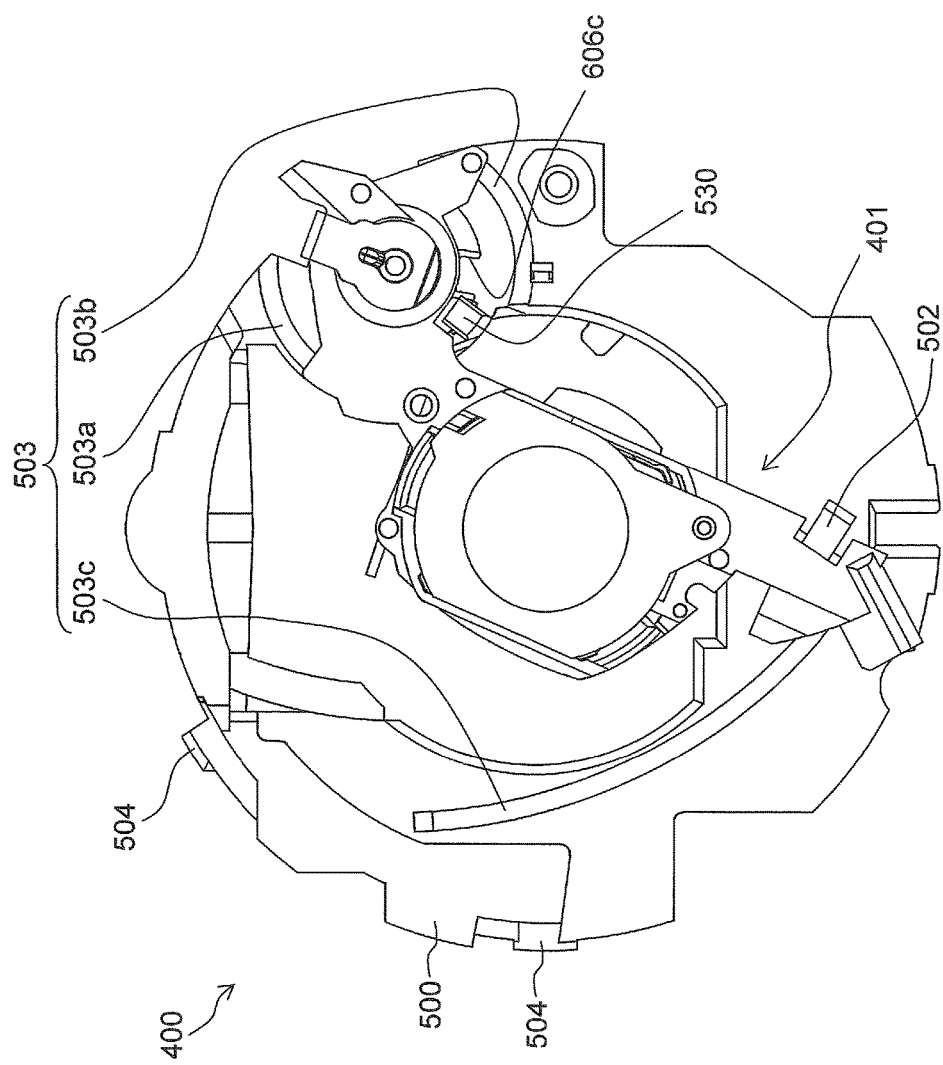
FIG. 10 is a diagram in which the OIS frame to which the retracting lens frame has been mounted is viewed from the imaging element side.
Figure 12:
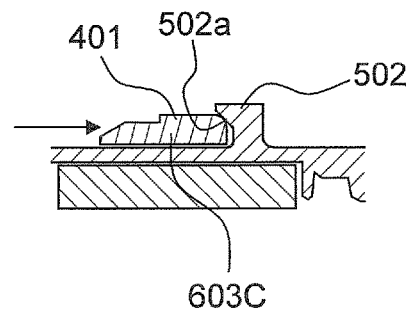
FIG. 12 is a cross section of the area near an anti-rotation portion.

As shown in FIGS. 10 and 12, the anti-rotation portion 502 restricts the movement of the retraction shaft portion 501 produced by the rotary spring 403. The anti-rotation portion 502 is formed protruding outward from the second main body portion 500. The anti-rotation portion 502 has a sloped face 502a. The sloped face 502a is the portion that guides the retracting lens frame 401 toward the OIS frame 400 (the second main body portion 500). The sloped face 502a is sloped in a state of being opposite the second main body portion 500. In other words, the sloped face 502a is sloped with respect to the optical axis AX.

An example in which the sloped face 502a was sloped at one angle was given here, but the sloped face 502a may be formed so that it is sloped in multiple steps. Also, the sloped face 502a may be formed so that it slopes in the form of a curved surface.

Figure 13:
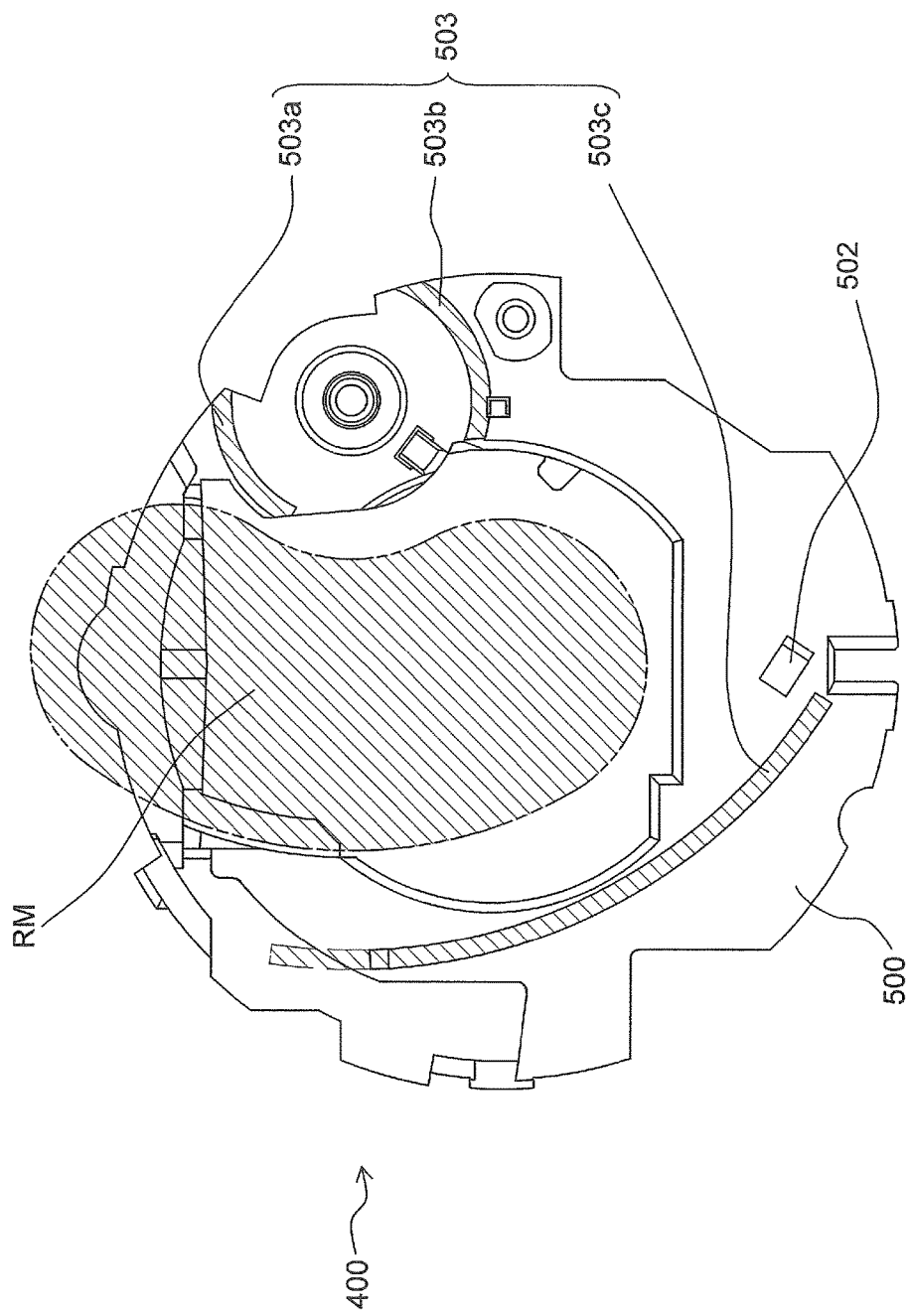
FIG. 13 is a diagram of a rail portion of the OIS frame, and the movement range of a third lens group.

As shown in FIGS. 10 and 13, at least three rail portions 503 (503a to 503c, for example) are formed on the second main body portion 500. The rail portions 503 are formed on one face of the substantially disk-shaped second main body portion 500. The rail portions 503 are formed on the second main body portion 500 at positions opposite contact portions 603 (a first contact portion 603A and a second contact portion 603B; discussed below) formed on the retracting lens frame 401.

Also, as shown in FIG. 13, the rail portions 503 are formed on the second main body portion 500 in a portion that excludes a portion RM where the range over which the third lens group L3 supported by the retracting lens frame 401 moves is projected onto the second main body portion 500, when the OIS frame 400 is viewed in the optical axis direction. Furthermore, the rail portions 503 are formed in a shape that corresponds to the path over when the contact portions 603 (the first contact portion 603A and the second contact portion 603B; discussed below) move when the lens barrel 20 changes from its imaging enabled state to its retracted state.

Figure 14:
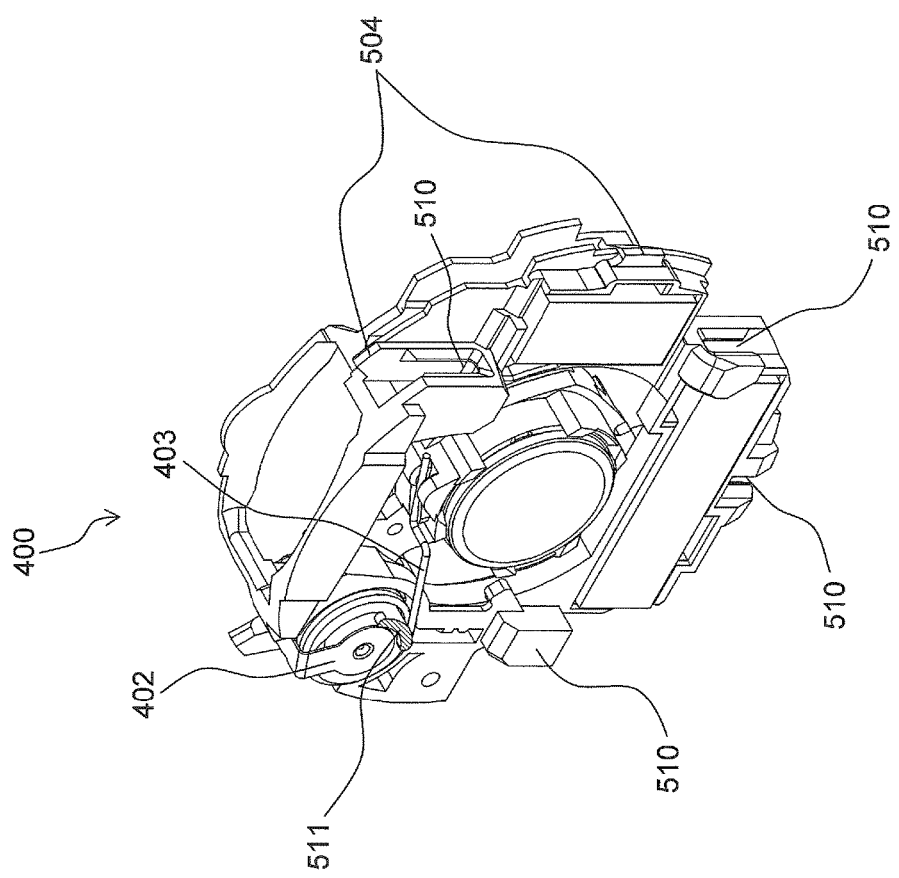
FIG. 14 is an oblique view of the OIS frame to which the retracting lens frame is mounted.

As discussed above, the engagement portions 504 engage with the first restrictor 107 formed on the master flange 105, such as the two protrusions 108 (see FIGS. 5 and 6). As shown in FIGS. 10 and 14, the engagement portions 504 are formed integrally with the second main body portion 500. More specifically, the engagement portions 504 are portions that protrude outward from the outer peripheral part of the second main body portion 500. These two engagement portion 504 respectively engage with the two protrusions 108 of the master flange 105. More specifically, the engagement portions 504 are pressed by the protrusions 108 of the master flange 105. This restricts the in-plane movement of the OIS frame 400.

More precisely, as shown in FIG. 6, when the lens barrel 20 changes from its imaging enabled state to its retracted state, the OIS frame 400 moves in the optical axis direction with respect to the shutter unit 250. The two protrusions 108 of the master flange 105 then respectively engage with the two protrusions of the OIS frame 400, which restricts the in-plane movement of the OIS frame 400. More precisely, first the engagement portions 504 respectively come into contact with the sloped faces formed on the inner peripheral side of the distal ends of the protrusions 108, such as the inner peripheral side of the distal ends of the protrusions 108. Next, the engagement portions 504 come into contact with the inner peripheral parts on the proximal end side of the protrusions 108 (the portion excluding the distal ends and including the middle). This guides the OIS frame 400 from the above-mentioned movable orientation to the movement restricted orientation, and restricts the in-plane movement of the OIS frame 400 in the movement restricted orientation.

In the overall configuration, when the lens barrel 20 changes from its imaging enabled state to its retracted state, the shutter unit 250 and the OIS unit 251 move in the optical axis direction with respect to the master flange 105. This movement of the shutter unit 250 and the OIS unit 251 in the optical axis direction causes the master flange 105 to engage with the OIS frame 400 as discussed above, and restricts the in-plane movement of the OIS frame 400.

As shown in FIG. 14, the OIS frame 400 further has a restricted portion 510 and the first stress dispersion portion 511. The restricted portion 510 is the portion that receives the restrictor 420 of the shutter unit 250. Here, when the restrictor 420 is disposed in the interior of the restricted portion 510, the movement of the second main body portion 500 in the optical axis direction is restricted with respect to the shutter unit 250. Meanwhile, the OIS frame 400 is movable within the plane that is perpendicular to the optical axis AX with respect to the shutter unit 250.

The first stress dispersion portion 511 is the portion that comes into contact with the shutter unit 250 when the pressing portion 605 of the retracting lens frame 401 (discussed below) is pressed. The first stress dispersion portion 511 is provided to the OIS frame 400 at a position closer to the pressing portion 605 than the restricted portion 510. The first stress dispersion portion 511 is formed in an arc shape having a specific width. Here, the width of the first stress dispersion portion 511 is less than the width of the second stress dispersion portion 422. However, the second stress dispersion portion 422 may be formed so that its width becomes less than the width of the first stress dispersion portion 511.

As shown in FIGS. 10 and 11, the OIS frame 400 further has an anti-detachment portion 530 (restrictor of the OIS frame 400). The anti-detachment portion 530 is the portion that restricts detachment of the retracting lens frame 401 from the OIS frame 400 (the second main body portion 500). The anti-detachment portion 530 is formed integrally with the retraction shaft portion 501. The anti-detachment portion 530 is provided a specific distance away from the second main body portion 500. The anti-detachment portion 530 is formed near the retraction shaft 501b.

Retracting Lens Frame

Figure 15A:
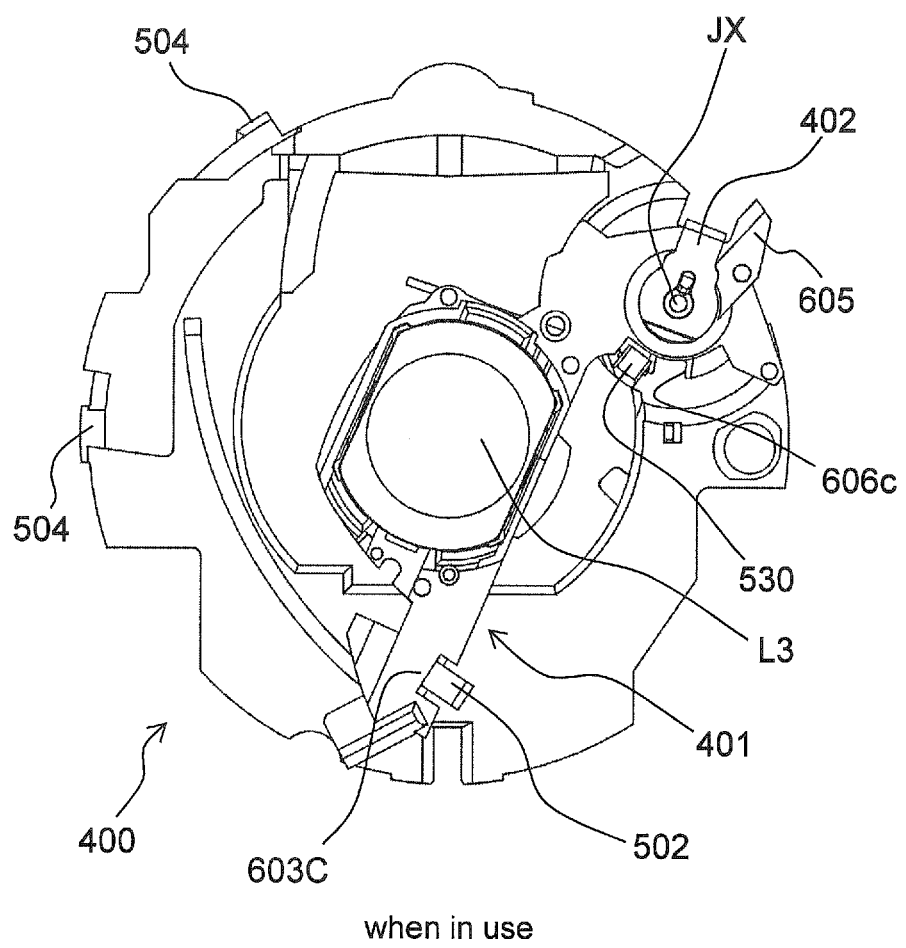
FIG. 15A is a diagram of the OIS frame to which the retracting lens frame is mounted, as viewed from the imaging element side (imaging enabled state)
Figure 15B:
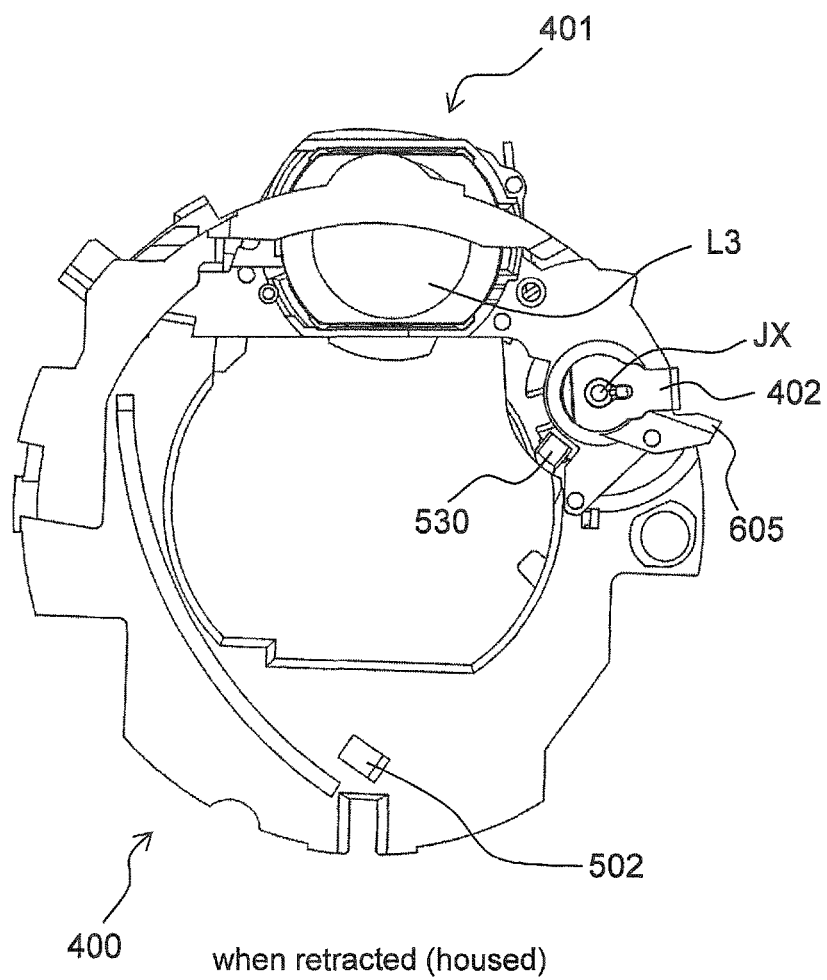
FIG. 15B is a diagram of the OIS frame to which the retracting lens frame is mounted, as viewed from the imaging element side (retracted state)

The retracting lens frame 401 supports at least one lens. As shown in FIGS. 15A and 15B, the retracting lens frame 401 supports the third lens group L3, which is made up of four lenses. The retracting lens frame 401 is supported by the OIS frame 400 (see FIG. 10). The retracting lens frame 401 moves around the retraction shaft 501b, which is substantially parallel to the optical axis AX, when retracting. Consequently, the retracting lens frame 401 is disposed at a position that is shifted from the optical axis AX during retraction.

As shown in FIGS. 15A and 15B, the retracting lens frame 401 moves around the retraction shaft 501b (axis JX) that is substantially parallel to the optical axis AX, when the lens barrel 20 changes from its imaging enabled state to its retracted state. More precisely, the position of the retracting lens frame 401 changes from a first orientation in which the third lens group L3 executes shake correction, to a second orientation in which the third lens group L3 is retracted from the optical axis AX, when the lens barrel 20 changes from its imaging enabled state to its retracted state.

Figure 16:
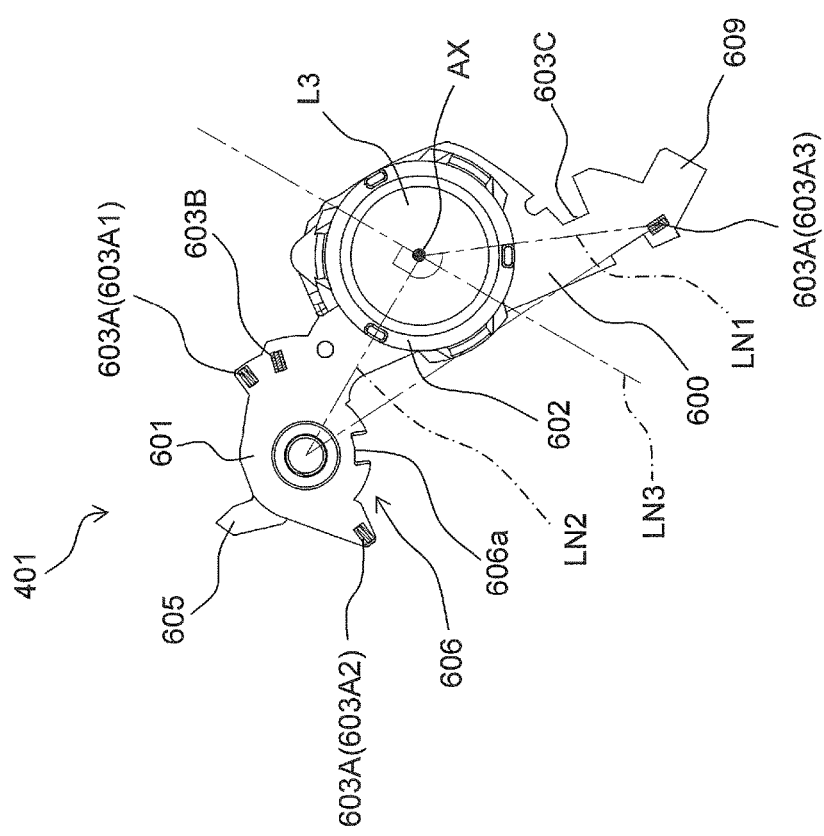
FIG. 16 is a side view of the retracting lens frame.

As shown in FIGS. 16 and 17, the retracting lens frame 401 has a main body portion 600 (third main body portion 600) of the retracting lens frame 401, a shaft support 601 (an example of a bearing), a lens support 602, and the plurality of contact portions 603 (603A to 603C). The shaft support 601 is the portion that engages with the above-mentioned retraction shaft 501b (see FIG. 11). The shaft support 601 rotatably supports the retraction shaft 501b. The shaft support 601 is a hole into which the retraction shaft 501b is inserted, and this hole is formed in the third main body portion 600.

As shown in FIG. 17, the shaft support 601 (hole) has at least two contact faces 601a that come into contact with the retraction shaft 501b. More precisely, the two contact faces 601a are formed on the inner peripheral face of the shaft support 601. The two contact faces 601a are formed on the shaft support 601 on the proximal end side of the retraction shaft 501b, that is, on the opening side of the shaft support 601 (hole) (see FIG. 11). The two contact faces 601a are formed on the inner peripheral face of the shaft support 601 so as to be in a mutually non-parallel relation. More specifically, when viewed in the depth direction, the shaft support 601 (hole) is formed in the inner peripheral face of the shaft support 601 so that the two contact faces 601a are at an angle.

Figure 17A:
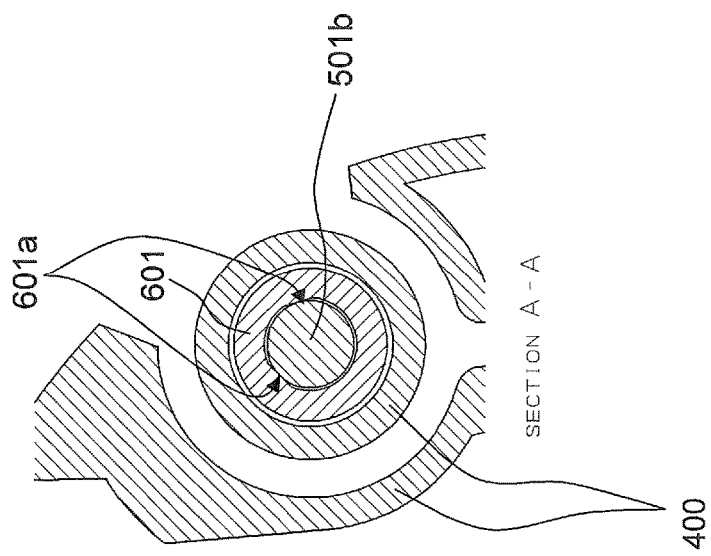
FIG. 17A is a cross section of the support shaft along a plane that is perpendicular to the axis.

As shown in FIG. 17A, the two contact faces 601a (hereinafter referred to as V-faces) come into contact with the outer peripheral face of the retraction shaft 501b. More specifically, as shown in FIG. 17A, the retracting lens frame 401 is biased by the biasing force F0 of the rotary spring 403, and the component force F1 of this biasing force F0 causes the V-faces 601a formed on the shaft support 601 of the retracting lens frame 401 to come into contact with the outer peripheral face of the retraction shaft 501b. This allows the retraction shaft 501b to be positioned accurately with respect to the shaft support 601 of the retracting lens frame 401. More precisely, precision with respect to the eccentricity of the retraction shaft 501b can be improved. In FIG. 17A, F1 and F2 are components of the biasing force F0.

The lens support 602 shown in FIG. 16 is the portion that supports the third lens group L3 (four lenses). The lens support 602 is substantially in cylindrical in form, and supports the third lens group L3 on its inner peripheral part. In a state in which the retracting lens frame 401 has been mounted to the shutter unit 250, the lens support 602 is disposed in the approximate middle of the shutter unit 250 in the optical axis direction (the approximate middle in the thickness direction).

The plurality of contact portions 603 shown in FIG. 16 are, for example, made up of three first contact portions 603A (603A1, 603A2, and 603A3), the second contact portion 603B, and a third contact portion 603C. The three first contact portions 603A, the second contact portion 603B, and the third contact portion 603C are formed on the third main body portion 600 at different positions from the shaft support 601. In other words, the three first contact portions 603A, the second contact portion 603B, and the third contact portion 603C are formed on the third main body portion 600 at different positions from the retraction shaft 501b supported by the shaft support 601. Also, the three first contact portions 603A, the second contact portion 603B, and the third contact portion 603C are formed on the third main body portion 600 at different positions from the retraction shaft 501b so as to allow contact with the OIS frame 400.

More precisely, two of the contact portions 603A1 and 603A2 of the three first contact portions 603A, and the second contact portion 603B are formed on the third main body portion 600 near the retraction shaft 501b. The two contact portions 603A1 and 603A2 are formed on the third main body portion 600 so that the retraction shaft 501b is positioned between these two contact portions 603A1 and 603A2.

The second contact portion 603B is formed on the third main body portion 600 so that the retraction shaft 501b is positioned between one of the two contact portions 603A1 and 603A2 and the second contact portion 603B. Also, the other first contact portion 603A3 besides these two contact portions 603A1 and 603A2, and the third contact portion 603C are formed on the third main body portion 600 at positions that are away from the retraction shaft 501b.

As shown in FIG. 16, a specific first contact portion 603A (603A3) is formed on the third main body portion 600 so that the angle formed by a first line segment LN1 that connects the optical axis AX of the third lens group L3 supported by the lens support 602 to a specific first contact portion 603A, and a second line segment LN2 that connects the optical axis AX of the third lens group L3 supported by the lens support 602 to the retraction shaft 501b becomes an obtuse angle. The "specific first contact portion 603A" is at least one contact portion from among the three first contact portions 603A. Here, the first contact portion 603A3 formed at the position farthest away from the retraction shaft 501b corresponds to the specific first contact portion.

In other words, the first contact portion formed at the position farthest away from the retraction shaft 501b is formed on the third main body portion 600 so that a specific straight line LN3 is disposed between the retraction shaft 501b and the above-mentioned specific first contact portion 603A. The specific straight line LN3 passes through the optical axis AX of the third lens group L3 supported by the lens support 602, and is perpendicular to the second line segment LN2 that connects the retraction shaft 501b to the optical axis AX of the third lens group L3 supported by the lens support 602.

Figure 18:
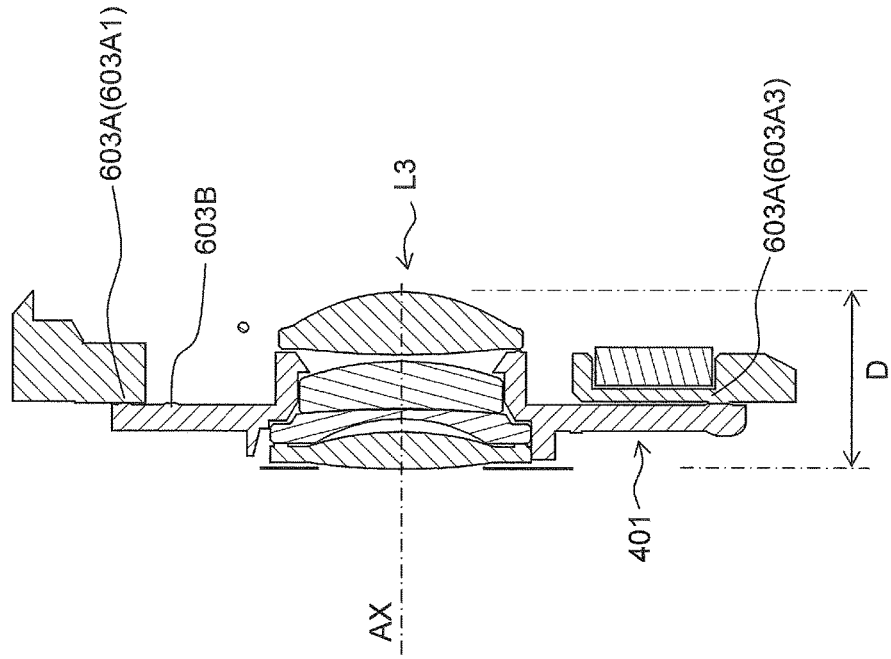
FIG. 18 is a cross section of the positional relation between a third lens group and a contact portion.

As shown in FIG. 18, at least one of the three first contact portions 603A (603A1, 603A2, and 603A3), the second contact portion 603B, and the third contact portion 603C is formed on the third main body portion 600 so as to overlap the third lens group L3 in a direction perpendicular to the optical axis AX. In other words, at least one of the three first contact portions 603A, the second contact portion 603B, and the third contact portion 603C is provided to the retracting lens frame 401 so as to overlap the third lens group L3 within a range D of the thickness of the third lens group L3. Here, the three first contact portions 603A, the second contact portion 603B, and the third contact portion 603C are provided to the retracting lens frame 401 so as to overlap the third lens group L3 in a direction perpendicular to the optical axis AX within the range D of the thickness of the third lens group L3. Here, at least three of the three first contact portions 603A (603A1, 603A2, and 603A3), the second contact portion 603B, and the third contact portion 603C is configured to come into contact with the OIS frame 400. Specifically, if at least three contact portions out of the three first contact portions 603A and the second contact portion 603B come into contact with the OIS frame 400, this restricts the movement of the retracting lens frame 401 in the optical axis direction.

More precisely, if at least three contact portions out of the three first contact portions 603A and the second contact portion 603B come into contact with the rail portions 503 of the OIS frame 400 (see FIG. 14), this restricts the movement of the retracting lens frame 401 in the optical axis direction. More specifically, when the lens barrel 20 is in its imaging enabled state, the three first contact portions 603A1, 603A2, and 603A3 respectively come into contact with the rail portions 503a, 503b, and 503c of the OIS frame 400. Here, the first contact portion 603A1 comes into contact with the rail portion 503a, the first contact portion 603A2 comes into contact with the rail portion 503b, and the first contact portion 603A3 comes into contact with the rail portion 503c. In this case, the second contact portion 603B does not come into contact with the rail portions 503.

On the other hand, when the lens barrel 20 is in its retracted state, the two first contact portions 603A2 and 603A3 and the second contact portion 603B respectively come into contact with the rail portions 503a, 503b, and 503c of the OIS frame 400. Here, when the lens barrel 20 has changed from the imaging enabled state to the retracted state, one of the three first contact portions 603A, such as the first contact portion 603A1, separates from the rail portion 503, and the second contact portion 603B comes into contact with that rail portion 503. Thus having at least three contact portions out of the three first contact portions 603A and the second contact portion 603B come into contact with the rail portions 503 of the OIS frame 400 reliably restricts the movement of the retracting lens frame 401 in the optical axis direction.

The third contact portion 603C comes into contact with the OIS frame 400 when the lens barrel 20 changes from the imaging enabled state to the retracted state. This will be discussed in detail below.

As shown in FIG. 16, the retracting lens frame 401 further has the pressing portion 605 and an engagement portion 606. The pressing portion 605 is the portion that is pressed when the retracting lens frame 401 changes from the imaging enabled state to the retracted state. More precisely, when the retracting lens frame 401 changes from the imaging enabled state to the retracted state, the pressing portion 605 is pressed by the first retracting cam 125 and the second retracting cam 126 provided to the master flange (see FIG. 5). When the pressing portion 605 is thus pressed, the load exerted on the restrictor 420 and the restricted portion 510 is limited by allowing the first stress dispersion portion 511 (FIG. 14) and the second stress dispersion portion 422 (see FIG. 9) to come into contact with each other.

The engagement portion 606 is the portion that engages with the anti-detachment portion 530. At the retracting lens frame 401, if the engagement portion 606 is disposed between the second main body portion 500 (the main body portion of the OIS frame 400) and the anti-detachment portion 530 (see FIG. 11), detachment of the retracting lens frame 401 in the optical axis direction is restricted. As shown in FIG. 16, the engagement portion 606 is formed integrally with the shaft support 601. The engagement portion 606 is formed in an arc shape. A cut-out 606c is formed in the engagement portion 606. The engagement portion 606 is disposed between the anti-detachment portion 530 and the third main body portion 600 by introducing the anti-detachment portion 530 into the cut-out 606c.

Thrust Spring

The thrust spring 402 is a spring that biases the retracting lens frame 401 with respect to the OIS frame 400. As shown in FIGS. 8 and 11, the thrust spring 402 is mounted to the OIS frame 400 and/or the retracting lens frame 401.

The thrust spring 402 has a pair of opposing parts 440 and a linking portion 441 that links the two opposing parts 440. One of the two opposing parts 440 (the first opposing part 440a) is mounted to the OIS frame 400, and the other opposing part 440 (the second opposing part 440b) is mounted to the retracting lens frame 401. More precisely, as shown in FIG. 11, in a state in which the retraction shaft 501b of the OIS frame 400 is supported by the shaft support 601 of the retracting lens frame 401, the first opposing part 440a is mounted to the OIS frame 400, and the second opposing part 440b is mounted to the retracting lens frame 401. Consequently, the thrust spring 402 clamps the OIS frame 400 and the retracting lens frame 401.

Consequently, the thrust spring 402 brings at least two of the contact portions 603 into contact with the OIS frame 400. Here, the thrust spring 402 brings at least two of the contact portions out of the two first contact portions 603A (603A1 and 603A2) and the second contact portion 603B formed near the retraction shaft 501b (the shaft support 601) into contact with the OIS frame 400.

Rotary Spring

Figure 17B:
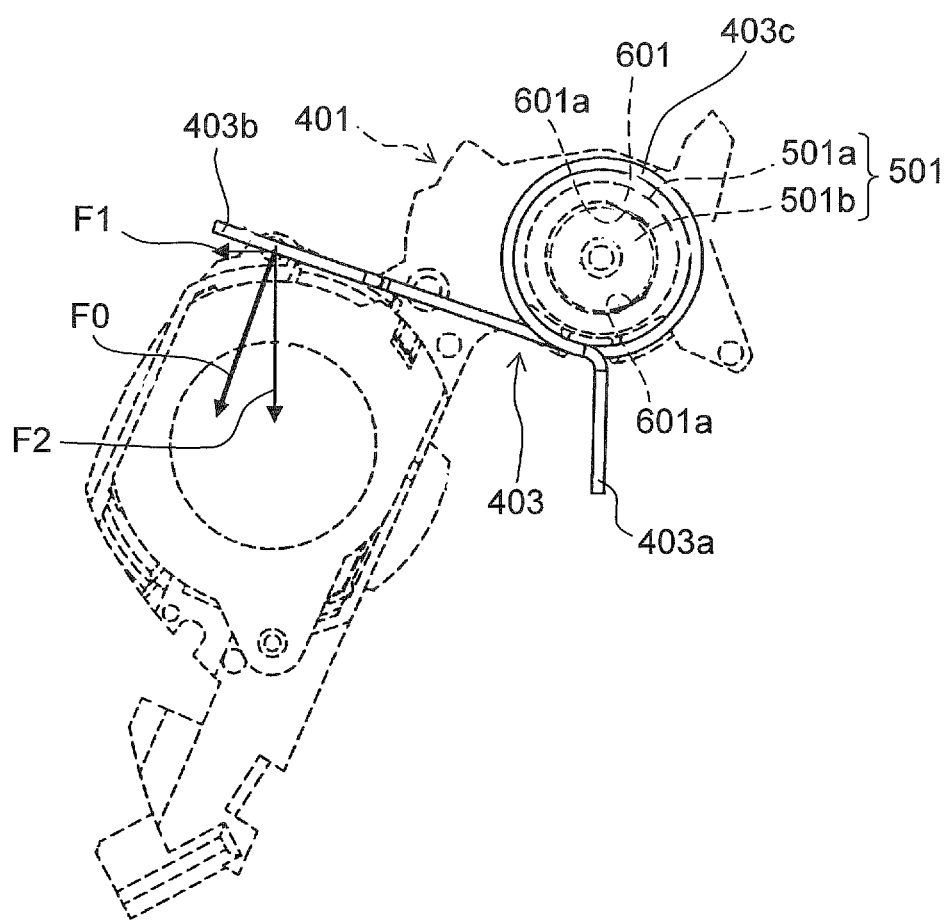
FIG. 17B is a diagram of the correspondence between the retracting lens frame and a rotary spring (part 1)

The rotary spring 403 is a spring that biases the retracting lens frame 401 around the retraction shaft 501b. The rotary spring 403 shown in FIG. 8 is supported by the OIS frame 400. The rotary spring 403 is a torsion coil spring, for example. As shown in FIGS. 11 and 17B, a portion 403c of the coil of the rotary spring 403 (the coil part) is mounted around the outside of the cylindrical part 501a of the retraction shaft portion 501. One end 403a of the rotary spring 403 is mounted in a groove 444 formed in the OIS frame 400. The other end 403b of the rotary spring 403 is mounted in a groove 445 formed in the retracting lens frame 401.

When the rotary spring 403 biases the retracting lens frame 401, the third contact portion 603C of the retracting lens frame 401 comes into contact with the sloped face 502a of the OIS frame 400. The third contact portion 603C is then guided by the sloped face 502a, and the retracting lens frame 401 approaches the OIS frame 400. This positions the retracting lens frame 401 with respect to the OIS frame 400. In this state, the first contact portion 603A3 is in contact with the OIS frame 400.

As shown in FIG. 17b, in this embodiment, when the rotary spring 403 is viewed in the center axis direction of the coil part 403c, the other end 403B of the rotary spring 403 is in the form of a straight line. Instead, as shown in FIG. 17C, the distal end 403b2 of the other end 403B of the rotary spring 403 may be bent with respect to the proximal end 403b1 (the portion near the coil part 403c).

More specifically, using the proximal end 403b1 of the rotary spring 403 as a reference, the distal end 403b2 of the rotary spring 403 is bent. In other words, using the proximal end 403b1 as a reference, the distal end 403b2 is bent in the rotation direction of the retracting lens frame 401. Even more specifically, using the proximal end 403b1 as a reference, the distal end 403b2 is bent so as to move closer to the coil part 403c.

In this case, a spring receiver 607 is formed on the retracting lens frame 401, and the distal end 403b2 of the other end 403B of the rotary spring 403 comes into contact with this spring receiver 607.

Figure 17C:
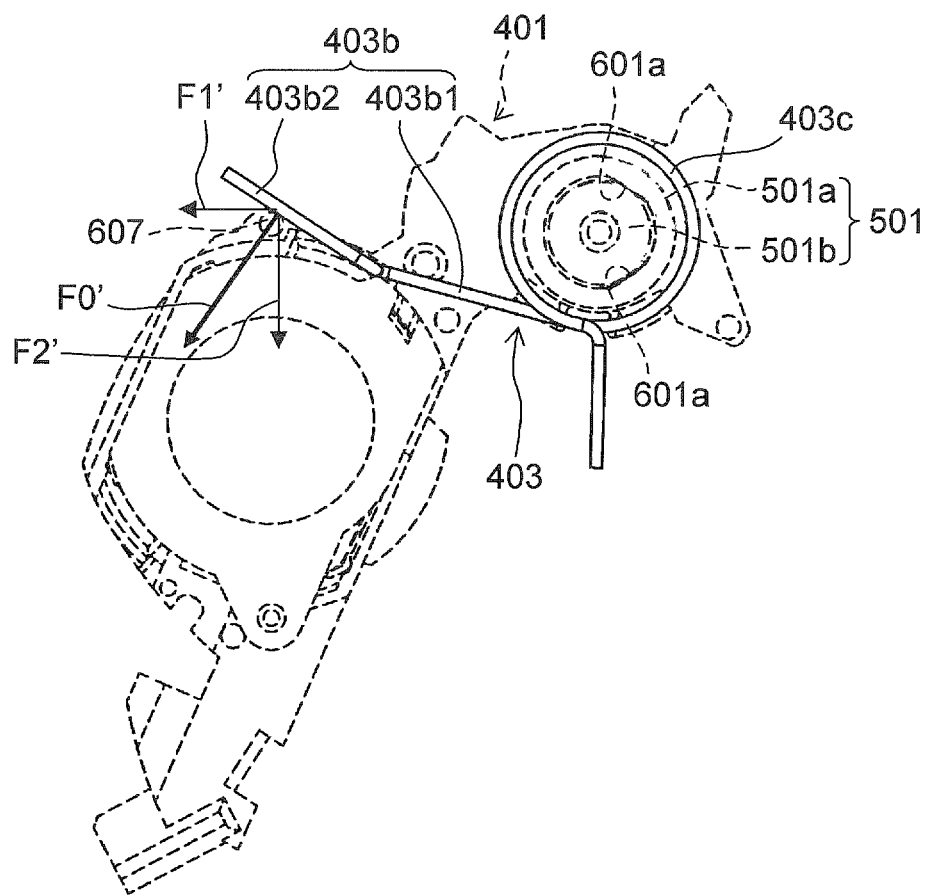
FIG. 17C is a diagram of the correspondence between the retracting lens frame and a rotary spring (part 2)

As a result of this configuration, as shown in FIG. 17C, the component force F1' of the biasing force F0' of the rotary spring 403 causes the V-faces 601a formed in the shaft support 601 of the retracting lens frame 401 to come into contact with the outer peripheral face of the retraction shaft 501b. n FIG. 17C, the component force F1' at which the V-faces 601a of the retracting lens frame 401 are brought into contact with the outer peripheral face of the retraction shaft 501b is greater than that in FIG. 17B (F1'>F1). Consequently, the retraction shaft 501b is positioned more reliably with respect to the shaft support 601 of the retracting lens frame 401. More precisely, accuracy with respect to the eccentricity of the retraction shaft 501b can be improved more reliably. In FIG. 17C, F1' and F2' are components of the biasing force F0'.

The amount and direction of the component force F1' by which the V-faces 601a are biased toward the retraction shaft vary with the position where the V-faces are formed. Specifically, the bending of the rotary spring 403 and the formation position of the V-faces 601a in FIG. 17B are just examples given to illustrate this technology. Therefore, the bending of the rotary spring 403 is not limited to how it is done in this embodiment, and any way is fine as long as the component force F1' by which the V-face are biased toward the retraction shaft can be increased.

3-3. Actuator

Figure 19:
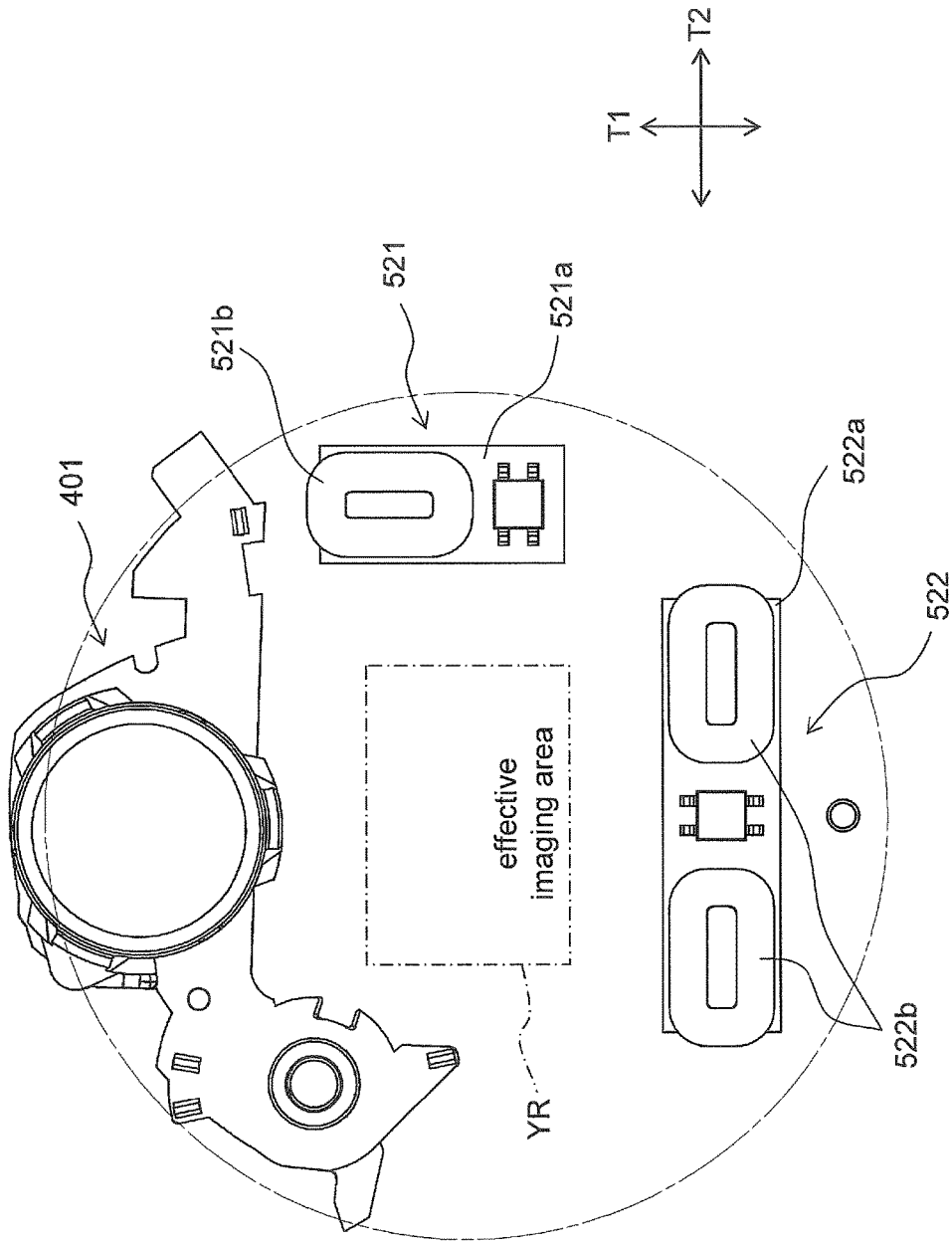
FIG. 19 is a diagram of the layout of an actuator and the retracting lens frame.
Figure 20:
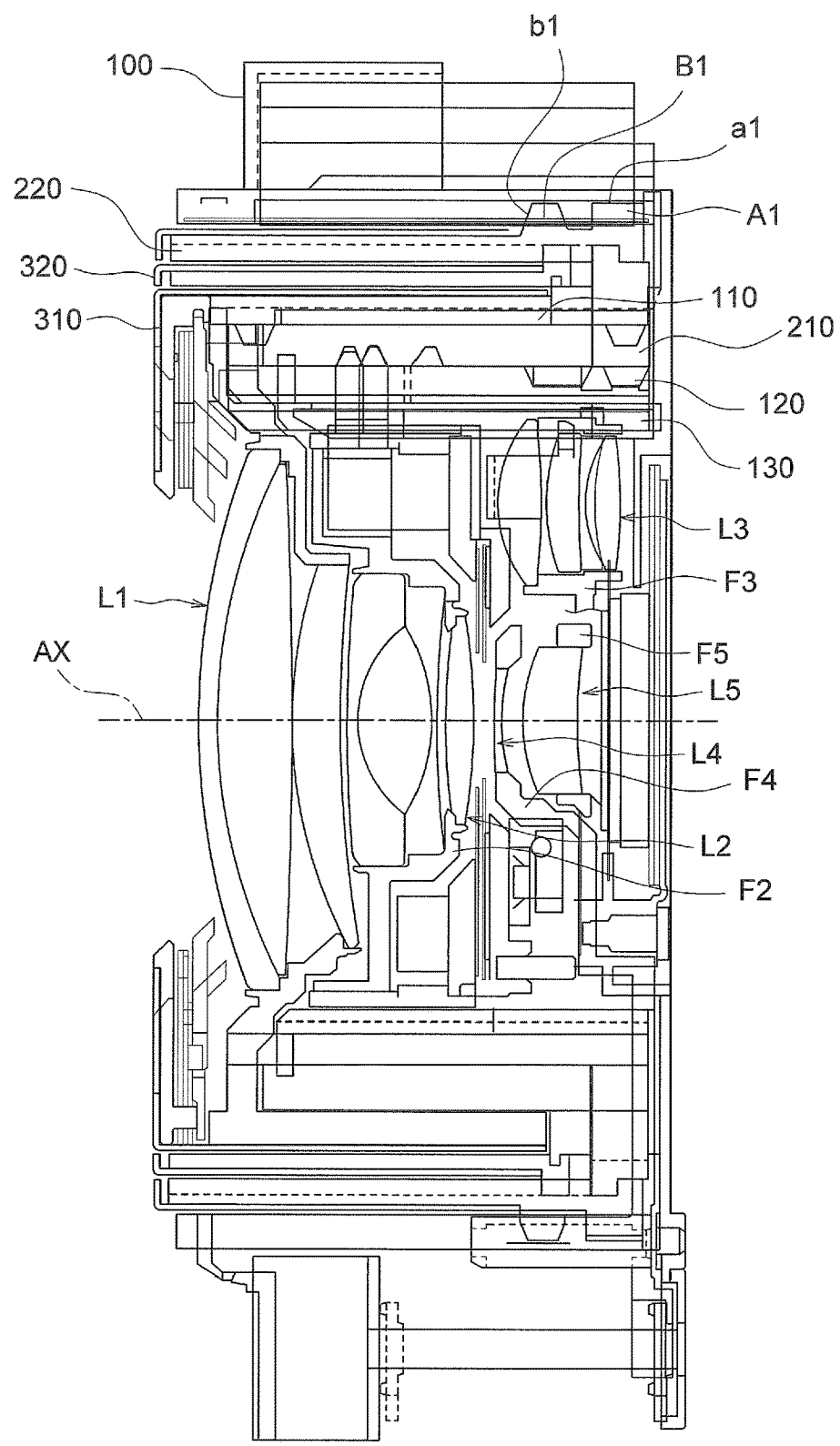
FIG. 20 is a simplified cross section of the lens group in its retracted state.
Figure 21:
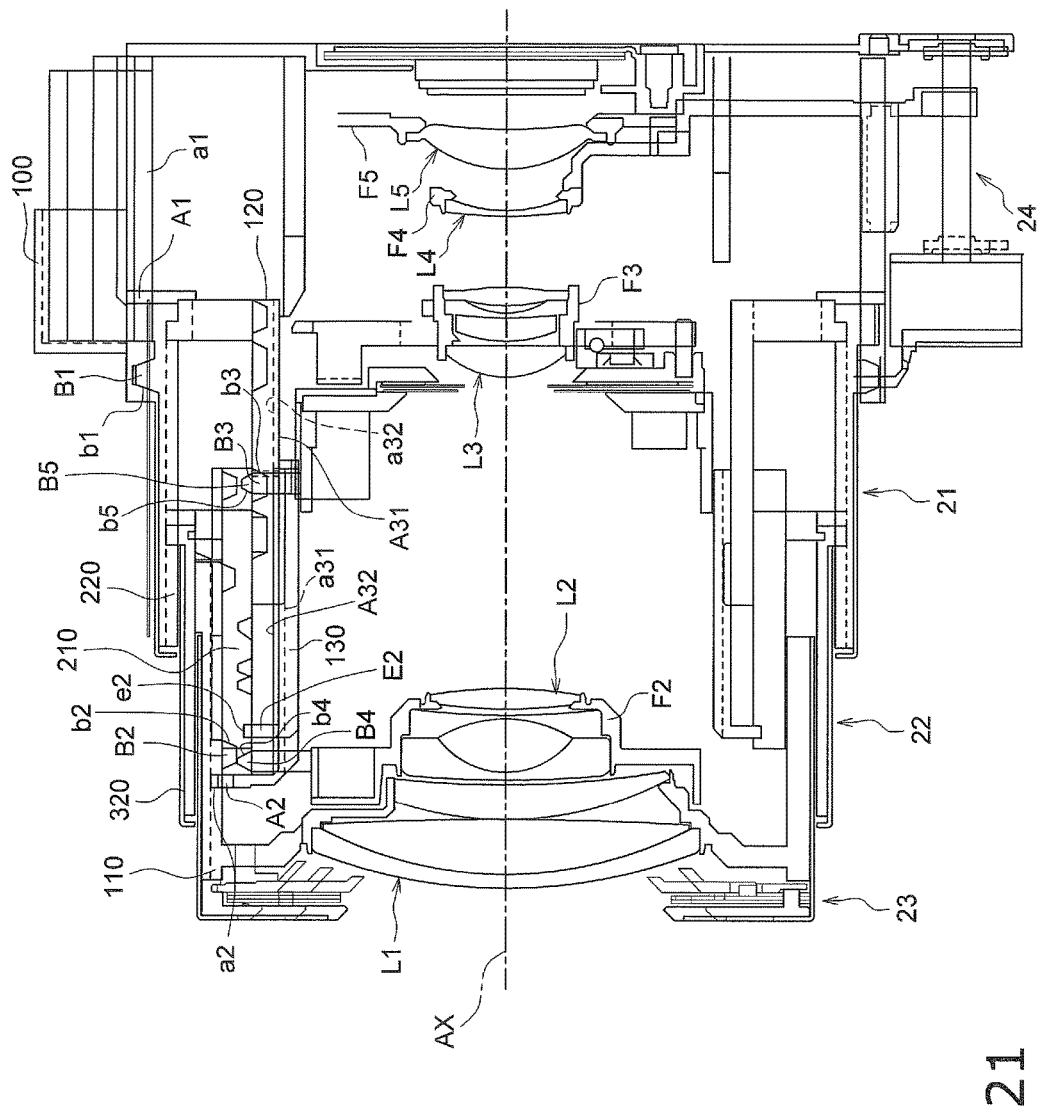
FIG. 21 is a simplified cross section of the lens group in its wide angle state.
Figure 22:
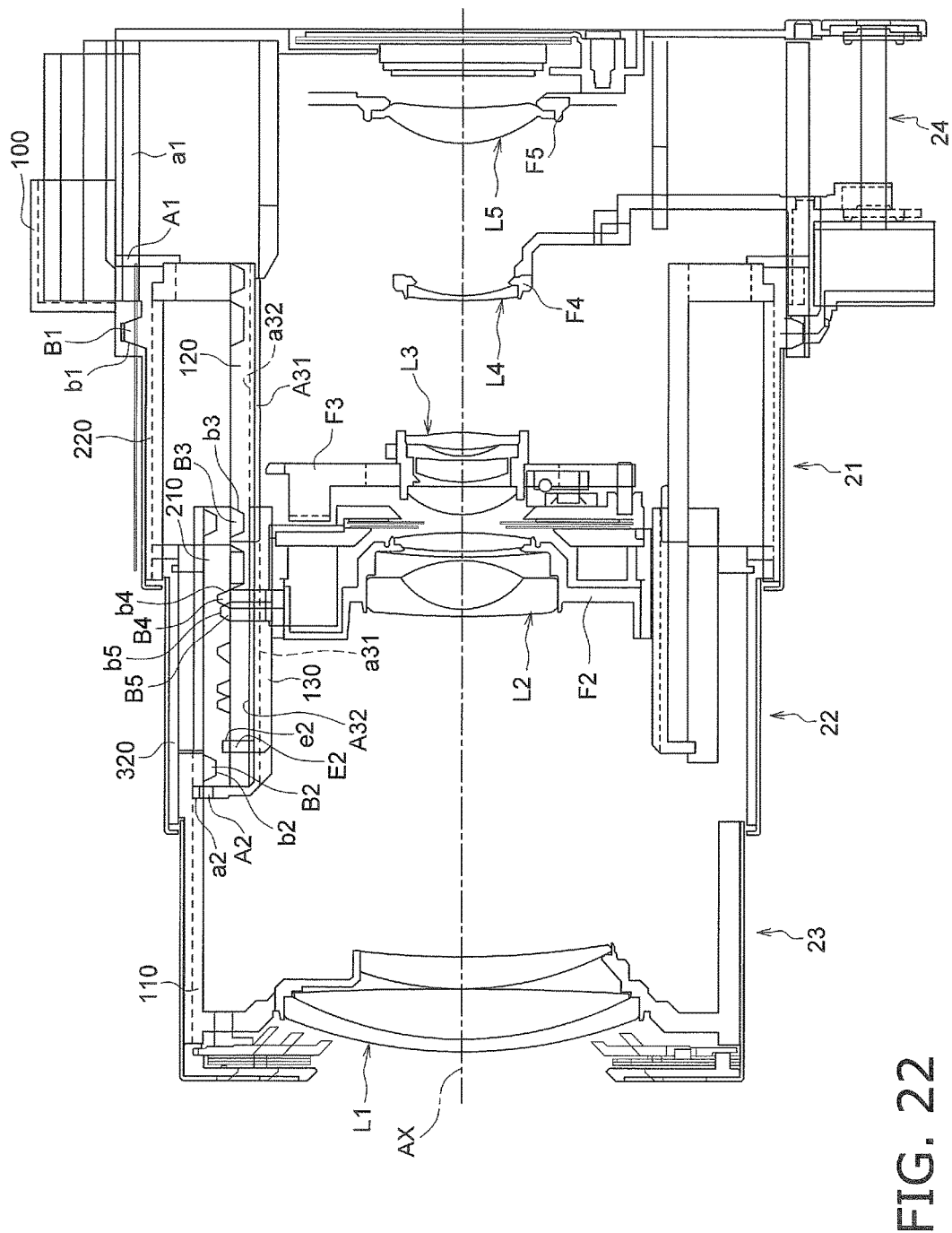
FIG. 22 is a simplified cross section of the lens group in its telephoto state.

The actuator 520 is mounted to the third lens group frame F3. More precisely, as shown in FIG. 19, the actuator 520 is disposed on the third lens group frame F3, using an effective imaging range YR as a reference. The effective imaging range YR is defined by the imaging element 103 mounted to the master flange 105. In this embodiment, the effective imaging range YR is formed in a rectangular shape.

As shown in FIG. 19, the actuator 520 has a first actuator 521 and a second actuator 522. The first actuator 521 moves the OIS frame 400 in a short-side direction T1 (first direction) of the effective imaging range YR. The first actuator 521 is disposed on one short side of the effective imaging range YR. The first actuator 521 is made up of a magnet 521a and a coil 521b. The magnet 521a is mounted to the OIS frame 400, and the coil 521b is mounted to the shutter unit 250 at a position opposite the magnet 521a.

As shown in FIG. 19, the second actuator 522 moves the OIS frame 400 in a long-side direction T2 (second direction)

of the effective imaging range YR. The second actuator 522 is larger than the first actuator 521. The second actuator 522 is disposed on one long side of the effective imaging range YR. More specifically, the second actuator 522 is disposed on the lower long side of the effective imaging range YR. The second actuator 522 is made up of a magnet 522a and two coils 522b. The magnet 522a is mounted to the OIS frame 400, and the two coils 522b are mounted to the shutter unit 250 at a position opposite the magnet 522a. The retracting lens frame 401 moves along the other long side of the effective imaging range YR (such as the upper long side).

In this state, when power is supplied from a camera circuit (not shown) to the coils 521b and 522b of the shutter unit 250, current flows and a magnetic field is generated in the coils 521b and 522b. This magnetic field drives the magnets 521a and 522a of the OIS frame 400, and this drive force causes the OIS frame 400 to move in a plane that is perpendicular to the optical axis AX. More precisely, the OIS frame 400 is moved by the first actuator 521 in the short-side direction, and is moved by the second actuator 522 in the long-side direction.

4. Engagement of Frames

FIGS. 5 to 7 are cross sections of the lens barrel 20. However, FIGS. 5 to 7 are simplified diagrams that combine a plurality of cross sections passing through the optical axis AX. In FIG. 5 the lens barrel 20 is shown in its retracted state, in FIG. 6 the lens barrel 20 is shown in its wide angle state, and in FIG. 7 the lens barrel 20 is shown in its telephoto state.

As shown in FIG. 5, in the retracted state, the second rotary frame 220, the second cosmetic frame 320, the first cosmetic frame 310, the first rectilinear frame 110, the first rotary frame 210, the second rectilinear frame 120, and the third rectilinear frame 130 are housed in that order on the inside in the radial direction of the stationary frame 100. Also, in the retracted state, the third lens group L3 retracts outward in the radial direction of the fourth and fifth lens groups L4 and L5, which allows the lens barrel 20 to be more compact in the optical axis direction.

The engagement of the frames will now be described through reference to FIGS. 6 and 7.

The gear part 221 of the second rotary frame 220 meshes with the zoom gear 102 (not shown). The cam protrusion B1 of the second rotary frame 220 is engaged with the cam groove b1 of the stationary frame 100. Consequently, the second rotary frame 220 moves in the optical axis direction while rotating in the peripheral direction under the drive force of the zoom motor 101.

The rectilinear protrusion A1 of the second rectilinear frame 120 is engaged with the rectilinear groove a1 of the stationary frame 100. The bayonet protrusion E1 of the second rectilinear frame 120 is engaged with the bayonet groove e1 of the second rotary frame 220. Therefore, the second rectilinear frame 120 moves in the optical axis direction along with the second rotary frame 220.

The rectilinear protrusion A4 of the first rotary frame 210 is engaged with the rectilinear groove a4 of the first rotary frame 210. The cam protrusion B3 of the first rotary frame 210 is engaged with the cam groove b3 of the second rectilinear frame 120. Therefore, the first rotary frame 210 moves in the optical axis direction along with the second rectilinear frame 120 while rotating in the peripheral direction along with the first rotary frame 210.

The cam protrusion B2 of the first rectilinear frame 110 is engaged with the cam groove b2 of the first rotary frame 210. The rectilinear protrusion A2 of the third rectilinear frame 130 is engaged with the rectilinear groove a2 of the first rectilinear frame 110. Therefore, the first rectilinear frame 110 moves in the optical axis direction according to the rotation of the first rotary frame 210.

The bayonet protrusion E2 of the third rectilinear frame 130 is engaged with the bayonet groove e2 of the second rotary frame 220. The rectilinear protrusion A2 of the third rectilinear frame 130 is engaged with the rectilinear groove a2 of the first rectilinear frame 110. Therefore, the third rectilinear frame 130 moves in the optical axis direction along with the first rotary frame 210.

As discussed above, the first rotary frame 210 is engaged with the first rectilinear frame 110 via a cam mechanism, and rotates to move the first rectilinear frame 110 rectilinearly. Also, the second rectilinear frame 120 is engaged with the first rotary frame 210 via a cam mechanism, and moves rectilinearly in the optical axis direction to rotate the first rotary frame 210. Accordingly, the first rotary frame 210 is moved by moving the second rectilinear frame 120 rectilinearly while moving the first rectilinear frame 110 rectilinearly by rotating the first rotary frame 210, by rotating the second rotary frame 220 with the zoom motor 101. As a result, the first to third movable lens barrel parts 21 to 23 are deployed smoothly from the stationary lens barrel part 24.

5. Operation of OIS Unit

Finally, the operation of the OIS unit will be described on the basis of the configuration of the lens barrel 20 discussed above.

First, as shown in FIG. 15A, in the imaging enabled state, the third contact portion 603C of the retracting lens frame 401 comes into contact with the anti-rotation portion 502, which positions the retracting lens frame 401 with respect to the OIS frame 400 in the first orientation (imaging enabled orientation).

Next, when the lens barrel 20 starts changing from its imaging enabled state to its retracted state, the shutter unit 250 approaches the master flange 105 as shown in FIG. 6. The engagement portions 504 of the OIS frame 400 mounted to the shutter unit 250 then come into contact with the distal ends of the protrusions 108 provided to the master flange 105. The distal ends of the protrusions 108 then press on the OIS frame 400. Once the engagement portions 504 of the OIS frame 400 come into contact with the inner peripheral part of the protrusions 108 (the portion more to the proximal end side than the distal end), movement of the OIS frame 400 with respect to the shutter unit 250 is restricted.

Meanwhile, in a state in which the OIS frame 400 is being pressed by the protrusions 108 of the master flange 105, the pressing portion 605 of the retracting lens frame 401 is pressed and guided by the first retracting cam 125 provided to the master flange 105.

More precisely, in a state in which the OIS frame 400 is being pressed by the distal ends of the protrusions 108, the pressing portion 605 of the retracting lens frame 401 comes into contact with and is guided by the first guide portion 125a of the first retracting cam 125 (see FIG. 7), causing the retracting lens frame 401 to start retracting from the first orientation toward the second orientation (retracted orientation).

Then, in a state in which the OIS frame 400 is being pressed by the inner peripheral part on the proximal end side of the protrusions 108 (the portion excluding the distal ends and including the middle), the pressing portion 605 of the retracting lens frame 401 comes into contact with and is guided by the second guide portion 125b of the first retracting cam 125 (see FIG. 7), causing the retracting lens frame 401 to retract further. The pressing portion 605 of the retracting lens frame 401 then comes into contact with the support portion 125c of the first retracting cam 125 (see FIG. 7).

Finally, when the shutter unit 250 further approaches the master flange 105, a positioning portion 609 provided to the retracting lens frame 401 comes into contact with the second retracting cam 126. This positions the retracting lens frame 401 in the retracted position.

Here, the direction in which the protrusions 108 of the master flange 105 press on the engagement portions 504 of the OIS frame 400 is substantially the same as the direction in which the first retracting cam 125 of the master flange 105 presses on the pressing portion 605 of the retracting lens frame 401. In other words, the protrusions 108 of the master flange 105 and the first retracting cam 125 of the master flange 105 press on the engagement portions 504 of the OIS frame 400 and the first retracting cam 125 of the retracting lens frame 401 in the direction in which the OIS frame 400 approaches the shutter unit 250. Thus pressing the engagement portions 504 of the OIS frame 400 and the first retracting cam 125 of the retracting lens frame 401 in substantially the same direction allows the retracting lens frame 401 to be positioned reliably.

Thus, the movement of the OIS frame 400 with respect to the shutter unit 250 is restricted, and the retracting lens frame 401 is positioned with respect to the OIS frame 400 in the second orientation (retracted orientation). At this point, the lens support 602 of the retracting lens frame 401 is housed in the housing portion 550 of the OIS frame 400.

Thus, with this lens barrel 20, when the lens barrel 20 changes from its imaging enabled state to its retracted state, the restriction of movement of the OIS frame 400 and the positioning of the retracting lens frame 401 are executed simultaneously. Specifically, the lens barrel 20 of this embodiment retracts the third lens group L3 used for OIS. Here again, movement of the OIS frame 400 itself is restricted with a restricting mechanism that restricts the movement of the OIS frame 400 (e.g., the relation between the inner peripheral part of the protrusions 108 and the engagement portions 504 of the OIS frame 400), before the third lens group L3 is retracted with a retracting mechanism (e.g., the relation between the pressing portion 605 of the retracting lens frame 401 and the first retracting cam 125 provided to the master flange 105). This allows the third lens group L3 to be retracted more reliably.

6. Action and Effect (1) This lens barrel 20 comprises the master flange 105, the shutter unit 250, the OIS frame 400, and the retracting lens frame 401. The shutter unit 250 is supported by the master flange 105. The OIS frame 400 is supported by the shutter unit 250, and is movable within a plane that is perpendicular to the optical axis with respect to the shutter unit 250. The retracting lens frame 401 is supported by the OIS frame 400, and moves around the retraction shaft 501b, which is substantially parallel to the optical axis, during the transition period between the imaging enabled state and the housed state. The shutter unit 250, the OIS frame 400, and the retracting lens frame 401 move in the optical axis direction with respect to the master flange 105 during the transition period between the imaging enabled state and the housed state. The master flange 105 restricts in-plane movement of the OIS frame 400 during the transition period between the imaging enabled state and the housed state.

With this lens barrel 20, the master flange 105 restricts in-plane movement of the OIS frame 400 during the transition period between the imaging enabled state and the housed state. Consequently, in the housed state, there is no need to provide clearance or the like for avoiding contact with members caused by in-plane movement of the OIS frame 400, so the lens barrel 20 can be more compact.

(2) With this lens barrel 20, the master flange 105 has the first restrictor 107 that restricts the movement of the OIS frame 400 during the transition period between the imaging enabled state and the housed state. The OIS frame 400 has the engagement portions 504 that engages with the first restrictor 107.

With this lens barrel 20, when the first restrictor 107 of the master flange 105 engages with the engagement portions 504 of the OIS frame 400, in-plane movement of the OIS frame 400 is restricted by the master flange 105 during the transition period between the imaging enabled state and the housed state. Consequently, there is no need to provide the above-mentioned clearance, etc., so the lens barrel can be more compact.

(3) With this lens barrel 20, the first restrictor 107 is a first protrusion that is provided to the master flange 105 and protrudes in the optical axis direction. The engagement portions 504 is a second protrusion that is provided protruding from the outer peripheral part of the OIS frame 400 and comes into contact with the first protrusion.

With this lens barrel, the first restrictor 107 protrudes in the optical axis direction from the master flange 105, and the engagement portions 504 protrudes from the outer peripheral part of the OIS frame 400. With this configuration, the master flange 105 can reliably restrict the in-plane movement of the OIS frame 400 during the transition period between the imaging enabled state and the housed state.

(4) With this lens barrel 20, the master flange 105 restricts the in-plane movement of the OIS frame 400 and retracts the retracting lens frame 401. Specifically, the restriction of the in-plane movement of the OIS frame 400 and the retraction of the retracting lens frame 401 can be accomplished with a single member (the master flange 105), so this improves accuracy during in-plane restriction of the OIS frame 400 and accuracy during retraction of the retracting lens frame 401.

Second Embodiment

Next, a second embodiment of the present technology will be described through reference to FIGS. 23 to 32. The numbers and symbols used in the following description of the second embodiment correspond to the numbers and symbols in FIGS. 23 to 32.

Detailed Configuration of Lens Barrel 20

Figure 23:
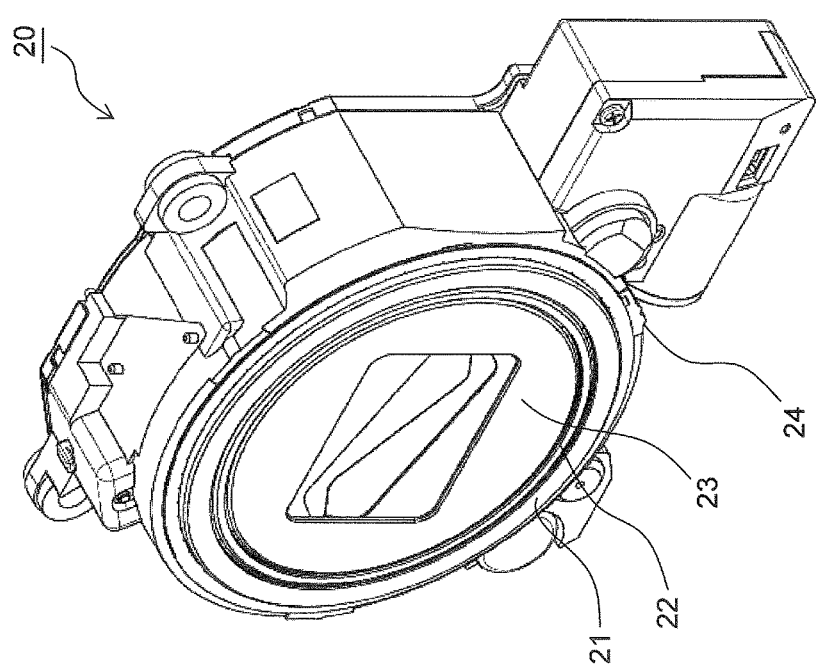
FIG. 23 is an oblique view of the lens barrel pertaining to Embodiment 2.
Figure 24:
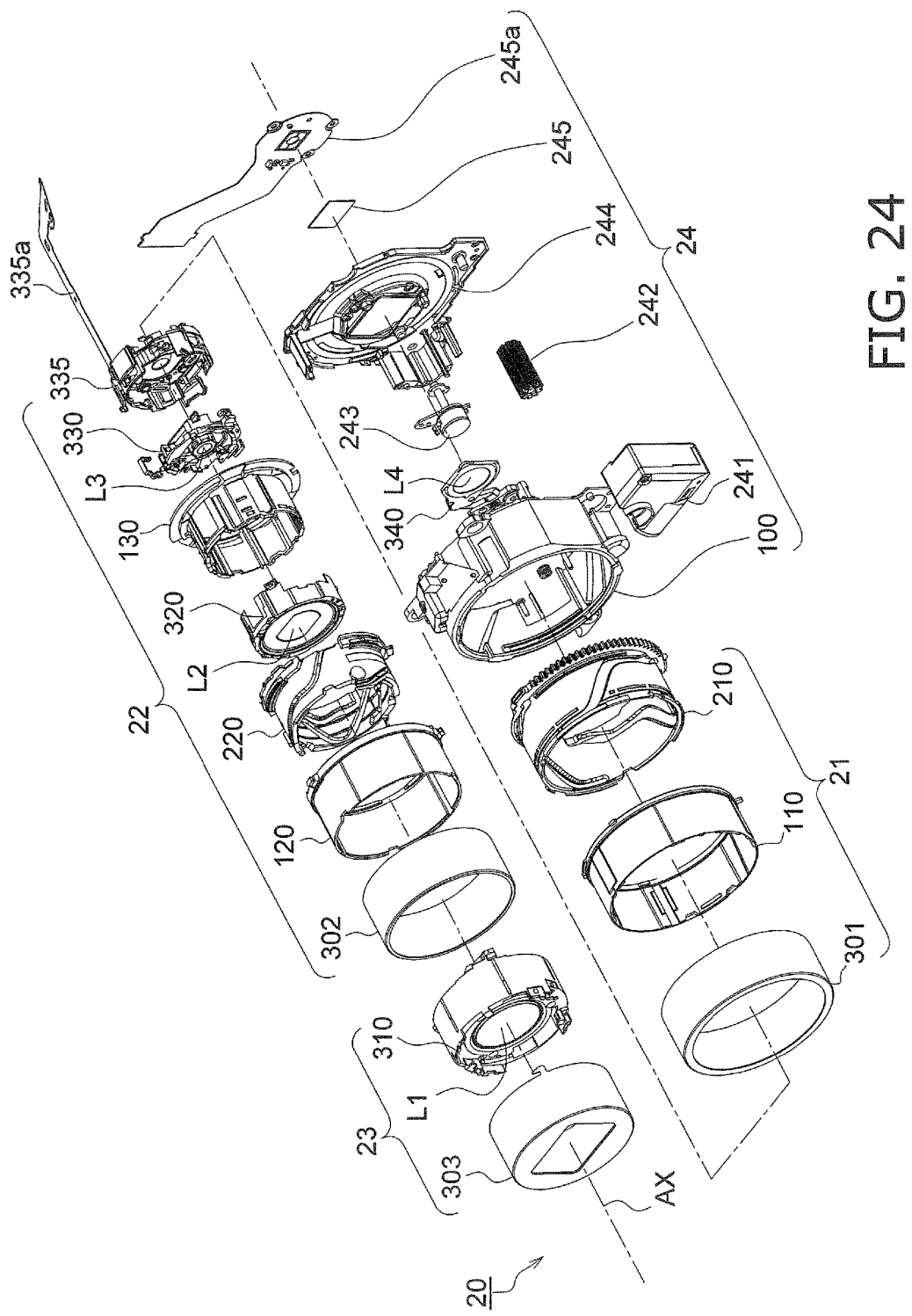
FIG. 24 is an exploded oblique view of the lens barrel.

First, the detailed configuration of the lens barrel 20 will be described through reference to the drawings. FIG. 23 is an oblique view of the lens barrel 20, and FIG. 24 is an exploded oblique view of the lens barrel 20.

The lens barrel 20 comprises a three-stage telescoping zoom mechanism. As shown in FIGS. 23 and 24, the lens barrel 20 has the first movable lens barrel part 21, the second movable lens barrel part 22, the third movable lens barrel part 23, and the stationary lens barrel part 24.

1. First Movable Lens Barrel Part 21

The first movable lens barrel part 21 has the first rectilinear frame 110, the first rotary frame 210, and first cosmetic frame 301. The first rectilinear frame 110 is a cylindrical plastic member disposed on the inside in the radial direction of the stationary frame 100 (discussed below). The first rotary frame 210 is a cylindrical plastic member disposed on the inside in the radial direction of the stationary frame 100. The first cosmetic frame 301 is a cylindrical sheet metal member that covers the outer periphery of the first rectilinear frame 110.

2. Second Movable Lens Barrel Part 22

The second movable lens barrel part 22 has the second rectilinear frame 120, the second rotary frame 220, the third rectilinear frame 130, the second cosmetic frame 320, the second lens group L2, a third lens group frame 330, the third lens group L3, the shutter frame 335, and a second cosmetic frame 302.

The second rectilinear frame 120 is a cylindrical plastic member disposed on the inside in the radial direction of the first rotary frame 210. The second rotary frame 220 is a cylindrical plastic member disposed on the inside in the radial direction of the second rectilinear frame 120.

The third rectilinear frame 130 is a cylindrical plastic member disposed on the inside in the radial direction of the second rotary frame 220. The second cosmetic frame 320 is disposed on the inside in the radial direction of the third rectilinear frame 130, and supports the second lens group L2 used for zooming. The third lens group frame 330 is housed in the shutter frame 335 and supports the third lens group L3 used for image blur correction. The third lens group frame 330 is supported by the shutter frame 335 pivotably in the radial direction, and along with the third lens group L3 constitutes an image blur correction mechanism.

The shutter frame 335 is disposed on the inside in the radial direction of the third rectilinear frame 130, and has a built-in shutter mechanism. The shutter frame 335 supports the third lens group frame 330 pivotably in the radial direction. A control-use flexible wire 335*a* is connected to the shutter frame 335.

The control-use flexible wire 335*a* is disposed along the inner peripheral face of the stationary frame 100, and is connected to a control device (not shown). The control-use flexible wire 335*a* transmits control signals to the shutter mechanism or image blur correction mechanism (discussed below). The second cosmetic frame 302 is a cylindrical sheet metal member that covers the outer periphery of the second rectilinear frame 120.

3. Third Movable Lens Barrel Part 23

The third movable lens barrel part 23 has the first cosmetic frame 310, the first lens group L1, and a third cosmetic frame 303.

The first cosmetic frame 310 is disposed between the second rectilinear frame 120 and the second rotary frame 220. The first cosmetic frame 310 supports the first lens group L1, which is used to bring light into the lens barrel 20. The third cosmetic frame 303 is a cylindrical sheet metal member that covers the outer periphery of the first cosmetic frame 310.

4. Stationary Lens Barrel Part 24

The stationary lens barrel part 24 has the stationary frame 100, a fourth lens group frame 340, the fourth lens group L4, a zoom motor 241, the zoom gear 242, a focus motor 243, the master flange 244, an imaging element 245, and imaging element flexible wire 245*a*.

The stationary frame 100 is a cylindrical plastic member disposed on the outside in the radial direction of the first rotary frame 210. The fourth lens group frame 340 is attached to the master flange 244 and is driven in the optical axis direction by the focus motor 243. The fourth lens group frame 340 supports the fourth lens group L4 used for focal adjustment.

The zoom motor 241 is a drive source for deploying the first to third movable lens barrel parts 21 to 23, and is attached to the side face of the stationary frame 100. The zoom gear 242 transmits the drive force of the zoom motor 241 to the first rotary frame 210. The front end of the zoom gear 242 is supported by the stationary frame 100, and the rear end of the zoom gear 242 is supported by the master flange 244. The focus motor 243 is a drive source for driving the fourth lens group frame 340 in the optical axis direction, and is attached to the master flange 244. The master flange 244 is a flat plastic member that covers the rear of the stationary frame 100. The imaging element 245 is fitted in the center of the master flange 244. The imaging element flexible wire 245*a* is affixed to the rear face of the master flange 244. The imaging element flexible wire 245*a* is connected to a control device (not shown), and transmits signals from the imaging element 245.

5. Engagement of Frames

Figure 25:
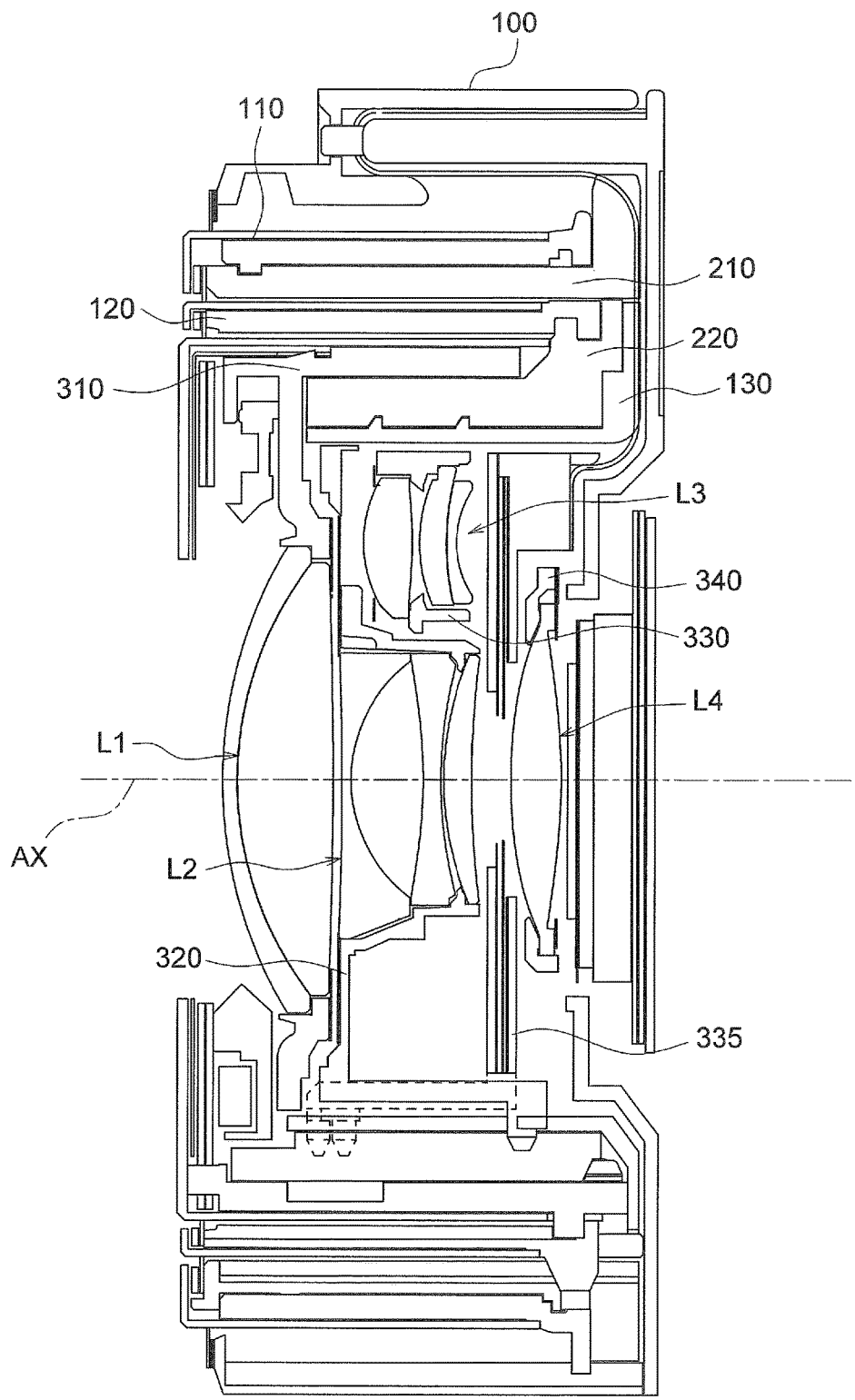
FIG. 25 is a simplified cross section of the lens group in its retracted state.
Figure 26:
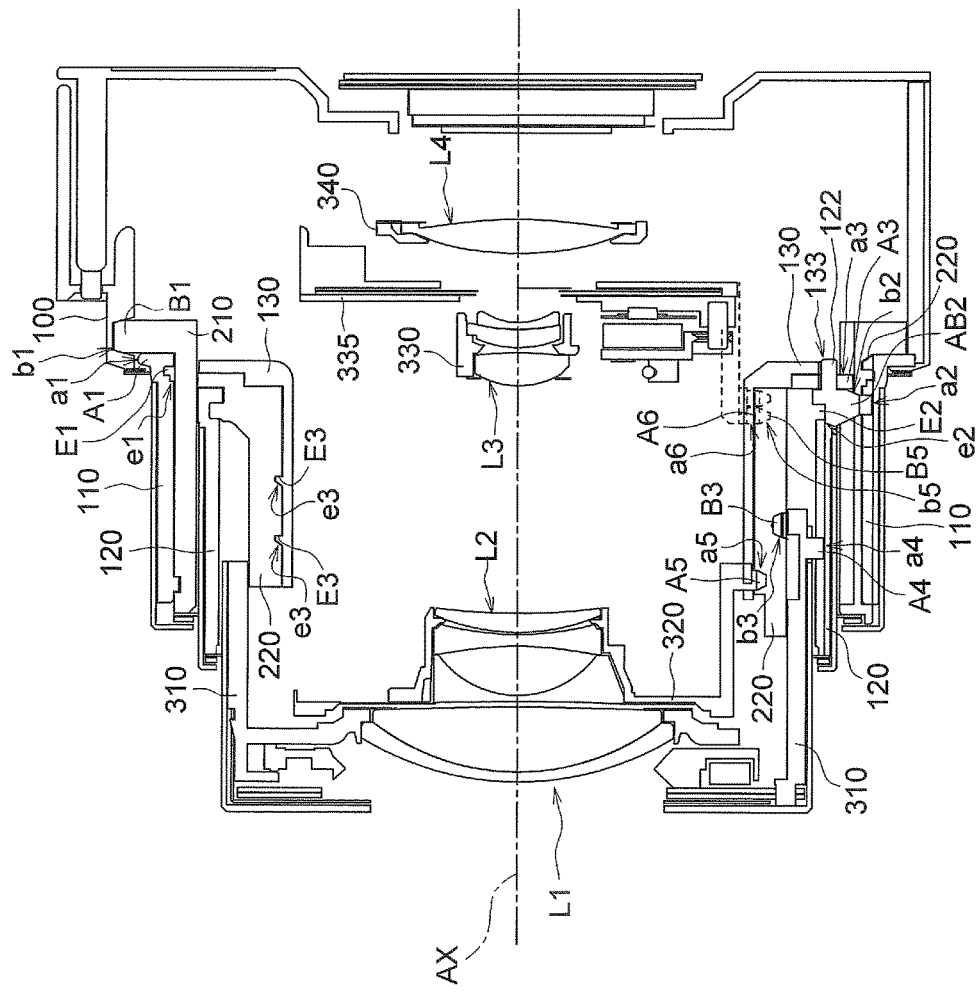
FIG. 26 is a simplified cross section of the lens group in its wide angle state.
Figure 27:
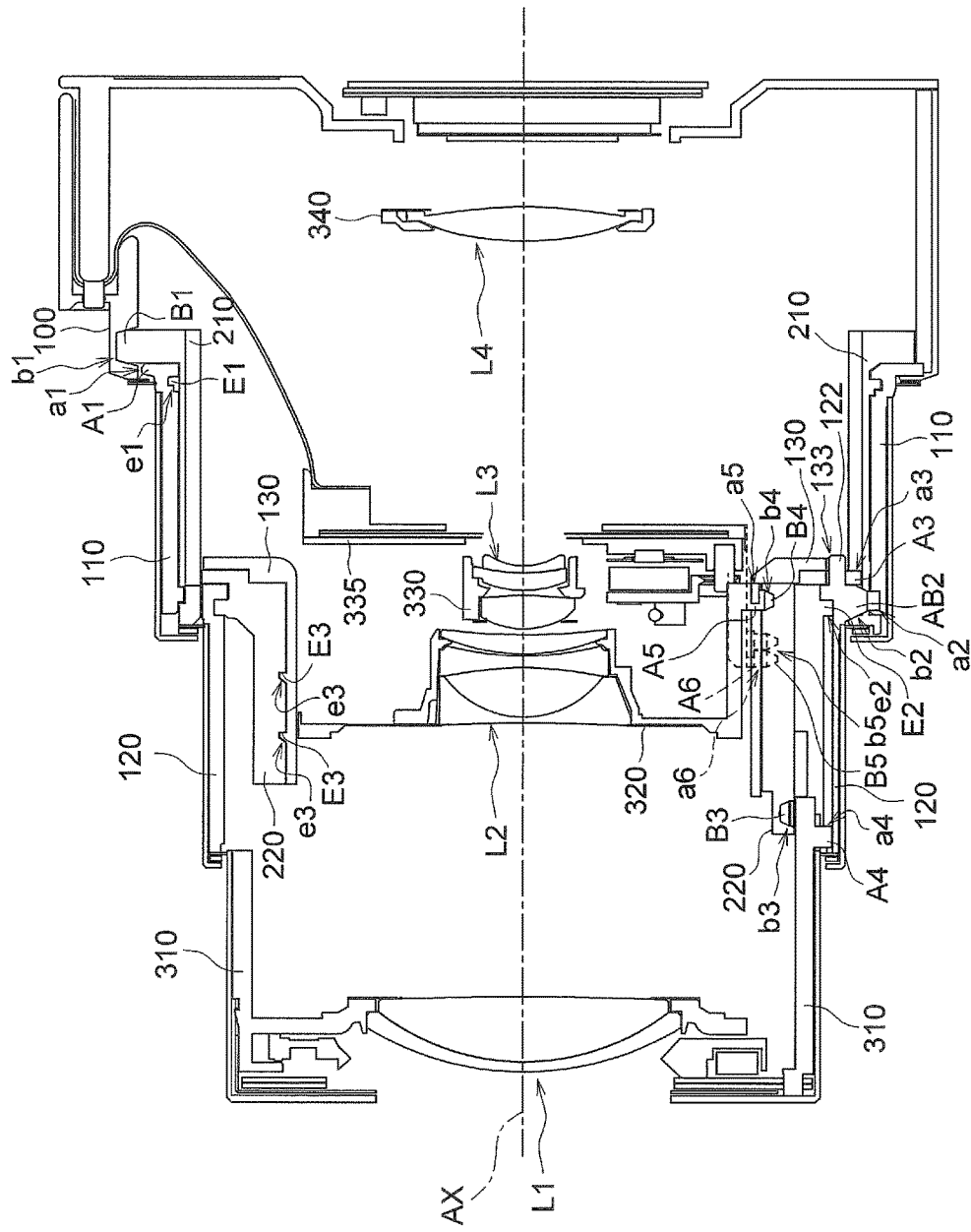
FIG. 27 is a simplified cross section of the lens group in its telephoto state.

FIGS. 25 to 27 are cross sections of the lens barrel 20. However, FIGS. 5 to 7 are simplified diagrams that combine a plurality of cross sections passing through the optical axis AX. In FIG. 25 the lens barrel 20 is shown in its retracted state, in FIG. 26 the lens barrel 20 is shown in its wide angle state, and in FIG. 27 the lens barrel 20 is shown in its telephoto state. In this embodiment, the "imaging enabled state" of the digital camera 1 means a state from the wide angle state to the telephoto state of the lens barrel 20.

A gear portion 212 of the first rotary frame 210 meshes with the zoom gear 242 (not shown). The cam follower B1 of the first rotary frame 210 is engaged with the cam groove b1 of the stationary frame 100. Therefore, the first rotary frame 210 moves in the optical axis direction while rotating in the peripheral direction under the drive force of the zoom motor 241.

The rectilinear protrusion A1 of the first rectilinear frame 110 is engaged with the rectilinear groove a1 of the stationary frame 100. The bayonet protrusion E1 of the first rotary frame 210 is engaged with the bayonet groove e1 of the first rectilinear frame 110. Therefore, the first rectilinear frame 110 is movable rectilinearly in the optical axis direction along with the first rotary frame 210.

A rectilinear cam follower AB2 of the second rectilinear frame 120 is inserted into the cam groove b2 of the first rotary frame 210, and is engaged with the rectilinear groove a2 of the first rectilinear frame 110. Therefore, the second rectilinear frame 120 moves rectilinearly in the optical axis direction according to the rotation of the first rotary frame 210.

A rectilinear protrusion A3 of the second rotary frame 220 is engaged with a rectilinear groove a3 of the first rotary frame 210. The bayonet protrusion E2 of the second rotary frame 220 is engaged with the bayonet groove e2 of the second rectilinear frame 120. Therefore, the second rotary frame 220 moves in the optical axis direction along with the second rectilinear frame 120 while rotating in the peripheral direction along with the first rotary frame 210.

A latching portion 122 of the second rectilinear frame 120 is latched in a latching recess 133 of the third rectilinear frame 130. The bayonet protrusion E3 of the third rectilinear frame 130 is engaged with the bayonet groove e3 of the second rotary frame 220. At least two of the three rectilinear protrusions A3 of the second rotary frame 220 are disposed at least about 120° apart, the two latching portions 122 of the second rectilinear frame 120 are also disposed at least about 120° apart, and the relative rotation angle during zoom drive is set to about 120° or less. Therefore, the third rectilinear frame 130 moves rectilinearly in the optical axis direction along with the second rectilinear frame 120 without interfering with the rotation of the second rotary frame 220.

Also, at least two of the three rectilinear protrusions A3 of the second rotary frame 220 are spaced apart by about 150°, the spacing of the two latching portions 122 of the second rectilinear frame 120 is also about 150°, and the relative rotation angle during zoom drive is set to about 150° or less. Therefore, the third rectilinear frame 130 does not interfere with the rotation of the second rotary frame 220. The same applies to other angles.

The rectilinear protrusion A4 of the first cosmetic frame 310 is engaged with the rectilinear groove a4 of the second rectilinear frame 120. The cam protrusion B3 of the first cosmetic frame 310 is engaged with the cam groove b3 of the second rotary frame 220. Therefore, the first cosmetic frame 310 can move rectilinearly in the optical axis direction according to the rotation of the second rotary frame 220.

A rectilinear protrusion A5 of the second cosmetic frame 320 is engaged with a rectilinear groove a5 of the third rectilinear frame 130. The cam protrusion B4 of the second cosmetic frame 320 is engaged with the cam groove b4 of the second rotary frame 220. Therefore, the second cosmetic frame 320 can move rectilinearly in the optical axis direction according to the rotation of the second rotary frame 220.

A rectilinear protrusion A6 of the shutter frame 335 is engaged with a rectilinear groove a6 of the third rectilinear frame 130. The cam protrusion B5 of the shutter frame 335 is engaged with the cam groove b5 of the second rotary frame 220. Therefore, the shutter frame 335 can move rectilinearly in the optical axis direction according to the rotation of the second rotary frame 220.

The third lens group frame 330 is mounted to the shutter frame 335, and when the shutter frame 335 moves rectilinearly in the optical axis direction with respect to the third rectilinear frame 130, the retracting lens frame 401 of the third lens group frame 330 is rotated by a retracting mechanism (a guide groove a7 of the third rectilinear frame 130 and a driven portion 411 of the retracting lens frame 401). Consequently, the retracting lens frame 401 moves from the retracted position to the correction enabled position during the transition period between the imaging enabled state and the housed state. Also, during the transition period between the imaging enabled state and the housed state, the retracting lens frame 401 moves from the correction enabled position to the retracted position. When the retracting lens frame 401 is disposed in the correction enabled position, the third lens group L3 is movable within a plane that is perpendicular to the optical axis. Specifically, image blur correction is possible in this state.

As discussed above, the rotation of the first rotary frame 210 and the second rotary frame 220 produced by the drive force of the zoom motor 241 results in rectilinear movement of the first to third rectilinear frames 110 to 130 and the lens group frames 310, 320, and 335.

Configuration of Retracting Mechanism

The configuration of the retracting mechanism of the lens barrel 20 will now be described through reference to the drawings.

6. Configuration of Third Rectilinear Frame 130

Figure 28:
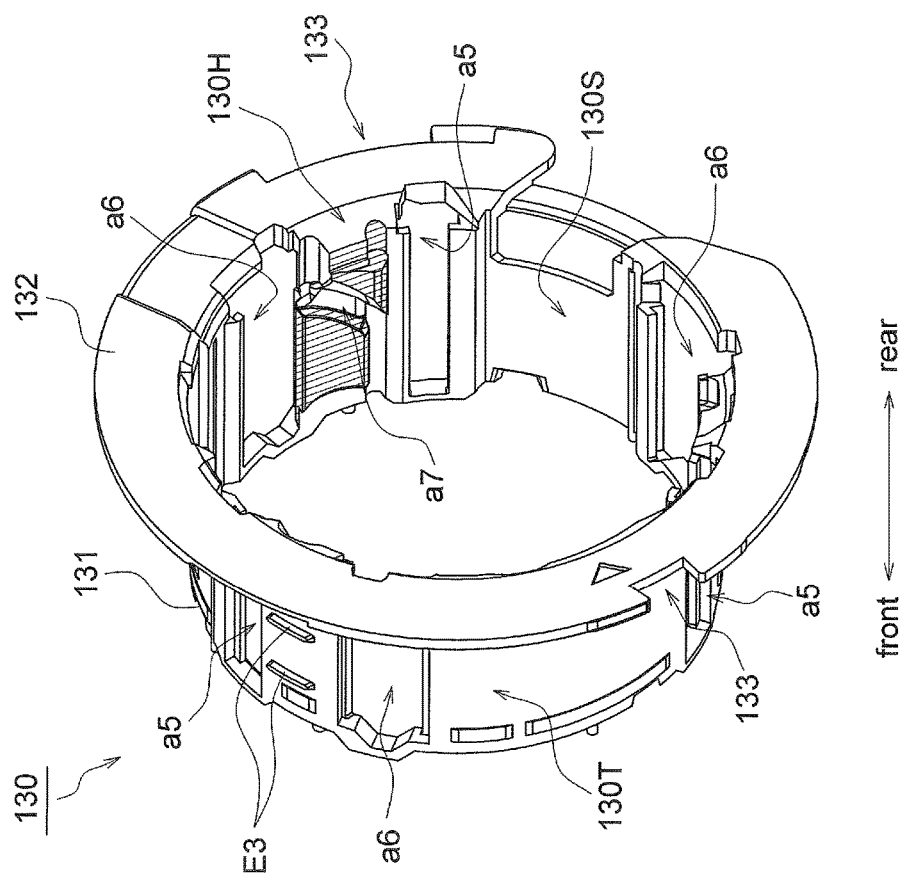
FIG. 28 is an oblique view of a third rectilinear frame.
Figure 29:
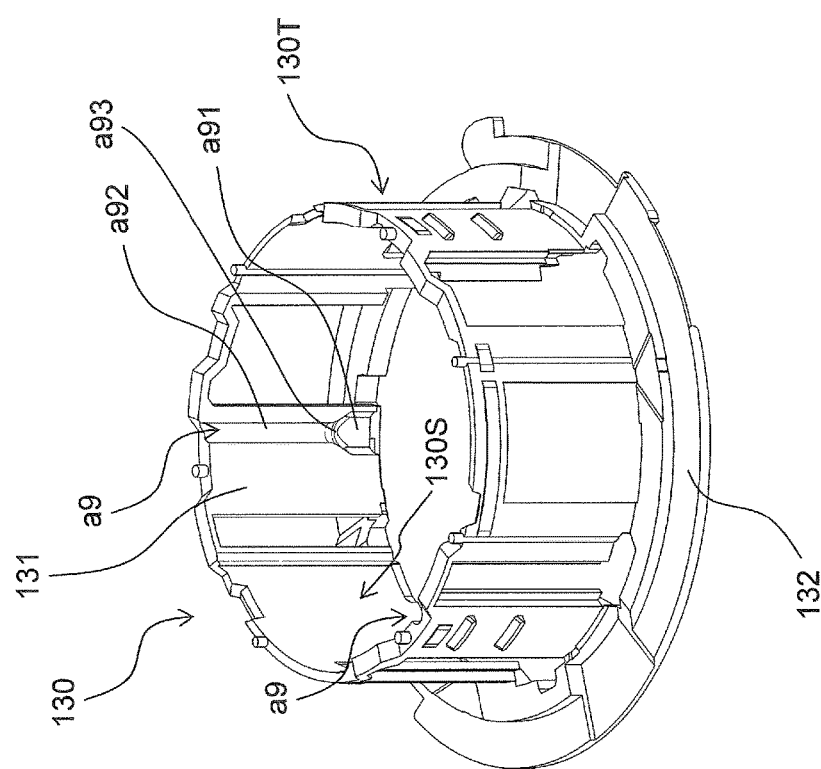
FIG. 29 is an oblique view of the third rectilinear frame.

FIGS. 28 and 29 are oblique views of the third rectilinear frame 130.

The third rectilinear frame 130 has a third rectilinear frame main body 131, a flange 132, and two latching recesses 133.

The third rectilinear frame main body 131 is in the form of a cylinder, and has an inner peripheral face 130S and an outer peripheral face 130T.

The flange 132 is formed in an annular shape and is provided to the rear end part of the outer peripheral face 130T.

The two latching recesses 133 are cut-outs formed in the outer edge of the flange 132. The two latching portions 122 of the second rectilinear frame 120 are latched in the two latching recesses 133 of the third rectilinear frame 130, which prevents relative rotation of the third rectilinear frame 130 with respect to the second rectilinear frame 120.

The third rectilinear frame 130 has two pairs of bayonet protrusions E3, three rectilinear grooves a5, and three rectilinear grooves a6. In FIG. 28, however, only a pair of the bayonet protrusions E3 is shown. A pair of the bayonet protrusions E3 includes two bayonet protrusions E3.

The two bayonet protrusions E3 are formed in the approximate center of the outer peripheral face 130T along the peripheral direction. The two bayonet protrusions E3 are engaged with the two bayonet grooves e3 of the second rotary frame 220. In this embodiment, the bayonet protrusions E3 and the bayonet grooves e3 constitute a bayonet mechanism for rotatably engaging the third rectilinear frame 130 with the second rotary frame 220.

The three rectilinear grooves a5 pass through the third rectilinear frame main body 131 from the inner peripheral face 130S to the outer peripheral face 130T.

The three rectilinear grooves a6 pass through the third rectilinear frame main body 131 from the inner peripheral face 130S to the outer peripheral face 130T.

In this embodiment, the three rectilinear grooves a5 and the three rectilinear grooves a6 are disposed alternately in the peripheral direction.

As shown in FIG. 28, the third rectilinear frame 130 further has the guide groove a7 formed in the inner peripheral face of the third rectilinear frame main body 131, and a reinforcing portion 130H (shaded part) formed near the guide groove a7.

The guide groove a7 guides the driven portion 411 (discussed below) as a cam follower. The guide groove a7 and the driven portion 411 constitute a cam mechanism for moving the retracting lens frame 401. This cam mechanism varies the orientation of the retracting lens frame 401 by moving the third rectilinear frame 130 relatively in the optical axis direction with respect to the retracting lens frame 401.

As shown in FIG. 28, the guide groove a7 has a portion that is inclined to the optical axis (sloped part), and a portion that is parallel to the optical axis (parallel part). When the driven portion 411 is guided by this sloped part, the retracting lens frame 401 rotates around the retraction shaft 501b. The retracting lens frame 401 transitions between an image blur correction enabled position and a retracted position by rotating about the retraction shaft 501b.

The retracting lens frame 401 is biased by the rotary spring 403 around the retraction shaft 501.

Therefore, when the retracting lens frame 401 is rotated against the biasing force of the rotary spring 403 by the guide groove a7 and the driven portion 411, the driven portion 411 comes into contact with one side (the side face on one side) of the guide groove a7. Therefore, the retracting lens frame 401 is rotated as long as there is a side face on the rear side in the optical axis direction.

When the guide groove a7 that engages with the driven portion 411 is formed in the third rectilinear frame 130, the rotation of the retracting lens frame 401 is started earlier during the transition period between the imaging enabled state and the housed state.

Also, the rotational accuracy of the retracting lens frame 401 can be improved by forming the guide groove a7 that engages with the driven portion 411 in the third rectilinear frame 130.

Furthermore, centering during retraction can be performed more accurately by forming the guide groove a7 that engages with the driven portion 411 in the third rectilinear frame 130. When the guide groove a7 is constituted by the third rectilinear frame 130, a centering mechanism for the OIS frame 400 is also formed in the third rectilinear frame 130. Therefore, the positional accuracy of the retracting lens frame 401 and the OIS frame 400 can be improved.

The reinforcing portion 130H is formed partially in the third rectilinear frame main body 131. The reinforcing portion 130H is formed in the inner peripheral face of the third rectilinear frame main body 131. More specifically, the reinforcing portion 130H is formed in the third rectilinear frame main body 131 so as to protrude toward the inside of the third rectilinear frame main body 131. Specifically, using the outer peripheral face of the third rectilinear frame main body 131 as a reference, the reinforcing portion 130H is formed so that its thickness increases toward the inner peripheral side as compared to the other portions. Also, the reinforcing portion 130H is formed near the guide groove a7, such as adjacent to the guide groove a7.

The thickness of the reinforcing portion 130H is determined by the depth of the guide groove a7. Specifically, the thickness of the reinforcing portion 130H is set so that the depth of the guide groove a7 (the radial direction dimension of the guide groove a7) fits in the reinforcing portion 130H. Also, the depth of the guide groove a7 is determined by the size (height) of the driven portion 411 inserted into the guide groove a7. The depth of the guide groove a7 (the radial direction dimension of the guide groove a7) is set so as to accommodate the height of the driven portion 411 (the radial direction dimension of the driven portion 411).

The third rectilinear frame main body 131 is preferably as thin as possible in order to reduce the outside diameter of the lens barrel 20. However, since the cam mechanism that moves the retracting lens frame 401 (that is, the portion where the guide groove a7 and the driven portion 411 engage) needs to be strong, a certain amount of thickness is necessary. If the portion having this certain amount of thickness is formed on the inner peripheral face side of the third rectilinear frame main body 131, this minimizes the increase in the outside diameter of the third rectilinear frame main body 131. Specifically, an increase in the outside diameter of the lens barrel 20 can be minimized.

As shown in FIG. 29, the third rectilinear frame 130 has three shunting grooves a9 for restricting the movement of the OIS frame 400 with respect to the third rectilinear frame 130 or the shutter frame 335. The three shunting grooves a9 are formed in the inner peripheral face 130S of the third rectilinear frame main body 131. The three shunting grooves a9 are formed in the third rectilinear frame main body 131 spaced apart by a specific distance in the peripheral direction in the inner peripheral face 130S.

The three shunting grooves a9 are grooves extending in the optical axis direction. The shunting grooves a9 are formed so that the groove is larger on the flange 132 side. More specifically, the shunting grooves a9 have a first groove a91, a second groove a92, and a third groove a93. The first groove a91 and the second groove a92 are such that the shape of a cross section perpendicular to the optical axis is semicircular, semi-elliptical, trapezoidal, rectangular, parabolic, or a combination of these shapes.

The first grooves a91 are grooves formed on the flange 132 side. The width and depth of the first grooves a91 are greater than the width and depth of the second grooves a92. The shape of the third grooves a93 is a sloped face, a conical face, a curved face, or a combination of these shapes, so that there is a smooth transition from the width and depth of the first grooves a91 to the width and depth of the second grooves a92. If shunting protrusions 404 (see FIG. 32) of the OIS frame 400 (discussed below) are disposed in the first grooves a91, the shunting protrusions 404 is movable inside the first grooves a91. Specifically, in this case, the OIS frame 400 can move within a plane that is perpendicular to the optical axis with respect to the third rectilinear frame 130 or the shutter frame 335.

The second grooves a92 are grooves that extend in the optical axis direction from the first grooves a91. If the shunting protrusions 404 (see FIG. 32) of the OIS frame 400 (discussed below) are disposed in the second grooves a92, the OIS frame 400 is restrained in the radial direction and the peripheral direction with respect to the third rectilinear frame 130 or the shutter frame 335. Consequently, movement of the OIS frame 400 is restricted with respect to the third rectilinear frame 130 or the shutter frame 335.

The third grooves a93 are grooves that extend in the optical axis direction and link the first grooves a91 and the second grooves a92. If the shunting protrusions 404 (see FIG. 32) of the OIS frame 400 (discussed below) are disposed in the third grooves a93, the OIS frame 400 gradually transitions from a state of being movable within a plane that is perpendicular to the optical axis to a state in which it is restricted in the radial direction and the peripheral direction, with respect to the third rectilinear frame 130 or the shutter frame 335.

Specifically, when the shunting protrusions 404 of the OIS frame 400 are disposed from the first grooves a91, via the third grooves a93, to the second grooves a92, this centers the OIS frame 400.

A mechanism for centering the OIS frame 400 (centering mechanism) is constituted by the shunting grooves a9 (a91, a92, and a93) and the shunting protrusions 404 of the OIS frame 400.

7. Configuration of Third Lens Group Frame 330

Figure 30:
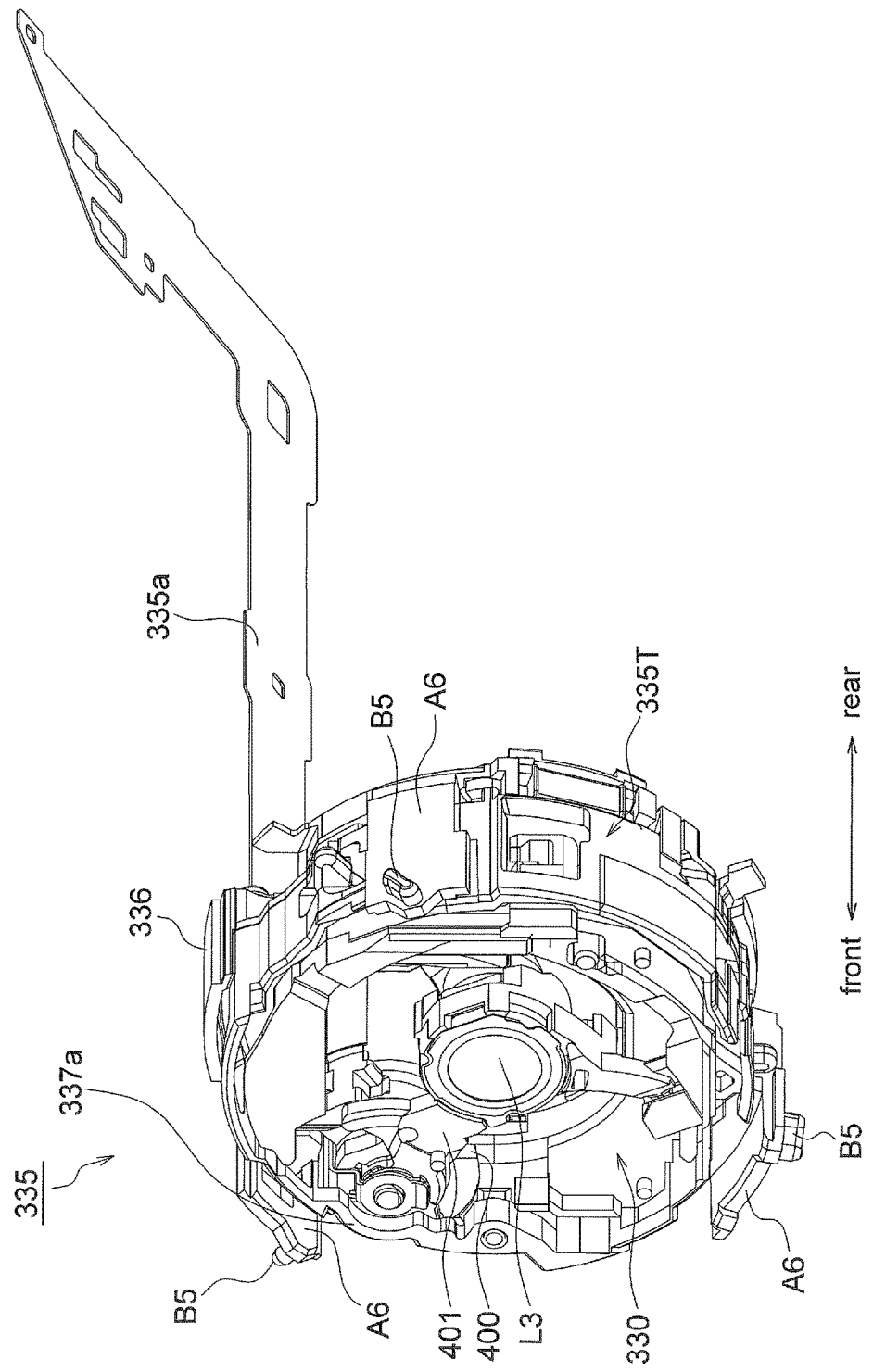
FIG. 30 is an oblique view of a shutter frame.

FIG. 30 shows a state in which the third lens group frame 330 is housed in the interior of the shutter frame 335. The configuration of the third lens group frame 330 will be described through reference to FIG. 30.

The third lens group frame 330 (that is, an OIS (optical image stabilizer) unit) mainly has the OIS frame 400, the retracting lens frame 401, the thrust spring 402, the rotary spring 403, and the third lens group L3 used for image blur correction.

As shown in FIG. 30, the OIS frame 400 is mounted to the shutter frame 335. The optical axis direction layout of the OIS frame 400 with respect to the shutter frame 335 is such that three OIS shafts press-fitted to the shutter frame 335 are supported by being clamped in the optical axis direction by optical axis direction supports of the OIS frame 400 at three places. The directional position of the OIS frame 400 perpendicular to the optical axis with respect to the shutter frame 335 is such that one OIS rotary shaft press-fitted to the shutter frame 335 is clamped in the optical axis direction by a perpendicular direction support of the OIS frame 400 at one place, and an optical axis direction stopper pin is supported by coming into contact with the peripheral wall of a movement range restrictor 338 of the OIS frame 400.

Figure 31:
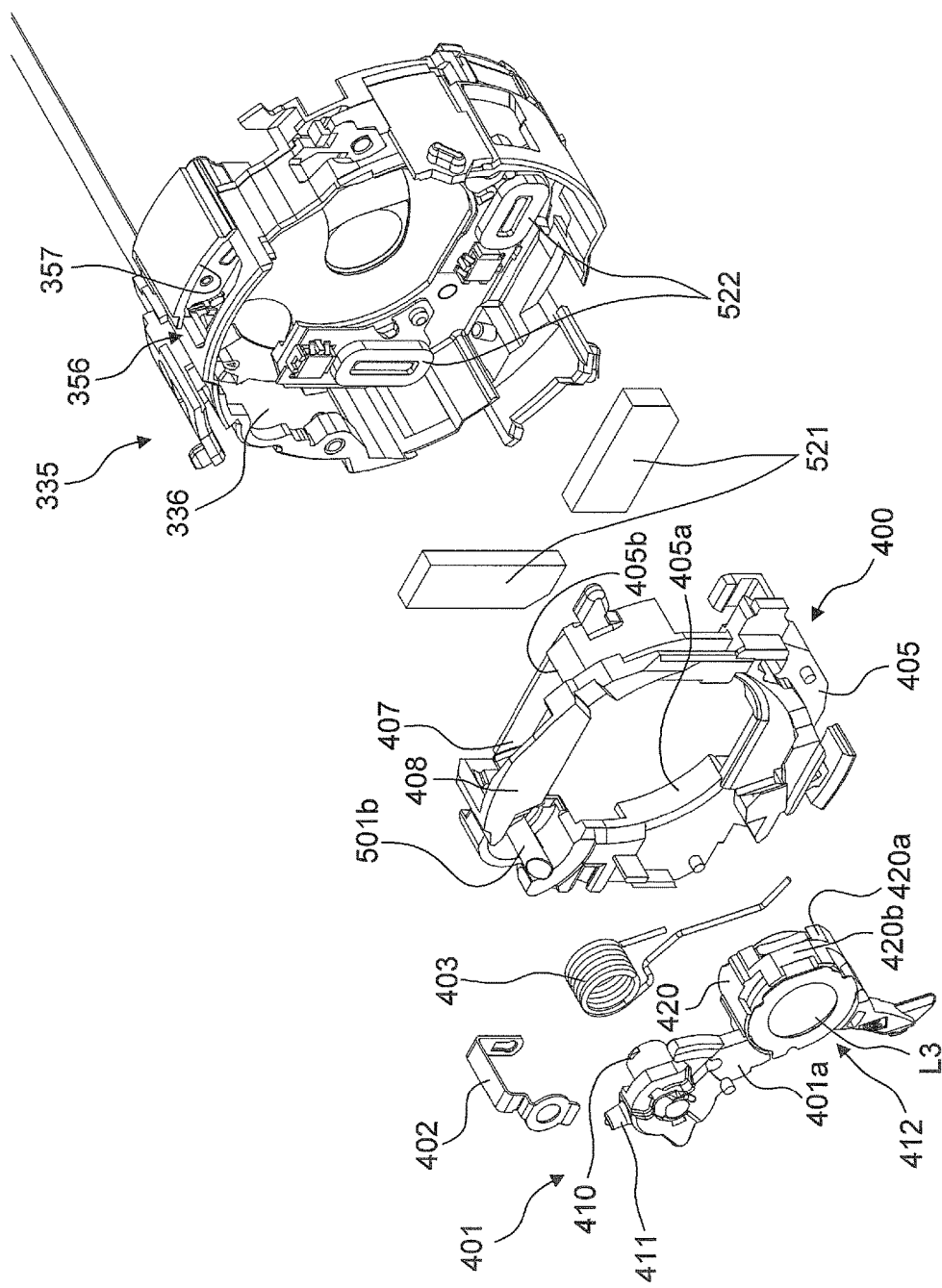
FIG. 31 is an oblique view of the shutter frame, the OIS frame, and the retracting lens frame.
Figure 32:
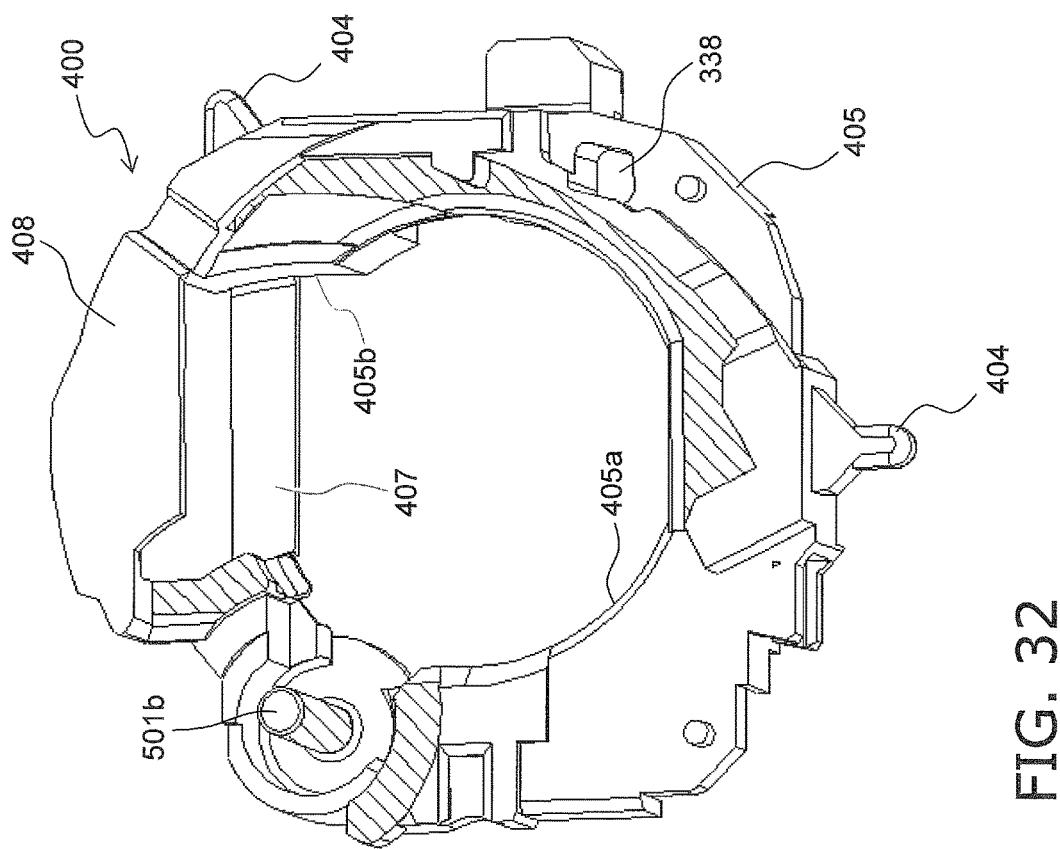
FIG. 32 is an oblique view of the OIS frame.

As shown in FIGS. 31 and 32, the OIS frame 400 has a main body portion 405, a first linking portion 407, and a second linking portion 408. The main body portion 405 has a hole 405a and a first cut-out 405b.

In a state in which the OIS frame 400 is mounted to the shutter frame 335, the first linking portion 407 is disposed above magnets 521 and coils 522 (actuators; discussed below).

The OIS frame 400 is movable within a plane that is perpendicular to the optical axis. More specifically, the magnets 521 are fixed to the OIS frame 400, and the coils 522 are fixed to the shutter frame 335 at a position opposite the magnets 521. In this state, when power is supplied from a camera circuit (not shown) to the coils 522 of the shutter frame 335, current flows and a magnetic field is generated in the coils 522. This magnetic field drives the magnets 521 of the OIS frame 400, and this drive force causes the OIS frame 400 to move in a plane that is perpendicular to the optical axis.

As shown in FIG. 32, the OIS frame 400 has the shunting protrusions 404 that engage with the shunting grooves a9 of the third rectilinear frame 130. The shunting protrusions 404 are formed integrally with the main body portion 405 of the OIS frame 400. More specifically, the two shunting protrusions 404 are formed on the main body portion 405 so as to protrude outward from the outer peripheral part of the main body portion. Also, the two shunting protrusions 404 are formed integrally with the main body portion 405 and spaced apart by a specific distance around the outer peripheral part of the main body portion 405. The two shunting protrusions 404 are respectively fitted into and guided by the two shunting grooves a9 of the third rectilinear frame 130.

More specifically, in a state in which the OIS frame 400 is mounted to the shutter frame 335, when the OIS frame 400 approaches the third rectilinear frame 130, the shunting protrusions 404 formed on the OIS frame 400 are introduced from the flange 132 side of the third rectilinear frame 130 into the first grooves a91 of the third rectilinear frame 130. In a state in which the shunting protrusions 404 are disposed in the first grooves a91, the OIS frame 400 is movable in a plane that is perpendicular to the third rectilinear frame 130 or the shutter frame 335.

Then, in a state in which the OIS frame 400 is mounted to the shutter frame 335, if the OIS frame 400 moves further in the optical axis direction on the inner peripheral side of the third rectilinear frame 130, the shunting protrusions 404 are introduced into the third grooves a93. Then, the OIS frame 400 gradually transitions from a state of being movable in a plane that is perpendicular to the optical axis to a state of being restricted in the radial direction and the peripheral direction with respect to the third rectilinear frame 130 or the shutter frame 335.

Then, when the shunting protrusions 404 are introduced into the second grooves a92, the shunting protrusions 404 are pressed by the second grooves a92 away from the inner peripheral face 130S of the third rectilinear frame 130. This restricts the movement of the OIS frame 400 with respect to the third rectilinear frame 130 or the shutter frame 335. The result is that the OIS frame 400 is centered.

Here, when the shunting protrusions 404 are guided by the shunting grooves a9 of the third rectilinear frame 130, the third rectilinear frame 130 is positioned away from the shunting grooves a9. The retraction operation of the retracting lens frame 401 is started in this state. That is, the driven portion 411 of the retracting lens frame 401 is guided by the guide groove a7 of the third rectilinear frame 130. The drive force received by the driven portion 411 of the retracting lens frame 401 from the guide groove a7 then acts in the direction in which the shunting protrusions 404 are pushed into the shunting grooves a9. This reliably reduces looseness between the shunting protrusions 404 and the shunting grooves a9. That is, the center of the OIS frame 400 can be performed more reliably.

The center of the OIS frame 400 in this example was executed before starting the retraction of the retracting lens frame 401, but what is important is that the centering be completed by the time the retraction operation is complete.

As shown in FIG. 31, the retracting lens frame 401 is supported by the OIS frame 400 so as to be movable around the retraction shaft 501b, which is substantially parallel to the optical axis. The retracting lens frame 401 supports the third lens group L3 used for image blur correction, with a third lens support 420. The third lens group L3 is made up of at least one lens.

The term "retraction shaft" as used below will sometimes be used in the sense of "the axis of the retraction shaft."

As shown in FIG. 31, the retracting lens frame 401 has a main body portion 401a, a bearing 410, the driven portion 411, a positioning portion 412, the third lens support 420, and an engagement portion (not shown). The bearing 410 is formed integrally with the main body portion 401a.

As shown in FIGS. 31 and 32, the bearing 410 is rotatably mounted to the support shaft 501b (retraction shaft) provided to the OIS frame 400. A hole into which the retraction shaft 501b is inserted is formed in the bearing 410.

The driven portion 411 is the portion that is driven against the biasing force of the rotary spring 403 (discussed below) during the transition period between the imaging enabled state and the housed state. The driven portion 411 is formed integrally protruding outward from the main body portion 401a. The driven portion 411 is engaged with the guide groove a7 formed in the inner peripheral face of the third rectilinear frame 130. More precisely, the driven portion 411 is engaged with the guide groove a7 of the third rectilinear frame 130 via an opening (not shown) in the shutter frame 335. The driven portion 411 is guided by the guide groove a7 of the third rectilinear frame 130 when the third rectilinear frame 130 moves relatively in the optical axis direction with respect to the retracting lens frame 401. Consequently, the orientation of the retracting lens frame 401 changes during the transition period between the imaging enabled state and the housed state.

8. Configuration of Shutter Frame 335

The configuration of the shutter frame 335 will now be described through reference to FIGS. 30 and 31.

As shown in FIG. 30, the shutter frame 335 has a shutter frame main body 336, three rectilinear protrusions A6, and three cam protrusions B5. As shown in FIG. 31, the shutter frame 335 also has an opening 356, a light blocking portion 357, and a first restrictor 337a.

The shutter frame main body 336 is in the form of a cylinder, and has an outer peripheral face 335T.

The three rectilinear protrusions A6 are formed on the outer peripheral face 335T, and are disposed at a substantially constant pitch in the peripheral direction. The three rectilinear protrusions A6 are engaged with the three rectilinear grooves a6 of the third rectilinear frame 130.

The three cam followers B5 are provided to the front end of the three rectilinear protrusions A6. The three cam followers B5 are engaged with the three cam grooves b5 of the second rotary frame 220.

The opening 356 is the portion that houses a part 420b of the third lens support 420 during the transition period between the imaging enabled state and the housed state. As shown in FIG. 30, the part 420b of the third lens support 420 is the portion adjacent to a second cut-out 420a during the transition period between the imaging enabled state and the housed state. More precisely, the light blocking portion 357 is provided to the opening 356 in order to block light rays.

9. Action and Effect (1) With this lens barrel 20, the third rectilinear frame 130 restricts the in-plane movement of the OIS frame 400 during the transition period between the imaging enabled state and the housed state. Consequently, in the housed state, there is no need to provide clearance or the like for avoiding contact with members caused by in-plane movement of the OIS frame 400, so the lens barrel 20 can be more compact.

(2) With this lens barrel 20, when the shunting grooves a9 of the third rectilinear frame 130 are engaged with the shunting protrusions 404 of the OIS frame 400, in-plane movement of the OIS frame 400 is restricted by the third rectilinear frame 130 during the transition period between the imaging enabled state and the housed state. Consequently, there is no need to provide the above-mentioned clearance, etc., so the lens barrel can be more compact.

(3) With this lens barrel 20, the third rectilinear frame 130 restricts the in-plane movement of the OIS frame 400 and retracts the retracting lens frame 401. Specifically, restriction of the in-plane movement of the OIS frame 400 and retraction of the retracting lens frame 401 can be accomplished with just one member (the third rectilinear frame 130), so this improves accuracy during in-plane restriction of the OIS frame 400 and accuracy during retraction of the retracting lens frame 401.

Other Embodiments (A) In the above embodiments the lens barrel 20 comprised the third rectilinear frame 130, but need not comprise the third rectilinear frame 130.

(B) In the above embodiments, the second rectilinear frame 120 was disposed on the inside of the first rotary frame 210, but this is not the only option. The second rectilinear frame 120 may instead be disposed on the outside of the first rotary frame 210. Specifically, the second rectilinear frame 120 should be disposed on the inside of the first rectilinear frame 110.

(C) In the above embodiments, the lens barrel 20 comprised the first to fifth lens groups L1 to L5, but this is not the only option. The lens barrel 20 should comprise at least the first lens group L1.

(D) In the above embodiments, the lens barrel 20 comprised a three-stage telescoping zoom mechanism, but this is not the only option. The lens barrel 20 may have a telescoping mechanism of more than three stages.

(E) In the above embodiments, the cam grooves b were formed in one of two frames, and the cam protrusions B were formed in the other frame, but this is not the only option. The frames on which the cam protrusions B and the cam grooves b are formed may be switched around. Also, the cam grooves b and the cam protrusions B may both be formed in each of the two frames.

(F) In the above embodiments, the rectilinear grooves a were formed in one of two frames, and the rectilinear protrusions A were formed in the other frame, but this is not the only option. The frames on which the rectilinear protrusions A and the rectilinear grooves a are formed may be switched around. Also, the rectilinear grooves a and the rectilinear protrusions A may both be formed in each of the two frames.

(G) In the above embodiments, the bayonet grooves e were formed in one of two frames, and the bayonet protrusions E were formed in the other frame, but this is not the only option. The frames on which the bayonet protrusions E and the bayonet grooves e are formed may be switched around. Also, the bayonet grooves e and the bayonet protrusions E may both be formed in each of the two frames.

(H) In the above embodiments, the third lens group L3 retracted to the outside in the radial direction of the fourth and fifth lens groups L4 and L5, but this is not the only option. The third lens group L3 may be disposed in front of the fourth and fifth lens groups L4 and L5 in the retracted state.

(I) In the above embodiments, an example was given in which the retraction shaft portion 501 (retraction shaft 501b) was provided to the OIS frame 400, and the shaft support 601 was provided to the retracting lens frame 401, but the shaft support 601 may be provided to the OIS frame 400, and the retraction shaft portion 501 (retraction shaft 501b) may be provided to the retracting lens frame 401.

Figure 33:
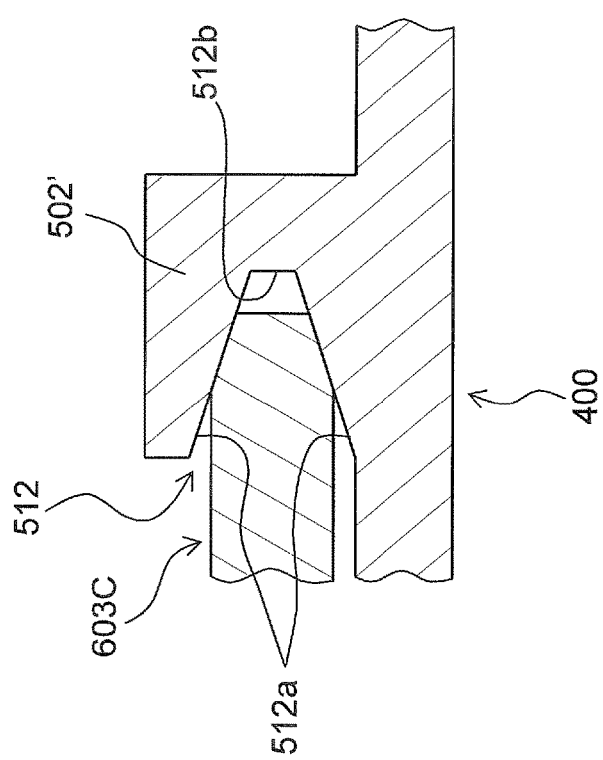
FIG. 33 is a detail cross section of the state when the retracting lens frame has been engaged with the anti-rotation portion of the OIS frame in another embodiment.

(J) In the above embodiments, as shown in FIG. 12, an example was given in which the anti-rotation portion 502 of the OIS frame 400 was formed in a concave shape, and the third contact portion 603C of the retracting lens frame 401 come into contact with the sloped face 502a of the anti-rotation portion 502. Instead, as shown in FIG. 33, the third contact portion 603C of the retracting lens frame 401 may come into contact with two side faces 512a of a concave portion 512 of an anti-rotation portion 502'. In this case, the two side faces 512a of the concave portion 512 are sloped and opposite each other. More specifically, the two side faces 512a of the concave portion 512 are formed so as to approach each other toward the bottom 512b of the concave portion 512. This allows the retracting lens frame 401 to be positioned more reliably with respect to the OIS frame 400.

(K) In the above embodiments, an example was given in which the in-plane movement of the OIS frame 400 was restricted and the retracting lens frame 401 was retracted with just one member (the master flange 105 in the first embodiment, and the third rectilinear frame 130 in the second embodiment). Instead, the restriction of the in-plane movement of the OIS frame 400 and the retraction of the retracting lens frame 401 may be accomplished with a plurality of members.

Third Embodiment

It is an object of Embodiment 3 to increase shatter strength.

The lens barrel comprises a frame body, a support frame, and a retracting lens frame. The support frame is supported by the frame body and is movable within a plane that is perpendicular to the optical axis, with respect to the frame body. The retracting lens frame is supported by the support frame, and moves around a retraction shaft that is substantially parallel to the optical axis during the transition period between the imaging enabled state and the housed state. The frame body has a main body portion and a first restrictor that is provided a specific distance away from the main body portion. The retracting lens frame has a first engagement portion that engages with the first restrictor. Movement of the retracting lens frame in the optical axis direction is restricted by disposing this first engagement portion between the main body portion and the restrictor.

The technology disclosed herein provides a lens barrel with which the retracting lens frame can operate stably.

Configuration of Digital Camera 1

Figure 34:
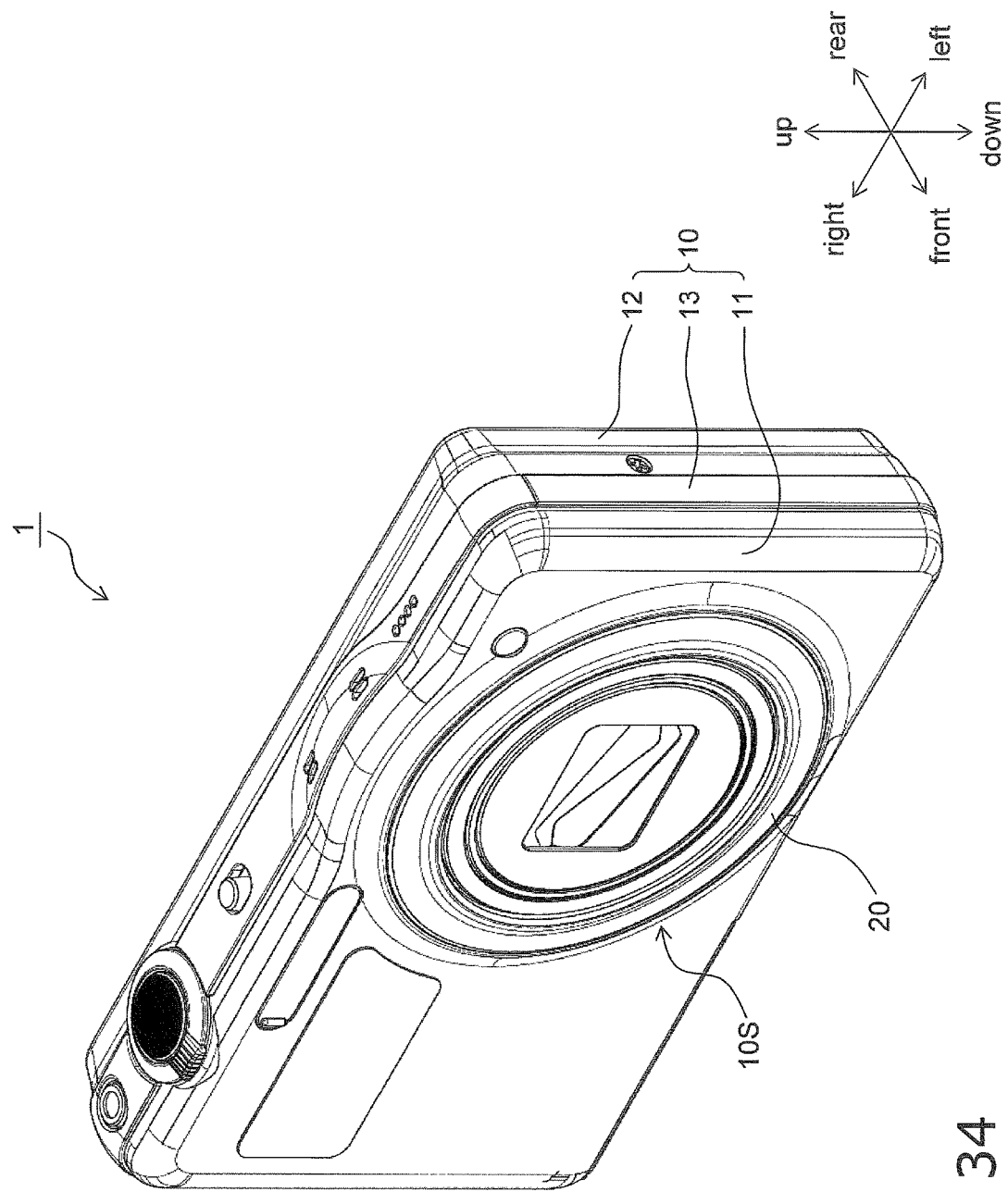
FIG. 34 is an oblique view of a digital camera pertaining to Embodiment 3.
Figure 35:
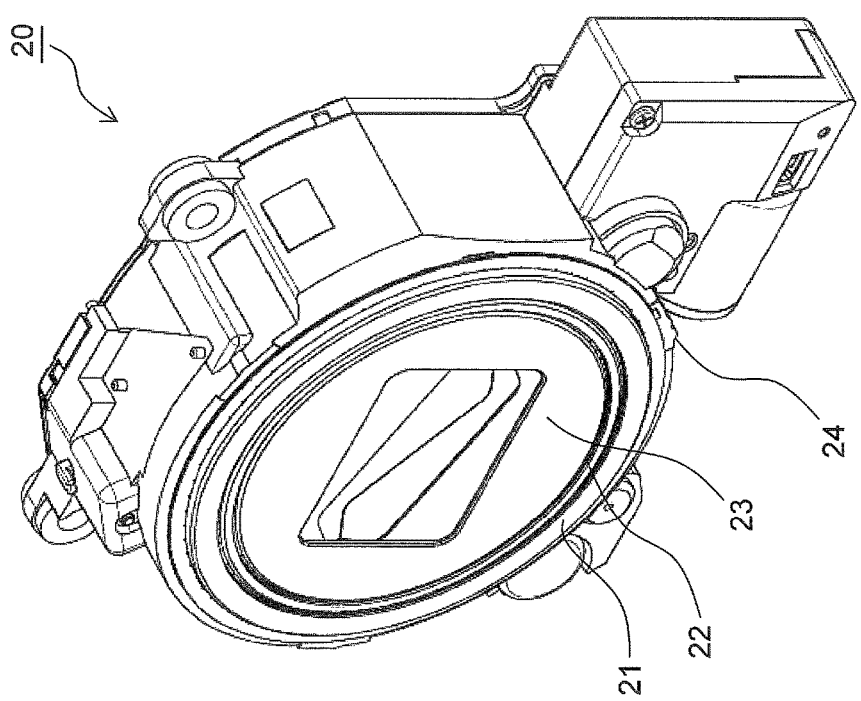
FIG. 35 is an oblique view of the lens barrel.

The configuration of the digital camera 1 will now be described through reference to the drawings. FIG. 34 is an oblique view of the digital camera 1. FIG. 35 is an oblique view of the lens barrel 20.

As shown in FIG. 34, the digital camera 1 comprises the housing 10 and the lens barrel 20.

The housing 10 is made up of the front panel 11, the rear panel 12, and the side panel 13. The opening 10S is formed in the front panel 11.

The lens barrel 20 comprises a three-stage retractable zoom mechanism. The lens barrel 20 is housed in the housing 10 when not being used for imaging, and is deployed forward from the opening 10S during imaging. More specifically, as shown in FIG. 35, the lens barrel 20 has the first movable lens barrel portion 21, the second movable lens barrel part 22, the third movable lens barrel part 23, and the stationary lens barrel 24.

The first movable lens barrel part 21 is configured to deploy with respect to the stationary lens barrel part 24. The second movable lens barrel part 22 is configured to deploy with respect to the first movable lens barrel part 21. The third movable lens barrel part 23 is configured to deploy with respect to the second movable lens barrel part 22. The stationary lens barrel part 24 is fixed inside the housing 10. When the lens barrel 20 is deployed, the third movable lens barrel part 23 is positioned the farthest forward out of the first to third movable lens barrel parts 21 to 23.

Detailed Configuration of Lens Barrel 20

Figure 36:
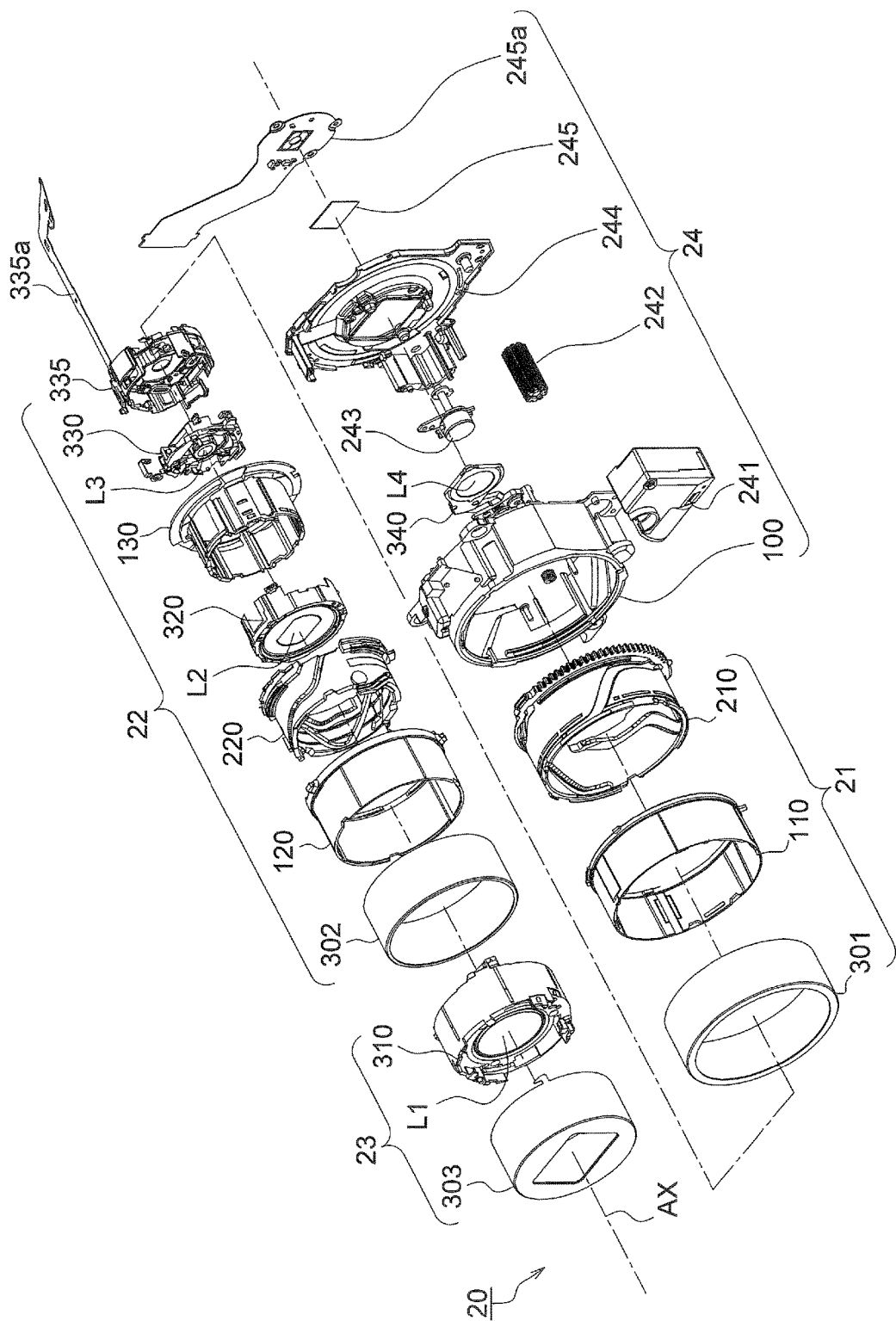
FIG. 36 is an exploded oblique view of the lens barrel.

Next, the detailed configuration of the lens barrel 20 will be described through reference to the drawings. FIG. 36 is an exploded oblique view of the lens barrel 20.

The first to third movable lens barrel parts 21 to 23 of the lens barrel 20 are deployed from the stationary lens barrel part 24 along the optical axis AX of the optical system. The optical system includes first to fourth lens groups L1 to L4. In the following description, a direction parallel to the optical axis AX will be called the "optical axis direction," a direction perpendicular to the optical axis direction will be called the "radial direction," and a direction that follows a circle whose center is the optical axis AX will be called the "peripheral direction." The optical axis AX substantially coincides with the axis of the various frames that make up the lens barrel 20.

1. First Movable Lens Barrel Part 21

The first movable lens barrel part 21 has the first rectilinear frame 110, the first rotary frame 210, and the first cosmetic frame 301. The first rectilinear frame 110 is a cylindrical plastic member disposed on the inside in the radial direction of the stationary frame 100 (discussed below). The first rotary frame 210 is a cylindrical plastic member disposed on the inside in the radial direction of the stationary frame 100. The first cosmetic frame 301 is a cylindrical sheet metal member that covers the outer periphery of the first rectilinear frame 110.

2. Second Movable Lens Barrel Part 22

The second movable lens barrel part 22 has the second rectilinear frame 120, the second rotary frame 220, the third rectilinear frame 130, the second lens group frame 320, the second lens group L2, the third lens group frame 330, the third lens group L3, the shutter frame 335, and the second cosmetic frame 302.

The second rectilinear frame 120 is a cylindrical plastic member disposed on the inside in the radial direction of the first rotary frame 210. The second rotary frame 220 is a cylindrical plastic member disposed on the inside in the radial direction of the second rectilinear frame 120.

The third rectilinear frame 130 is a cylindrical plastic member disposed on the inside in the radial direction of the second rotary frame 220. The second lens group frame 320 is disposed on the inside in the radial direction of the third rectilinear frame 130, and supports the second lens group L2. The third lens group frame 330 is housed in the shutter frame 335, and supports the third lens group L3 used for image blur correction. The third lens group frame 330 is supported pivotably in the radial direction by the shutter frame 335, and constitutes an image blur correction mechanism along with the third lens group L3.

The shutter frame 335 is disposed on the inside in the radial direction of the third rectilinear frame 130, and has a built-in shutter mechanism. The shutter frame 335 supports the third lens group frame 330 pivotably in the radial direction. A control-use flexible wire 335a is connected to the shutter frame 335.

The control-use flexible wire 335a is disposed along the inner peripheral face of the stationary frame 100, and is connected to a control device (not shown). The control-use flexible wire 335a transmits control signals to the shutter mechanism and the image blur correction mechanism (discussed below). The second cosmetic frame 302 is a cylindrical sheet metal member that covers the outer periphery of the second rectilinear frame 120.

3. Third Movable Lens Barrel Part 23

The third movable lens barrel part 23 has the first lens group frame 310, the first lens group L1, and the third cosmetic frame 303.

The first lens group frame 310 is disposed between the second rectilinear frame 120 and the second rotary frame 220. The first lens group frame 310 supports the first lens group L1, which is used to bring light into the lens barrel 20. The third cosmetic frame 303 is a cylindrical sheet metal member that covers the outer periphery of the first lens group frame 310.

4. Stationary Lens Barrel Part 24

The stationary lens barrel part 24 has the stationary frame 100, the fourth lens group frame 340, the fourth lens group L4, the zoom motor zoom motor 241, the zoom gear 242, the focus motor 243, the master flange 244, the imaging element 245, and the imaging element flexible wire 245a.

The stationary frame 100 is a cylindrical plastic member disposed on the outside in the radial direction of the first rotary frame 210 and the first rectilinear frame 110. The fourth lens group frame 340 is attached to the master flange 244, and is driven in the optical axis direction by the focus motor 243. The fourth lens group frame 340 supports the fourth lens group L4, which is used for focal adjustment.

The zoom motor 241 is a drive source that is used to deploy the first to third movable lens barrel parts 21 to 23, and is attached to the side face of the stationary frame 100. The zoom gear 242 transmits the drive force of the zoom motor 241 to the first rotary frame 210. The front end of the zoom gear 242 is supported by the stationary frame 100, and the rear end of the zoom gear 242 is supported by the master flange 244. The focus motor 243 is a drive source that is used to drive the fourth lens group frame 340 in the optical axis direction, and is attached to the master flange 244. The master flange 244 is a flat plastic member that covers the rear of the stationary frame 100. The imaging element 245 is fitted into the center of the master flange 244. The imaging element flexible wire 245a is affixed to the rear face of the master flange 244. The imaging element flexible wire 245a is connected to a control device (not shown), and transmits signals from the imaging element 245.

Configuration of Frames

The frames that make up the lens barrel 20 will now be described through reference to the drawings. More specifically, the configurations of the stationary frame 100, the first rectilinear frame 110, the first rotary frame 210, the second rectilinear frame 120, the second rotary frame 220, the third rectilinear frame 130, the first lens group frame 310, the second lens group frame 320, the third lens group frame 330, and the shutter frame 335 will be described in order, after which we will describe how the frames are engaged with each other.

1. Configuration of Stationary Frame 100

Figure 37:
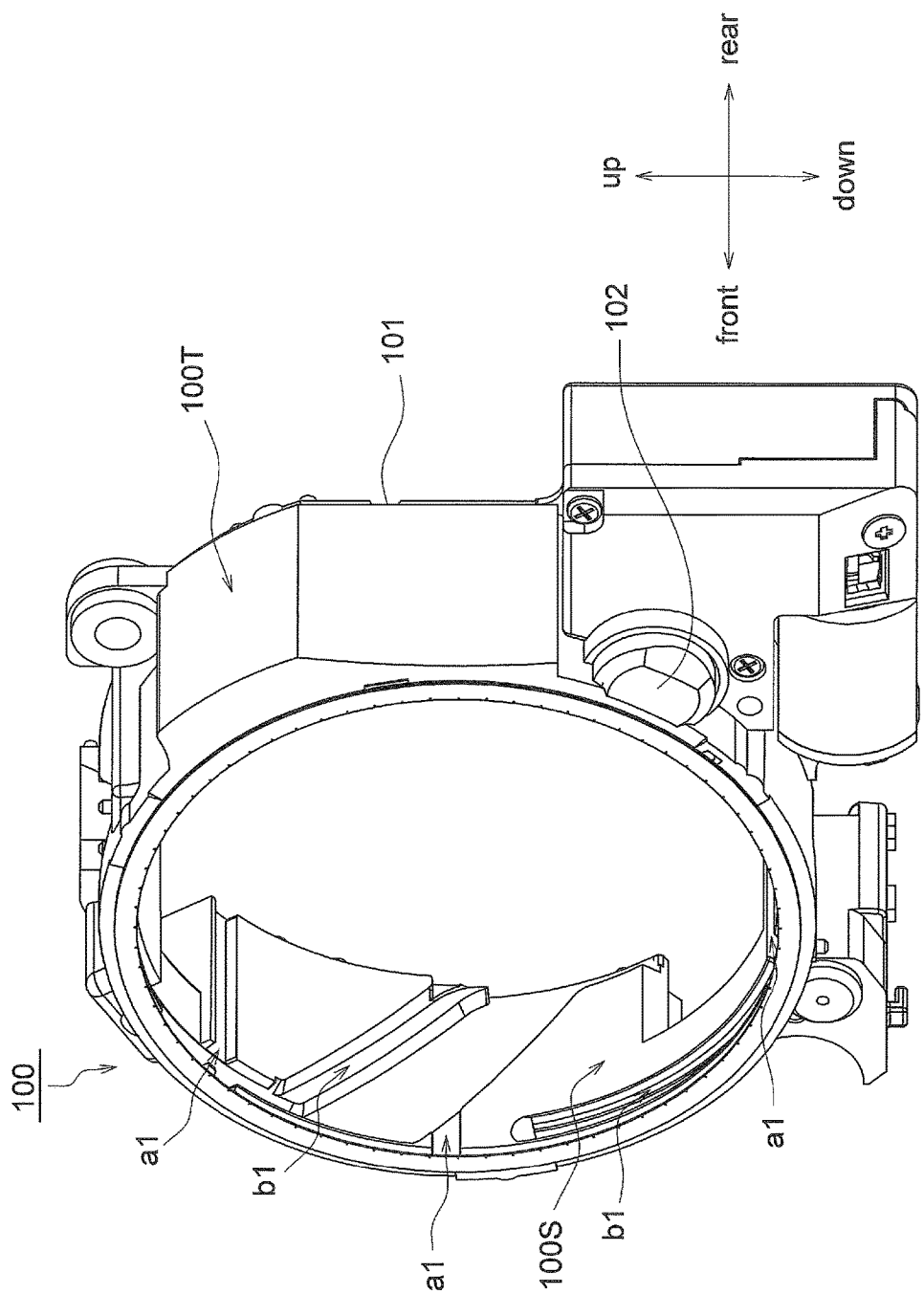
FIG. 37 is an oblique view of a stationary frame.

FIG. 37 is an oblique view of the stationary frame 100. The stationary frame 100 has the stationary frame main body 101 and the zoom gear support 102.

The stationary frame main body 101 is formed in a cylindrical shape, and has an inner peripheral face 100S and an outer peripheral face 100T.

The support 102 is provided so as to protrude from the outer peripheral face 100T. The support 102 rotatably supports the front end of the zoom gear 242. In this embodiment, the support 102 is covered by the front panel 11, so it is not exposed on the outside of the housing 10 (see FIG. 34). The teeth of the zoom gear 242 protrude on the inside of the stationary frame main body 101.

The stationary frame 100 has five rectilinear grooves a1 and three cam grooves b1. In FIG. 37, however, only three rectilinear grooves a1 and two cam grooves b1 are shown.

The five rectilinear grooves a1 are formed in the inner peripheral face 100S in the optical axis direction, and are suitably spaced apart in the peripheral direction.

The three cam grooves b1 are formed in the inner peripheral face 100S so as to intersect the optical axis direction.

2. Configuration of First Rectilinear Frame 110

Figure 38:
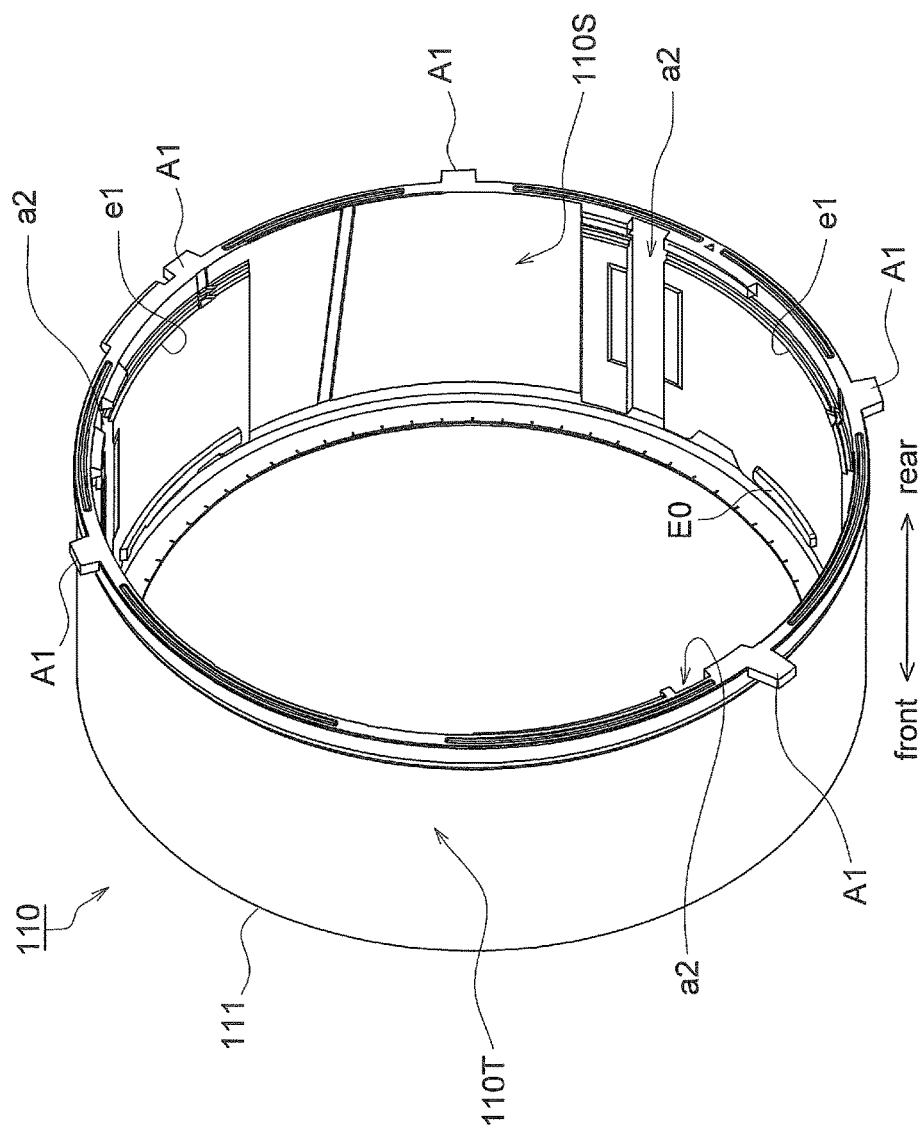
FIG. 38 is an oblique view of a first rectilinear frame.

FIG. 38 is an oblique view of the first rectilinear frame 110. The first rectilinear frame 110 has a first rectilinear frame main body 111, five rectilinear protrusions A1, three rectilinear grooves a2, a bayonet groove e1, and a bayonet protrusion E0.

The rectilinear frame main body 111 is formed in a cylindrical shape, and has an inner peripheral face 110S and an outer peripheral face 110T.

The five rectilinear protrusions A1 are provided at the rear end of the outer peripheral face 110T. The five rectilinear protrusions A1 are engaged with the five rectilinear grooves a1 of the stationary frame 100.

The three rectilinear grooves a2 are formed in the inner peripheral face 110S in the optical axis direction.

The bayonet groove e1 is formed in an arc shape in the peripheral direction at the rear end of the inner peripheral face 110S. The bayonet groove e1 intersects the three rectilinear grooves a2.

The bayonet protrusion E0 is disposed at the front end of the inner peripheral face 110S. The bayonet protrusion E0 is formed in an arc shape in the peripheral direction. In this embodiment, a plurality of bayonet protrusions E0 are provided in the peripheral direction.

3. Configuration of First Rotary Frame 210

Figure 39:
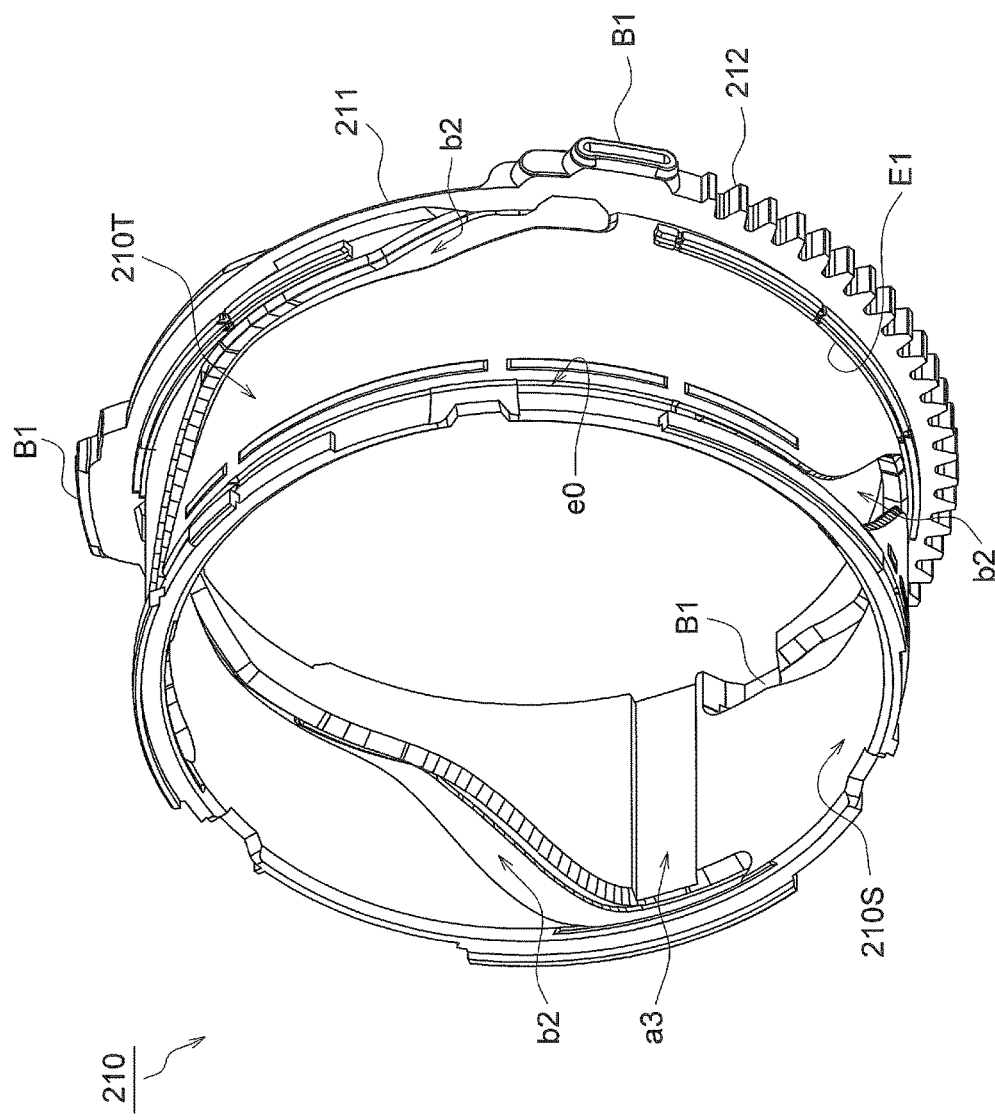
FIG. 39 is an oblique view of a first rotary frame.

FIG. 39 is an oblique view of the first rotary frame 210. The first rotary frame 210 has a first rotary frame main body 211 and the gear portion 212.

The first rotary frame main body 211 is formed in a cylindrical shape, and has an inner peripheral face 210S and an outer peripheral face 210T.

The gear portion 212 is provided to the rear end of the outer peripheral face 210T, and is formed in the peripheral direction. When the gear portion 212 meshes with the zoom gear 242, the first rotary frame 210 is rotated in the peripheral direction by the drive force of the zoom motor 241. Although not depicted, the gear portion 212 is located further to the rear than the rectilinear protrusions A1 of the first rectilinear frame 110.

The first rotary frame 210 has three cam followers B1, three bayonet protrusions E1, three cam grooves b2, a bayonet groove e0, and three rectilinear grooves a3. In FIG. 39, however, only one of the rectilinear grooves a3 is shown.

The three cam followers B1 are provided to the rear end of the outer peripheral face 210T. Two of the three cam followers B1 are disposed at the two ends of the gear portion 212. The three cam followers B1 are engaged with the three cam grooves b1 of the stationary frame 100.

The bayonet protrusions E1 are formed in the peripheral direction at the rear end of the outer peripheral face 210T. The bayonet protrusions E1 are disposed in front of the gear portion 212. The bayonet protrusions E1 are engaged with the bayonet groove e1 of the first rectilinear frame 110. In this embodiment, the bayonet protrusions E1 and the bayonet groove e1 constitute a bayonet mechanism for rotatably engaging the first rotary frame 210 in the first rectilinear frame 110.

The three cam grooves b2 pass through the first rotary frame main body 211 from the inner peripheral face 210S to the outer peripheral face 210T.

The bayonet groove e0 is formed at the front end of the outer peripheral face 210T. The bayonet groove e0 is formed in an arc shape in the peripheral direction. The bayonet groove e0 intersects the three cam grooves b2. The bayonet protrusions E0 are engaged with the bayonet groove e0.

The three rectilinear grooves a3 are formed in the inner peripheral face 210S in the optical axis direction. Two of the three rectilinear grooves a3 are close together, and are formed from 120° to 180° away from the other one.

4. Configuration of Second Rectilinear Frame 120

Figure 40:
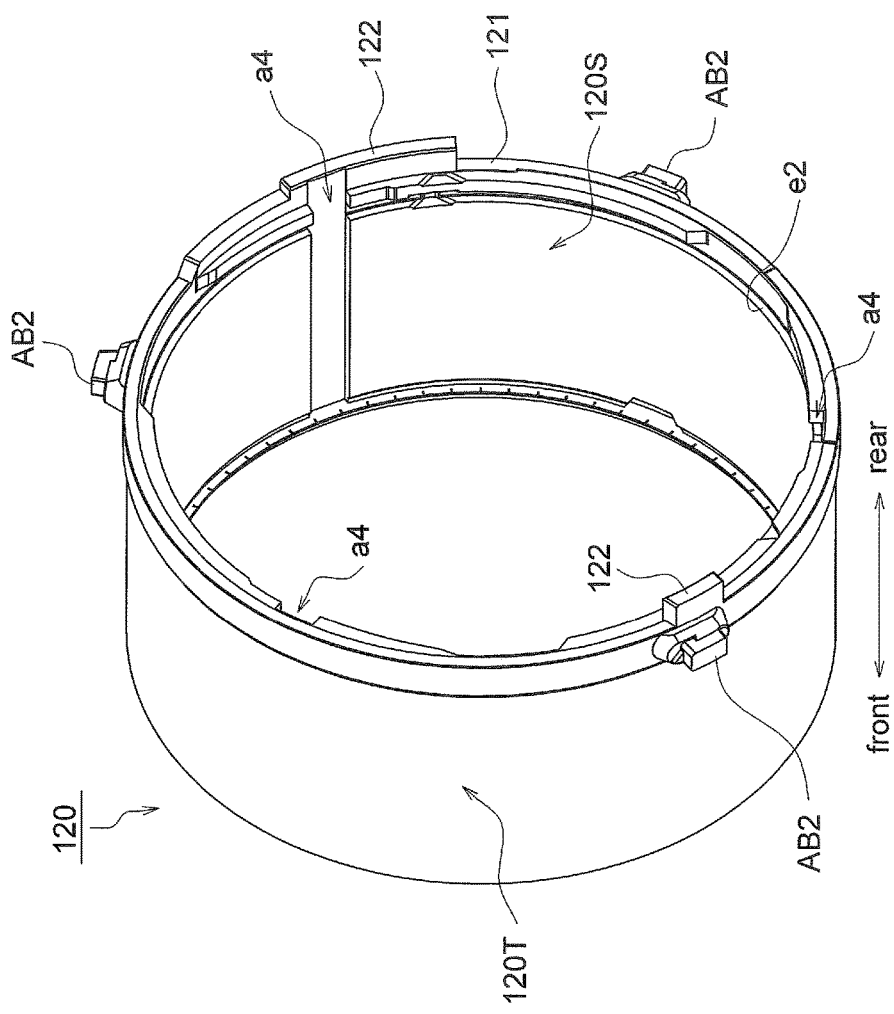
FIG. 40 is an oblique view of a second rectilinear frame.

FIG. 40 is an oblique view of the second rectilinear frame 120. The second rectilinear frame 120 has a second rectilinear frame main body 121 and two latching portions 122.

The second rectilinear frame main body 121 is formed in a cylindrical shape, and has an inner peripheral face 120S and an outer peripheral face 120T.

The two latching portions 122 are provided on the rear end face of the second rectilinear frame main body 121, and protrude toward the rear. The two latching portions 122 are formed at substantially symmetrical positions around the optical axis AX (see FIG. 3). As will be discussed below, when the two latching portions 122 are latched to the third rectilinear frame 130, the relative rotation of the third rectilinear frame 130 with respect to the second rectilinear frame 120 is checked. In this embodiment, one of the two latching portions 122 is formed longer in the peripheral direction than the other one.

The second rectilinear frame 120 has three rectilinear cam followers AB2, three rectilinear grooves a4, and the bayonet groove e2.

The three rectilinear cam followers AB2 are provided at the rear end of the outer peripheral face 120T, and are disposed at a substantially constant pitch in the peripheral direction. The three rectilinear cam followers AB2 are engaged with the three cam grooves b2 of the first rotary frame 210. Also, the three rectilinear cam followers AB2 pass through the three cam grooves b2 and are engaged with the three rectilinear grooves a2 of the first rectilinear frame 110.

The three rectilinear grooves a4 are formed in the inner peripheral face 120S in the optical axis direction. The three rectilinear grooves a4 are disposed at a substantially constant pitch in the peripheral direction.

The bayonet groove e2 is formed at the rear end of the inner peripheral face 120S. The bayonet groove e2 intersects the three rectilinear grooves a4.

5. Configuration of Second Rotary Frame 220

Figure 41:
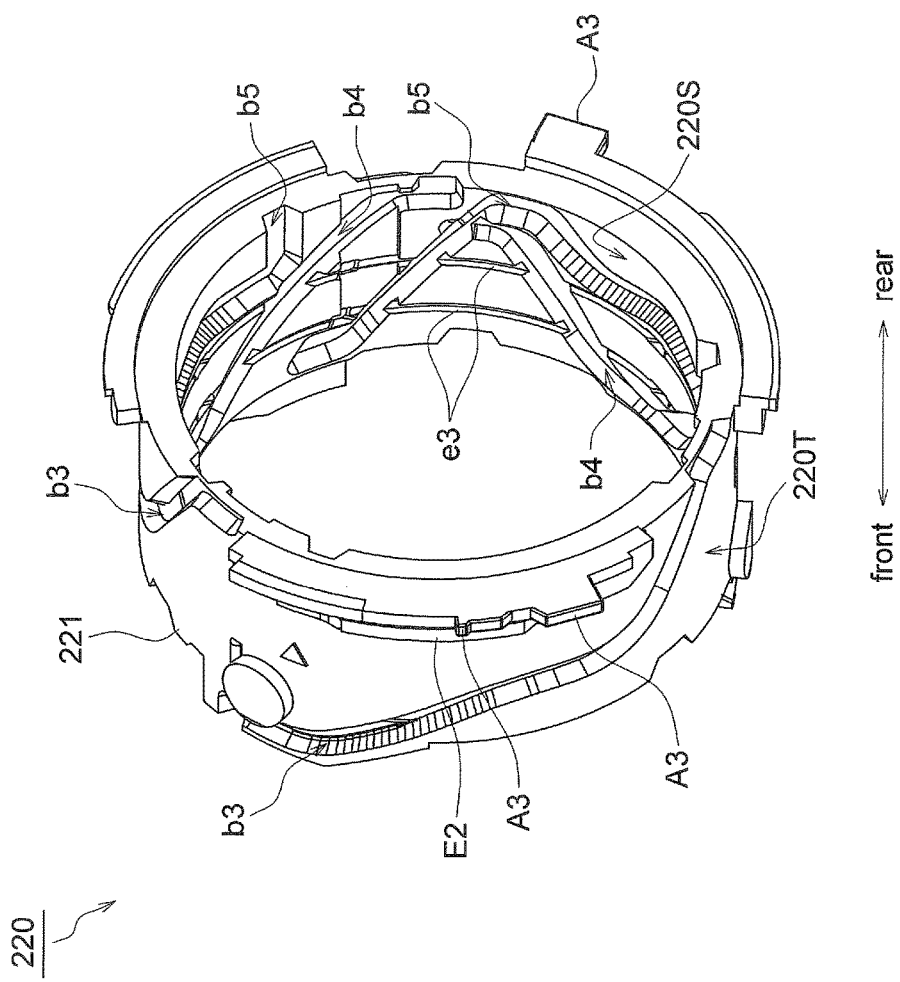
FIG. 41 is an oblique view of a second rotary frame.

FIG. 41 is an oblique view of the second rotary frame 220. The second rotary frame 220 has a second rotary frame main body 221, three rectilinear protrusions A3, three bayonet protrusions E2, two bayonet grooves e3, three cam grooves b3, three cam grooves b4, three cam grooves b5, and three cam followers B6. In FIG. 41, however, only two each of the cam grooves b3, the cam grooves b4, and the cam grooves b5 are shown.

The second rotary frame main body 221 is formed in a cylindrical shape, and has an inner peripheral face 220S and an outer peripheral face 220T.

The three rectilinear protrusions A3 are provided at the rear end of the outer peripheral face 220T, two of the three rectilinear protrusions A3 are close together in the peripheral direction, and the other one is separated by about 120° or more from the two rectilinear protrusions A3 that are close together. The three rectilinear protrusions A3 are engaged with the three rectilinear grooves a3 of the first rotary frame 210.

The three bayonet protrusions E2 are formed in the peripheral direction at the rear end of the outer peripheral face 220T. The three bayonet protrusions E2 are disposed in front of the three rectilinear protrusions A3. The bayonet protrusions E2 are engaged with the bayonet groove e2 of the second rectilinear frame 120. In this embodiment, the bayonet protrusions E2 and the bayonet groove e2 constitute a bayonet mechanism for rotatably engaging the second rotary frame 220 with the second rectilinear frame 120.

The two bayonet grooves e3 are formed in the approximate center of the inner peripheral face 220S in the peripheral direction. The two bayonet grooves e3 are formed parallel to each other. The two bayonet grooves e3 intersect with the cam grooves b4 and the cam grooves b5.

The three cam grooves b3 are formed in the outer peripheral face 220T so as to intersect with the optical axis direction, and are disposed at a substantially constant pitch in the peripheral direction.

The cam grooves b4 and the cam grooves b5 are formed in the inner peripheral face 220S. The cam grooves b4 and the cam grooves b5 intersect each other.

6. Configuration of Third Rectilinear Frame 130

Figure 42A:
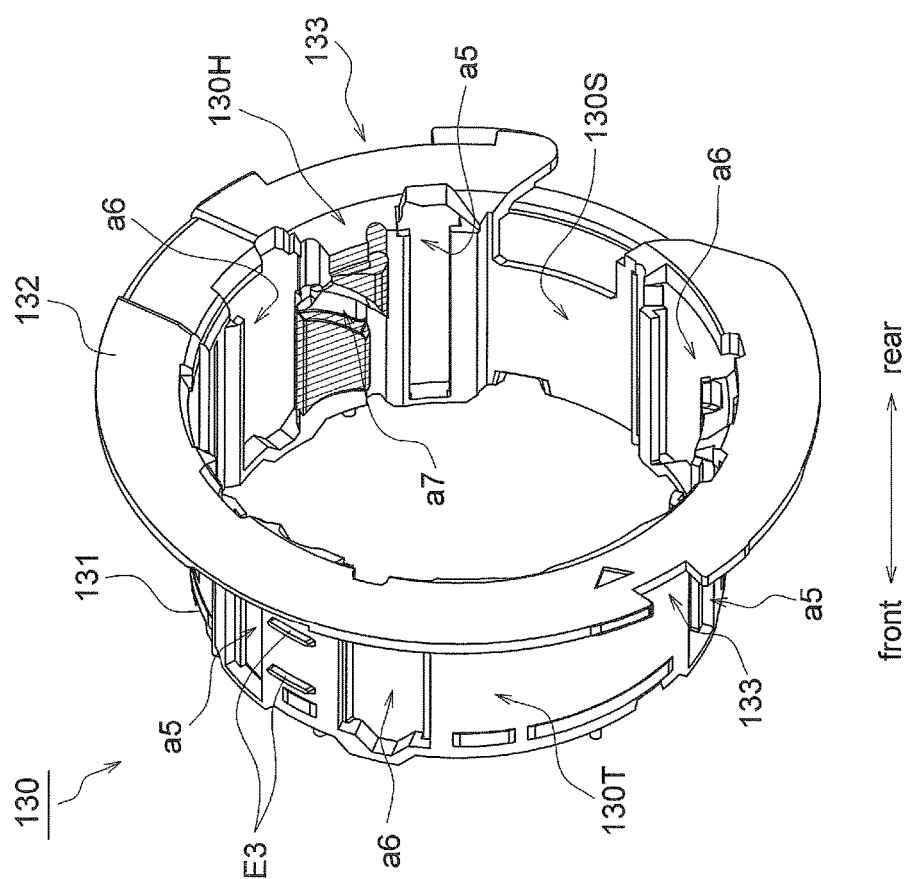
FIG. 42A is an oblique view of the third rectilinear frame.
Figure 42B:
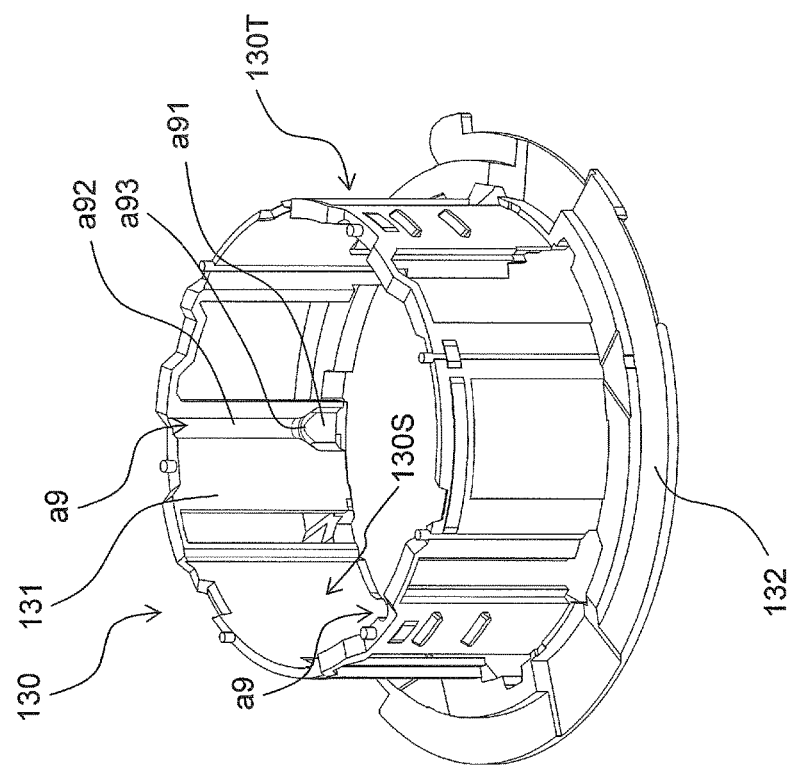
FIG. 42B is an oblique view of the third rectilinear frame.

FIGS. 42A and 42B are oblique views of the third rectilinear frame 130. The third rectilinear frame 130 has the third rectilinear frame main body 131, the flange 132, and the two latching recesses 133.

The third rectilinear frame main body 131 is formed in a cylindrical shape, and has an inner peripheral face 130S and an outer peripheral face 130T.

The flange 132 is formed in an annular shape, and is provided on the rear end of the outer peripheral face 130T.

Figure 43:
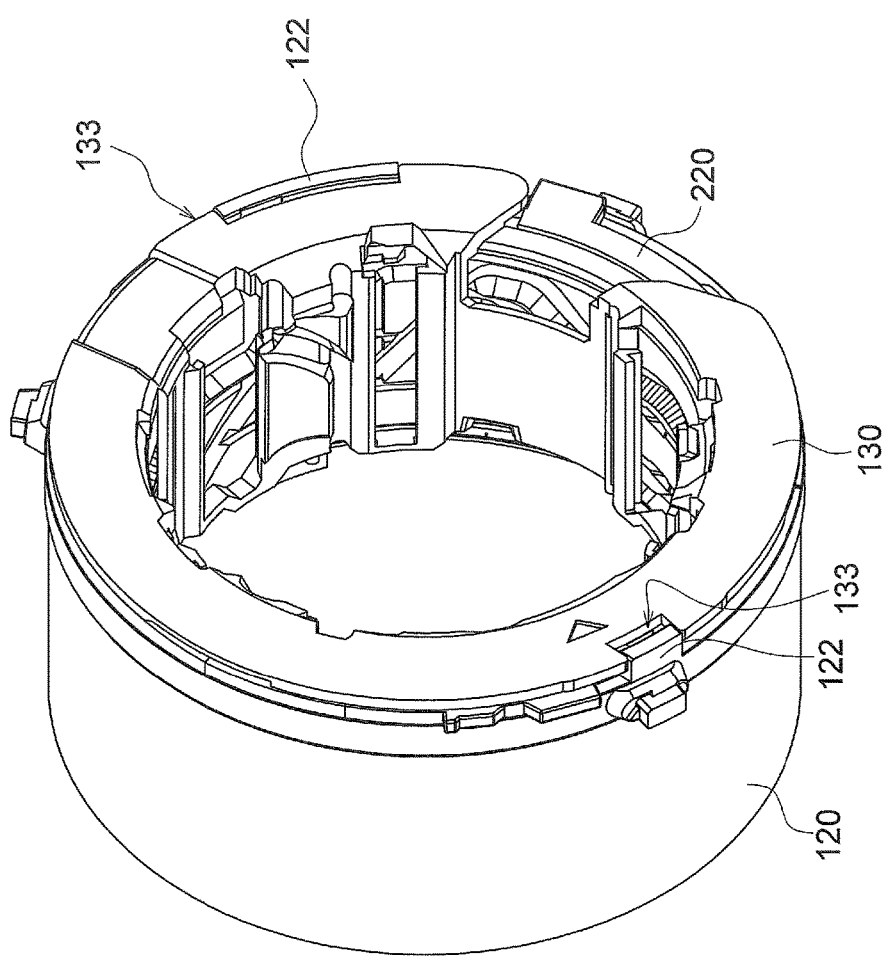
FIG. 43 is a simplified diagram of when the second rectilinear frame, the second rotary frame, and the third rectilinear frame have been assembled.

The two latching recesses 133 are cut-outs formed in the outer edge of the flange 132. The two latching recesses 133 are formed in substantially symmetrical positions around the optical axis AX (see FIG. 3). FIG. 43 is a schematic diagram in which the second rectilinear frame 120, the second rotary frame 220, and the third rectilinear frame 130 have been put together. As shown in FIG. 43, when the two latching portions 122 of the second rectilinear frame 120 are latched to the two latching recesses 133 of the third rectilinear frame 130, relative rotation of the third rectilinear frame 130 with respect to the second rectilinear frame 120 is checked. One of the two latching recesses 133 is formed longer in the peripheral direction than the other one, corresponding to the fact that one of the two latching portions 122 is formed longer in the peripheral direction than the other one. This increases the strength of the two latching recesses 133.

The third rectilinear frame 130 has two bayonet protrusions E3, three rectilinear grooves a5, and three rectilinear grooves a6. In FIG. 42A, however, only two of the bayonet protrusions E3 are shown.

The two bayonet protrusions E3 are formed in the peripheral direction in the approximate center of the outer peripheral face 130T. Two of the bayonet protrusions E3 are formed parallel to each other. The two bayonet protrusions E3 are engaged with the two bayonet grooves e3 of the second rotary frame 220. In this embodiment, the bayonet protrusions E3 and the bayonet grooves e3 constitute a bayonet mechanism for rotatably engaging the third rectilinear frame 130 with the second rotary frame 220.

The three rectilinear grooves a5 pass through the third rectilinear frame main body 131 from the inner peripheral face 130S to the outer peripheral face 130T. The three rectilinear grooves a5 extend in the optical axis direction, and are disposed at a substantially constant pitch in the peripheral direction.

The three rectilinear grooves a6 pass through the third rectilinear frame main body 131 from the inner peripheral face 130S to the outer peripheral face 130T. The three rectilinear grooves a6 extend in the optical axis direction, and are disposed at a substantially constant pitch in the peripheral direction.

In this embodiment, the three rectilinear grooves a5 and the three rectilinear grooves a6 are disposed alternately in the peripheral direction.

As shown in FIG. 42A, the third rectilinear frame 130 further has the guide groove a7 (an example of a first cam portion) formed in the inner peripheral face of the third rectilinear frame main body 131, and the reinforcing portion 130H (shaded part) formed near the guide groove a7.

The guide groove a7 guides the driven portion 411 (see FIG. 47A; discussed below) as a cam follower. The guide groove a7 and the driven portion 411 constitute a cam mechanism for moving the retracting lens frame 401. This cam mechanism changes the orientation of the retracting lens frame 401 when the third rectilinear frame 130 moves relative to the retracting lens frame 401 in the optical axis direction.

As shown in FIG. 42A, the guide groove a7 has a portion that is inclined to the optical axis direction (inclined part) and a portion is that parallel to the optical axis direction (parallel part). When the driven portion 411 is guided by this inclined part, the retracting lens frame 401 rotates around the retraction shaft 501b. The retracting lens frame 401 transitions between an image blur correction enabled position and a retracted position by rotating around the retraction shaft 501b.

The retracting lens frame 401 is biased by the rotary spring 403 from the retracted position toward the image blur correction enabled position. More precisely, this biasing direction is around the retraction shaft 501b, is perpendicular to the optical axis direction, and is a direction in which the retracting lens frame 401 enters its imaging enabled state. Specifically, this biasing direction is a direction in which the optical axis direction of the third lens group L3 is aligned with the optical axis direction of the other lenses.

Therefore, when the guide groove a7 and the driven portion 411 cause the retracting lens frame 401 to rotate against the biasing force of the rotary spring 403, the driven portion 411 comes into contact with one side (one side face) of the guide groove a7. The guide groove a7 is in the form of a groove. Specifically, the guide groove a7 is made up of three faces. These three faces constitute a side face on the front side in the optical axis direction, a side face on the rear side in the optical axis direction, and a bottom face that is parallel to the optical axis direction and connects the first two faces. The contact face of the guide groove a7 that comes into contact with the driven portion 411 is the side face on the rear side in the optical axis direction. Therefore, the retracting lens frame 401 is rotated as long as the side face on the rear side in the optical axis direction is provided.

However, because the guide groove a7 is groove shaped, that is, consists of three faces, the position of the driven portion 411 is reliably maintained by the guide groove a7 even if the camera is dropped, subjected to an impact, etc., so the orientation of the retracting lens frame 401 is kept stable. Furthermore, even if the rotational load of the retracting lens frame 401 is increased over the rotational force of the rotary spring 403 due to the influence of wear through continuous use or of the adhesion of foreign matter in the guide groove a7, the retracting lens frame 401 is forcibly rotated.

The side face on the front side in the optical axis direction and the side face on the rear side in the optical axis direction of the guide groove a7 are formed in a tapered shape (that is, a sloped face shape) with respect to the direction perpendicular to the optical axis direction. The angle of the sloped face to the direction perpendicular to the optical axis direction is smaller for the side face on the rear side in the optical axis direction than for the side face on the front side in the optical axis direction. The smaller is the angle of the sloped face to the direction perpendicular to the optical axis direction, the less torque loss is produced by the rotational load.

As discussed above, during normal operation, that is, when the camera is not dropped or otherwise subjected to impact, and there is no adhered foreign matter, worn parts, etc., only the side face on the rear side in the optical axis direction is in contact with the driven portion 411. Accordingly, the above effect can be obtained as long as at least the angle of the side face on the rear side in the optical axis direction with respect to the direction perpendicular to the optical axis is small.

Because the guide groove a7 that engages with the driven portion 411 is formed in the third rectilinear frame 130, rotation of the retracting lens frame 401 is started earlier during the transition period between the imaging enabled state and the housed state. If the guide groove a7 is provided to the stationary portion of the imaging element holder or the like, the retracting lens frame 401 usually is remote from the stationary portion in the optical axis direction. Accordingly, during the transition period between the imaging enabled state and the housed state, the guide groove a7 and the retracting lens frame 401 cannot be instantly engaged, and the rotation of the retracting lens frame 401 cannot be started right away.

In contrast, if the guide groove a7 is provided to the third rectilinear frame 130, then during the transition period between the imaging enabled state and the housed state, the guide groove a7 and the driven portion 411 always are close enough to engage. Accordingly, if the guide groove a7 is provided to the third rectilinear frame 130, the rotation of the retracting lens frame 401 is started right away during the transition period between the imaging enabled state and the housed state.

Also, because the guide groove a7 that engages with the driven portion 411 is formed in the third rectilinear frame 130, this improves the rotational accuracy of the retracting lens frame 401. For example, if the guide groove a7 is provided to the stationary portion of the imaging element holder or the like, there is the risk that more parts will be in between the driven portion 411 and the guide groove a7. The more of these parts there are, the worse is the relative positional accuracy of the retracting lens frame 401. In contrast, if the guide groove a7 is provided to the third rectilinear frame 130, there are relatively few parts in between the driven portion 411 and the guide groove a7, so the relative positional accuracy of the retracting lens frame 401 is increased.

Also, as discussed above, if the guide groove a7 is provided to the stationary portion of the imaging element holder or the like, there will be more parts in between the driven portion 411 and the guide groove a7, so this adversely affects the relative rotational accuracy of the retracting lens frame 401. Furthermore, if the retracting lens frame 401 is mounted to the OIS frame 400 so as to be rotatable around an axis parallel to the optical axis, there is a further loss of relative rotational accuracy between the driven portion 411 and the guide groove a7. To put this another way, if a retraction mechanism is constituted and the OIS frame 400 is mounted to the shutter frame 335 so as to be able to operate in a plane perpendicular to the optical axis (that is, if an image blur correction mechanism is constituted), there is a further loss of relative rotational accuracy between the driven portion 411 and the guide groove a7. However, if the guide groove a7 is provided to the third rectilinear frame 130, there is relatively few parts in between the driven portion 411 and the guide groove a7, so there is better relative rotational accuracy of the retracting lens frame 401.

Also, because the guide groove a7 that engages with the driven portion 411 is formed in the third rectilinear frame 130, the guide groove a7 is easily constituted by three faces, namely, the side face on the front side in the optical axis direction, the side face on the rear side in the optical axis direction, and the face (bottom face) that is parallel to the optical axis and connects the above-mentioned two faces.

On the other hand, if the guide groove a7 is provided to the stationary portion of the imaging element holder or the like, the guide groove a7 has to be formed in the stationary portion of the imaging element holder. Here, if an attempt is made to form the three faces constituting the guide groove a7 in the stationary portion of the imaging element holder, then the stationary portion of the imaging element holder or the like ends up being larger. Also, if the guide groove a7 is formed in a small space in order to avoid making the stationary portion of the imaging element holder larger, then the guide groove a7 does not be strong enough.

However, if the guide groove a7 is provided to the third rectilinear frame 130, since the third rectilinear frame 130 is cylindrical, it is easy to provide the three faces of the guide groove a7. Also, in this case there is no need to form the guide groove a7 in the stationary portion of the imaging element holder or the like, so there is no need to make the stationary portion of the imaging element holder larger. Also, in this case, since the portion where the guide groove a7 is formed is cylindrical, the strength of the guide groove a7 can also be improved.

Furthermore, because the guide groove a7 that engages with the driven portion 411 is formed in the third rectilinear frame 130, centering during retraction can be performed more accurately. If the guide groove a7 is provided to the third rectilinear frame 130, a mechanism for centering the OIS frame 400 also is formed in the third rectilinear frame 130. Accordingly, there is better positional accuracy of the retracting lens frame 401 and the OIS frame 400.

The reinforcing portion 130H is formed locally on the third rectilinear frame main body 131. The reinforcing portion 130H is formed on the inner peripheral face of the third rectilinear frame main body 131. More specifically, the reinforcing portion 130H is formed on the third rectilinear frame main body 131 so as to protrude toward the inside of the third rectilinear frame main body 131. That is, using the outer peripheral face of the third rectilinear frame main body 131 as a reference, the reinforcing portion 130H is formed so that the thickness of the reinforcing portion 130H increases toward the inner peripheral side over the thickness of the other portion. The reinforcing portion 130H is formed near the guide groove a7, such as adjacent to the guide groove a7.

The thickness of the reinforcing portion 130H is determined by the depth of the guide groove a7. Specifically, the thickness of the reinforcing portion 130H is set so that the depth of the guide groove a7 (the radial direction dimension of the guide groove a7) fits in the reinforcing portion 130H. The depth of the guide groove a7 is determined by the size (height) of the driven portion 411 inserted into the guide groove a7. The depth of the guide groove a7 (the radial direction dimension of the guide groove a7) is set so as to accommodate the height of the driven portion 411 (the radial direction dimension of the driven portion 411).

The thickness of the third rectilinear frame main body 131 is preferably as thin as possible in order to reduce the outside diameter of the lens barrel 20. However, the cam mechanism for moving the retracting lens frame 401, that is, the portion where the guide groove a7 and the driven portion 411 engage, needs to be strong, so a certain amount of thickness is necessary. If this portion having a certain thickness is formed on the inner peripheral face side of the third rectilinear frame main body 131, the outside diameter of the third rectilinear frame main body 131 is kept from becoming larger. Specifically, an increase in the outside diameter of the lens barrel 20 is suppressed.

As shown in FIG. 42B, the third rectilinear frame 130 has three shunting grooves a9 for restricting movement of the OIS frame 400 with respect to the shutter frame 335 or the third rectilinear frame 130. The three shunting grooves a9 are formed in the inner peripheral face 130S of the third rectilinear frame main body 131. The three shunting grooves a9 are formed in the third rectilinear frame main body 131 spaced a specific distance apart from each other in the peripheral direction on the inner peripheral face 130S.

The three shunting grooves a9 are grooves extending in the optical axis direction. The shunting grooves a9 are formed so that the groove part is larger on the flange 132 side. More specifically, the shunting grooves a9 have a first groove a91, a second groove a92, and a third groove a93. The first groove a91 and the second groove a92 are such that the shape of their cross section perpendicular to the optical axis is semicircular, semi-elliptical, trapezoidal, rectangular, parabolic, or a combination of these.

The first groove a91 is a groove part formed on the flange 132 side. The width and depth of the first groove a91 are greater than the width and depth of the second groove a92. The third groove a93 is in the form of a sloped face, a conical face, a curved face, or a shape that is a combination of these, so as to smoothly change from the width and depth of the first groove a91 to the width and depth of the second groove a92. When the shunting protrusions 404 (see FIG. 48A) of the OIS frame 400 (discussed below) are disposed in the first grooves a91, the shunting protrusions 404 are movable inside the first grooves a91. Specifically, in this case the OIS frame 400 is movable within a plane perpendicular to the optical axis with respect to the third rectilinear frame 130 or the shutter frame 335.

The second groove a92 is a groove part extending in the optical axis direction from the first groove a91. When the shunting protrusions 404 (see FIG. 48A) of the OIS frame 400 (discussed below) are disposed in the second grooves a92, the OIS frame 400 is constricted in the radial direction and the peripheral direction with respect to the third rectilinear frame 130 or the shutter frame 335. Consequently, movement of the OIS frame 400 is restricted with respect to the third rectilinear frame 130 or the shutter frame 335.

The third groove a93 is a groove part extending in the optical axis direction, and links the first groove a91 and the second groove a92. When the shunting protrusions 404 (see FIG. 48A) of the OIS frame 400 (discussed below) are disposed in the third grooves a93, the OIS frame 400 transitions from a state of being movable within a plane perpendicular to the optical axis with respect to the third rectilinear frame 130 or the shutter frame 335, to a state of being gradually restricted in the radial direction and the peripheral direction.

Specifically, when the shunting protrusions 404 of the OIS frame 400 are disposed from the first grooves a91, via the third grooves a93, in the second grooves a92, this centers the OIS frame 400.

The mechanism for centering the OIS frame 400 (centering mechanism) is constituted by the shunting grooves a9 (a91, a92, and a93) of the third rectilinear frame 130 and the shunting protrusions 404 of the OIS frame 400.

7. Configuration of First Lens Group Frame 310

Figure 44:
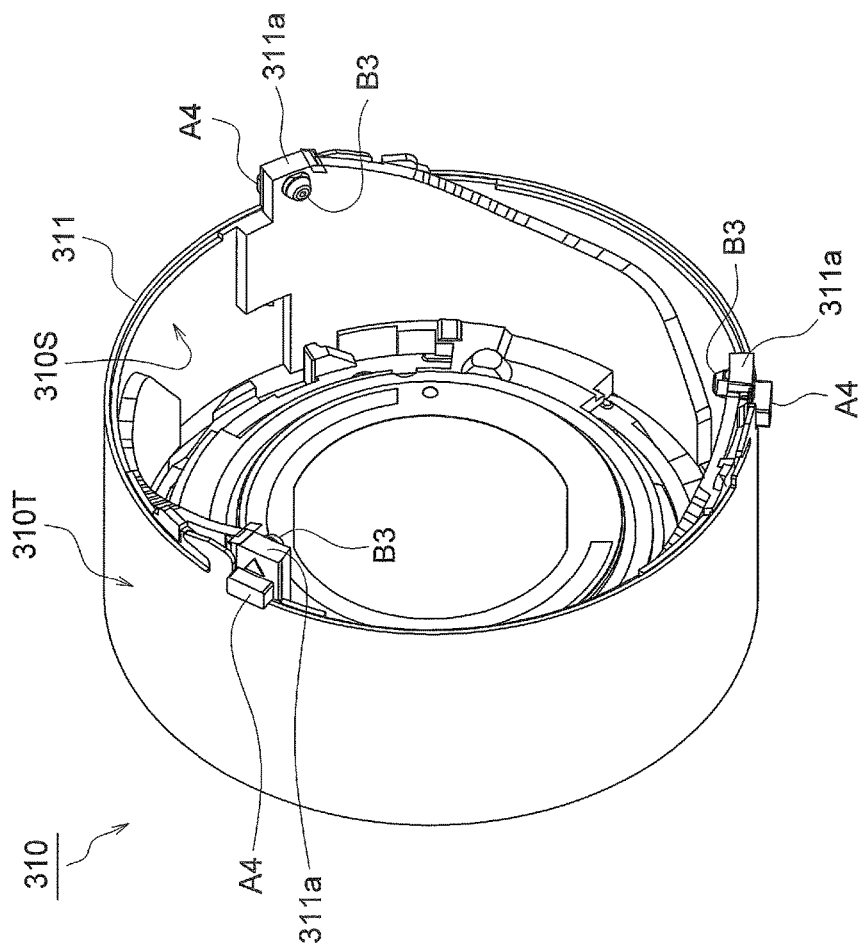
FIG. 44 is an oblique view of a first lens group frame.

FIG. 44 is an oblique view of the first lens group frame 310. The first lens group frame 310 has a first lens group frame main body 311, three rectilinear protrusions A4, and three cam followers B3.

The first lens group frame main body 311 is formed in a cylindrical shape, and has an inner peripheral face 310S and an outer peripheral face 310T. Three protrusions 311a that protrude toward the rear are formed on the first lens group frame main body 311.

The three rectilinear protrusions A4 are provided to the outer peripheral face 310T of the protrusions 311a, and are disposed at a substantially constant pitch in the peripheral direction. The three rectilinear protrusions A4 are engaged with the three rectilinear grooves a4 of the second rectilinear frame 120.

The three cam followers B3 are provided to the inner peripheral face 310S of the protrusions 311a, and are disposed at a substantially constant pitch in the peripheral direction. The three cam followers B3 are engaged with the three cam grooves b3 of the second rotary frame 220.

In this embodiment, the three rectilinear protrusions A4 and the three cam followers B3 are disposed substantially opposite each other, with the protrusions 311a in between.

8. Configuration of Second Lens Group Frame 320

Figure 45A:
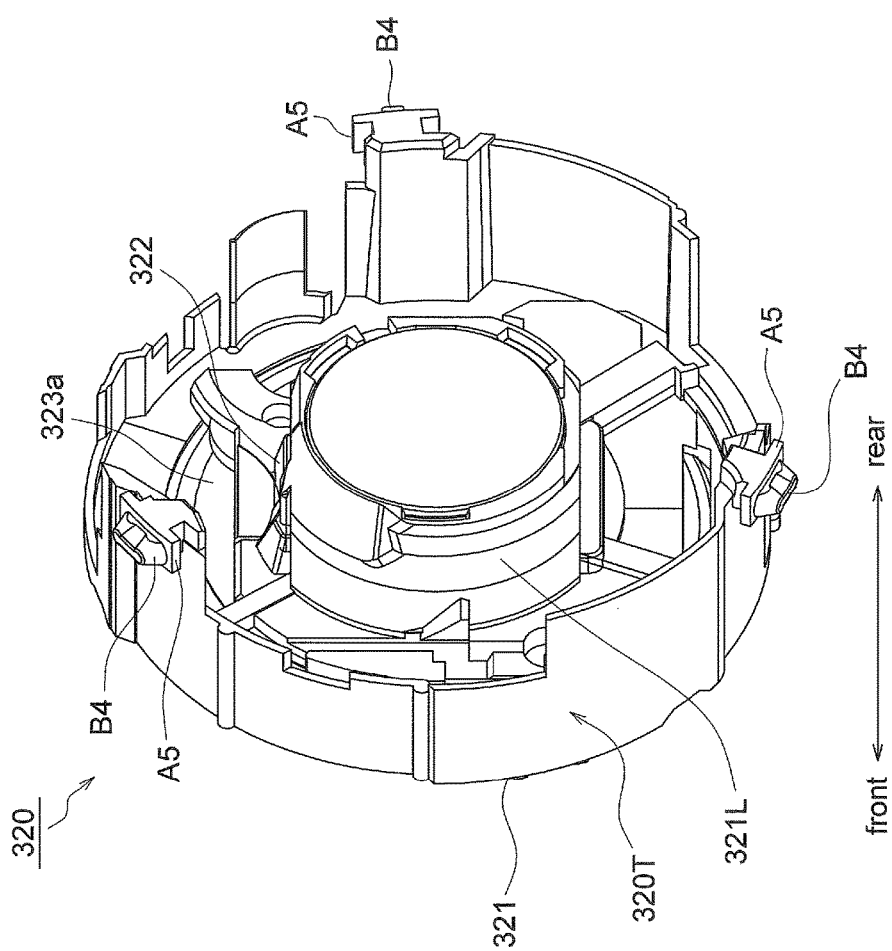
FIG. 45A is an oblique view of a second lens group frame.
Figure 45B:
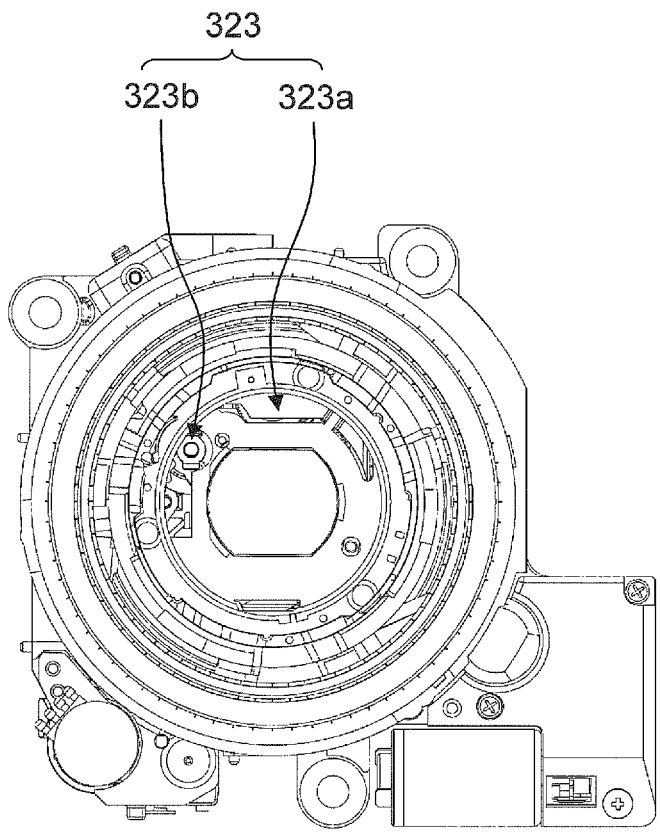
FIG. 45B is a diagram of a second lens group frame as viewed from the front.
Figure 45C:
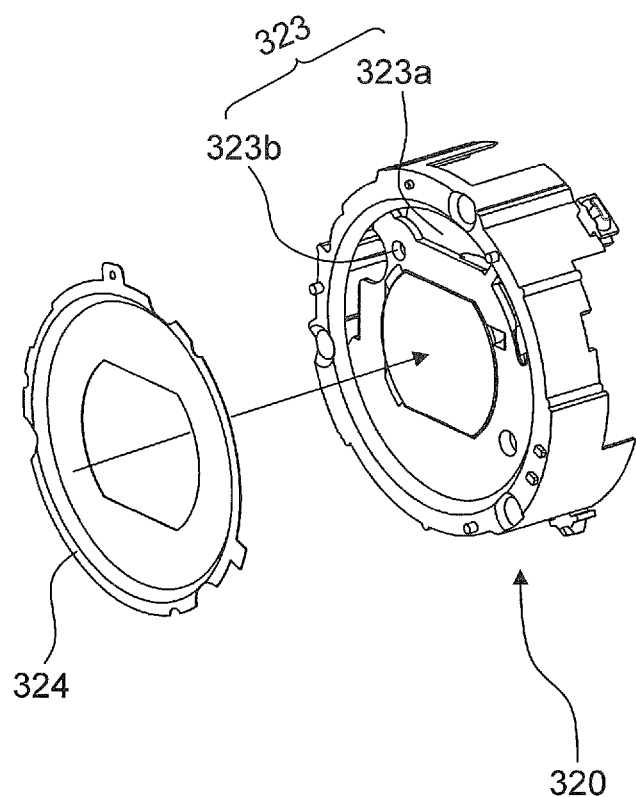
FIG. 45C is an oblique view of the relation between the second lens group frame and a sheet member.

FIG. 45A is an oblique view of the second lens group frame 320. FIG. 45B is a view of the second lens group frame 320 from the front. FIG. 45C is an oblique view of the relation between the second lens group frame 320 and the sheet member 324.

As shown in FIG. 45A, the second lens group frame 320 has a second lens group frame main body 321, a second lens support 321L for supporting the second lens group L2, a housing receptacle 322 (an example of a restrictor that restricts movement of the retracting lens frame 401; discussed below), a housing portion 323, three rectilinear protrusions A5, and three cam protrusions B4.

The second lens group frame main body 321 is formed in a cup shape, and has an outer peripheral face 320T.

The housing receptacle 322 is used to position the retracting lens frame 401 by restricting movement of the retracting lens frame 401 during the transition period between the imaging enabled state and the housed state, and coming into contact with the positioning portion 412 of the retracting lens frame 401. As shown in FIG. 45A, the housing receptacle 322 is formed integrally with the second lens group frame main body 321. More precisely, the housing receptacle 322 is formed integrally with the second lens group frame main body 321 on the outer peripheral part of the second lens support 321L (the portion supporting the second lens group L2). The housing receptacle 322 has the guide portion 322*a* that guides the 301 to the retracted position by coming into contact with the positioning portion 412 of the retracting lens frame 401, and the support portion 322*b* that supports the retracting lens frame 401 at the retracted position (see FIG. 50A).

The guide portion 322*a* has a sloped face. The sloped face is formed so that the distance from the optical axis AX decreases moving toward the imaging element side along the optical axis AX.

The cam mechanism constituted by the guide groove a7 and the driven portion 411 is such that the third rectilinear frame 130 moves relatively in the optical axis direction with respect to the retracting lens frame 401, which changes the orientation of the retracting lens frame 401. After this, the positioning portion 412 of the retracting lens frame 401 is brought into contact with the guide portion 322*a* (sloped face), which guides the retracting lens frame 401 to the retracted position.

The support portion 322*b* is a portion extending in the optical axis direction, and supports the retracting lens frame 401. As discussed above, the positioning portion 412 of the retracting lens frame 401 guided by the guide portion 322*a* is supported in a state of being in contact with the support portion 322*b*.

As shown in FIGS. 45A to 45C, the housing portion 323 is a portion for housing at least part of the OIS frame 400 and the retracting lens frame 401 in the retracted state. The housing portion 323 has a first housing portion 323*a* and a second housing portion 323*b*.

The first housing portion 323*a* is used to house a second linking portion 408 of the OIS frame 400 (discussed below). The first housing portion 323*a* is a hole provided on the front face side of the second lens group frame main body 321. The first housing portion 323*a* is provided above the second lens group L2. The first housing portion 323*a* is formed in a shape substantially similar to the outer shape of the second linking portion 408.

At least part of the first housing portion 323*a* and at least part of the second linking portion 408 overlap in the optical axis direction. This allows the size of the lens barrel 20 to be smaller in the optical axis direction in the housed state.

The second housing portion 323*b* is used to house the retraction shaft 501*b*. The second housing portion 323*b* is a hole provided on the front face side of the second lens group frame main body 321. The second housing portion 323*b* is formed in a substantially circular shape.

As shown in FIG. 45B, the sheet member 324 is affixed to the front face of the second lens group frame 320. The sheet member 324 prevents light from leaking out of the hole in the front face of the second lens group frame 320 (including the housing portion 323).

The three rectilinear protrusions A5 are formed on the rear end of the outer peripheral face 320T, and are disposed at a substantially constant pitch in the peripheral direction. The three rectilinear protrusions A5 are engaged with the three rectilinear grooves a5 of the third rectilinear frame 130.

The three cam protrusions B4 are formed on the three rectilinear protrusions A5. The three cam protrusions B4 are engaged with the three cam grooves b4 of the second rotary frame 220.

9. Configuration of Third Lens Group Frame 330

Figure 46A:
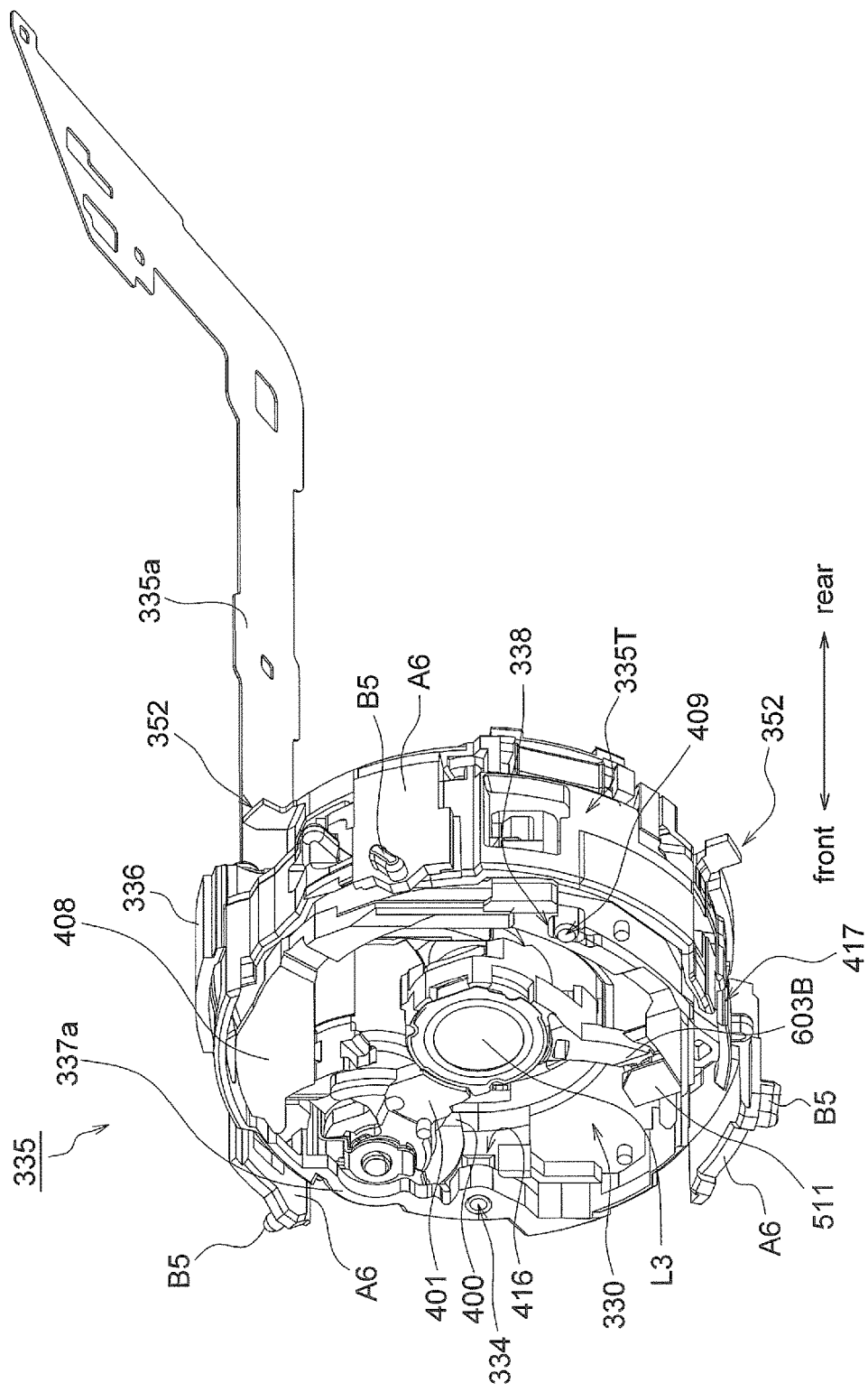
FIG. 46A is an oblique view of a shutter frame.

FIG. 46A shows the state when the third lens group frame 330 has been housed in the interior of the shutter frame 335. The configuration of the third lens group frame 330 will be described through reference to FIG. 46A.

The third lens group frame 330 (an OIS (optical image stabilizer) unit) mainly has the OIS frame 400 (an example of a support frame), the retracting lens frame 401, the thrust spring 402 (an example of a first biasing means), the rotary spring 403 (an example of a second biasing means, and an example of a biasing member), and the third lens group L3 for image blur correction.

Figure 47A:
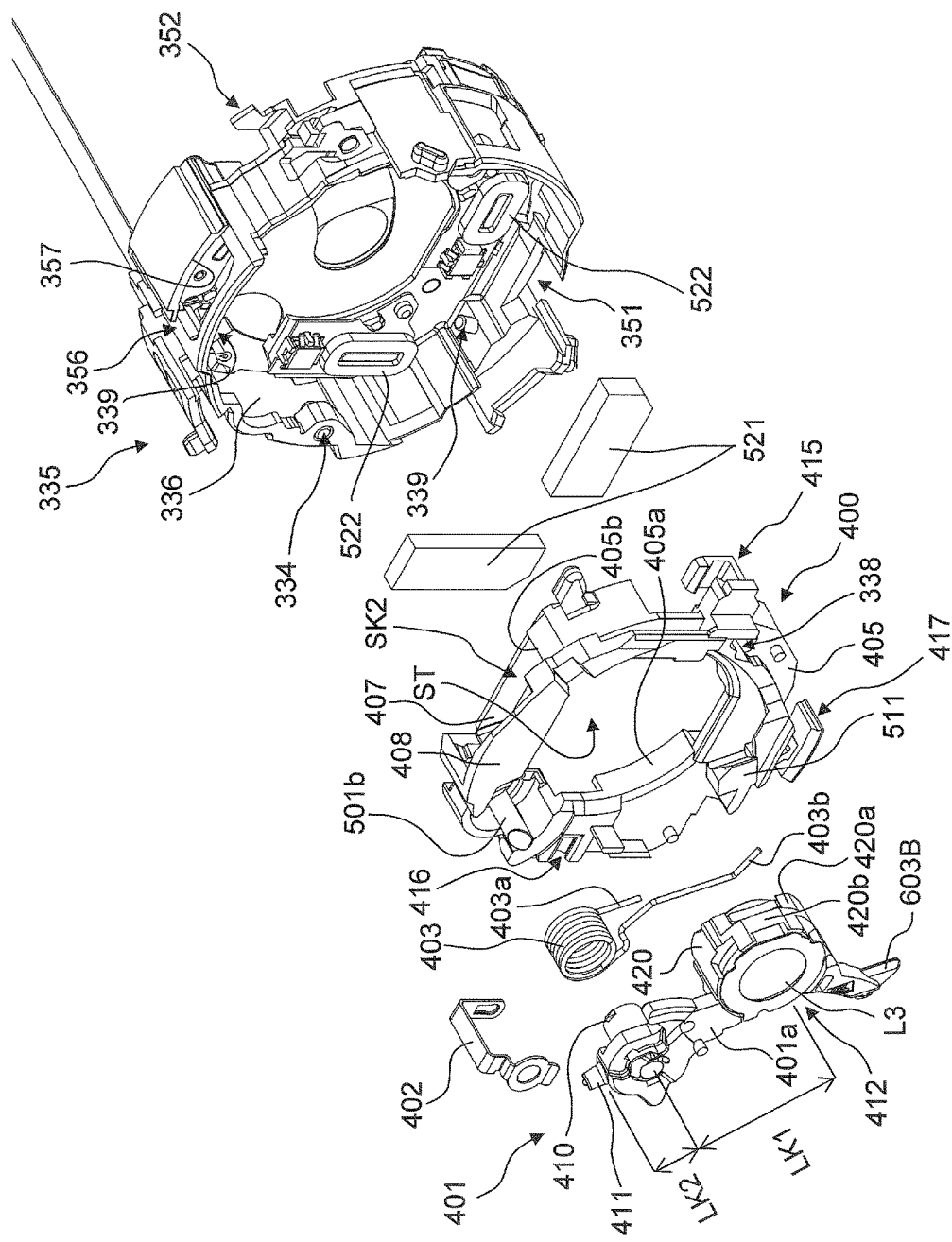
FIG. 47A is an oblique view of the shutter frame, the OIS frame, and the retracting lens frame.

As shown in FIGS. 46A and 47A, the OIS frame 400 is mounted to the shutter frame 335. The optical axis direction position of the OIS frame 400 with respect to the shutter frame 335 is maintained because three OIS shafts 339 that are press-fitted to the shutter frame 335 are inserted into optical axis direction maintenance portions 415 at three places on the OIS frame 400 (only two of the optical axis direction maintenance portions 415 are shown in FIG. 47A). As shown in FIG. 47A, the position of the OIS frame 400 in a direction perpendicular to the optical axis with respect to the shutter frame 335 is maintained because one OIS rotary shaft 334 press-fitted to the shutter frame 335 is inserted into a perpendicular direction maintenance portion 416 at one place on the OIS frame 400 in the optical axis direction, and an optical axis direction stopper pin 409 comes into contact with the peripheral wall of a movable range restrictor 338 of the OIS frame 400 (see FIG. 51B).

Figure 48A:
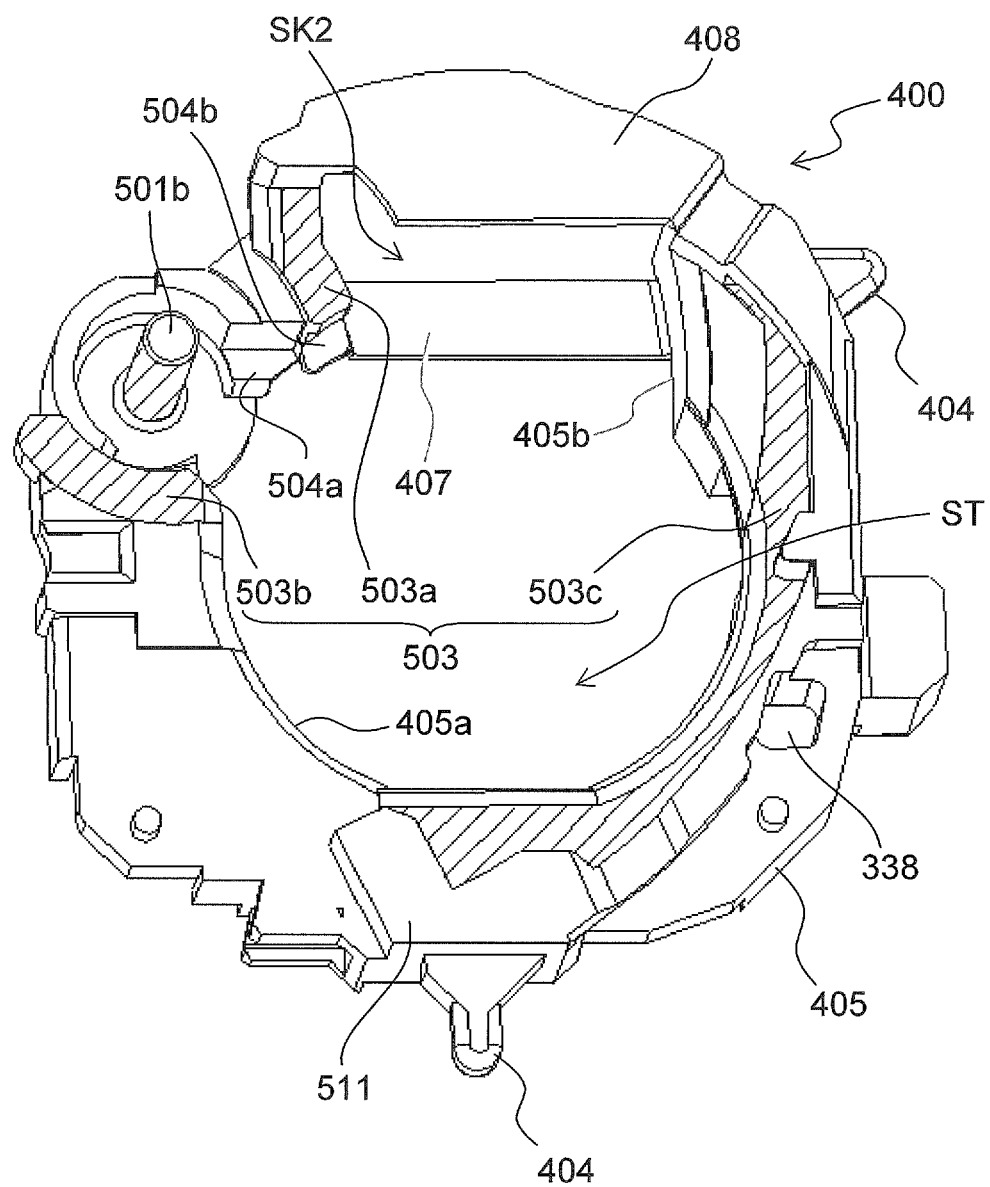
FIG. 48A is an oblique view of the OIS frame.

As shown in FIGS. 47A and 48A, a space ST is formed in the OIS frame 400 in order to house the third lens support 420 that supports the third lens group L3 supported by the retracting lens frame 401 in the imaging enabled state. When the retracting lens frame 401 has been retracted, the second lens support 321L of the second lens group frame 320 is housed in this space ST.

The OIS frame 400 also has a main body portion 405, a first linking portion 407, and the second linking portion 408. The main body portion 405 has a hole 405*a* and a first cut-out 405*b* (an example of a cut-out in the OIS frame 400).

The hole 405*a* forms the above-mentioned space ST. The hole 405*a* is formed in the center of the main body portion 405. The third lens support 420 that supports the third lens group L3 in the imaging enabled state is disposed in the hole 405*a*. The hole 405*a* also houses the second lens support 321L of the second lens group frame 320 when retracted.

The first cut-out 405*b* is formed contiguous with the hole 405*a*. The first cut-out 405*b* is formed on the outer peripheral part of the main body portion 405.

The first linking portion 407 serves to increase the strength of the main body portion 405. The first linking portion 407 is formed integrally with the main body portion 405. More specifically, the first linking portion 407 is formed integrally with the main body portion 405, spanning to the first cut-out 405*b*, on the shutter frame 335 side of the main body portion 405.

Figure 46B:
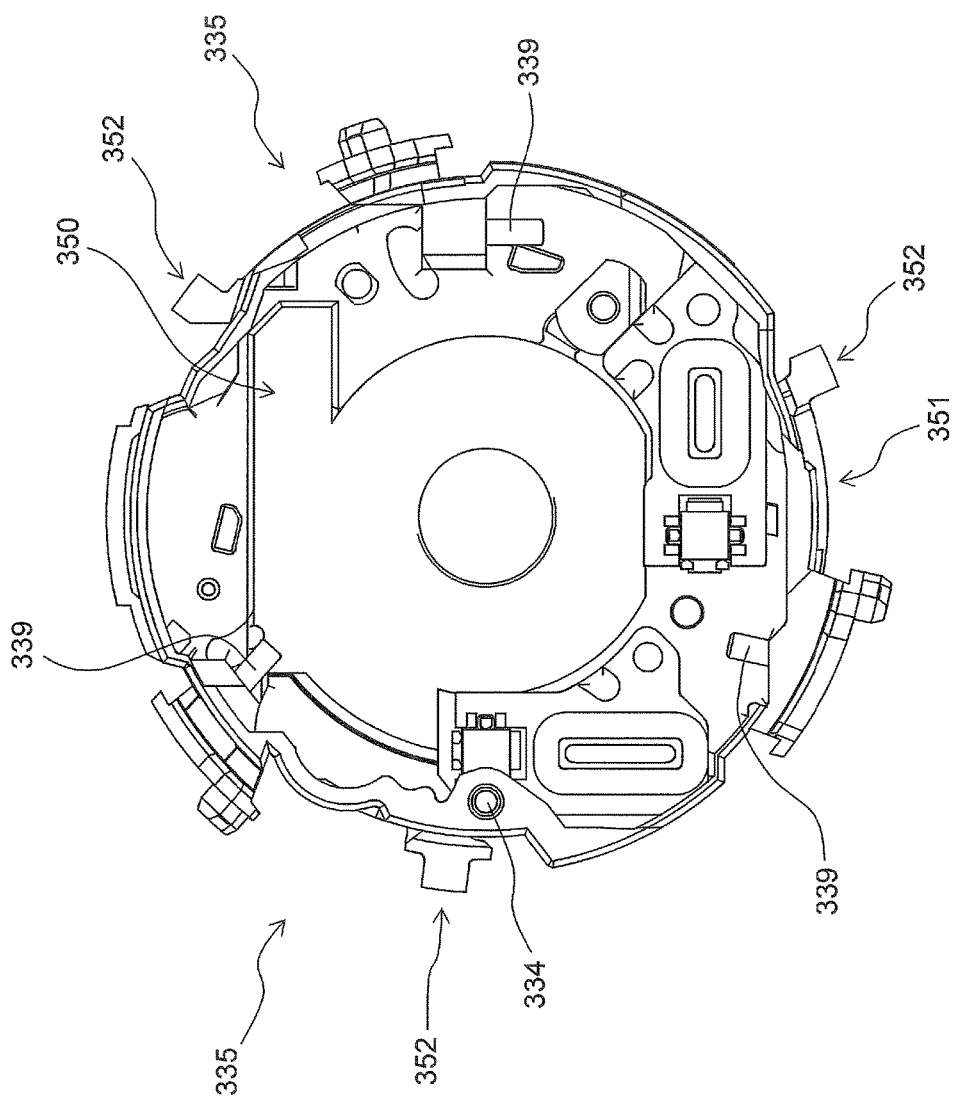
FIG. 46B is a diagram of the shutter frame as viewed from the subject side.
Figure 47B:
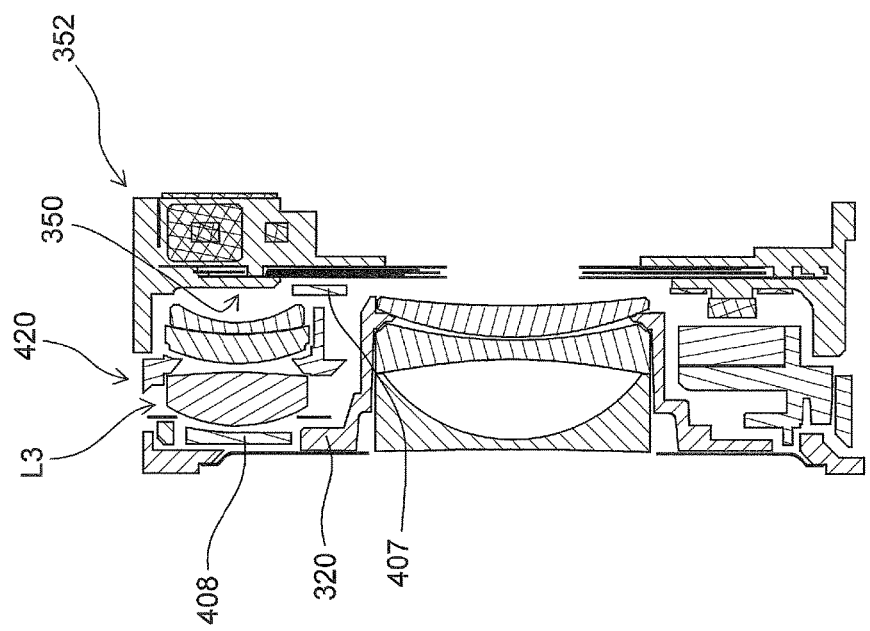
FIG. 47B is a cross section of the shutter frame, the OIS frame, the retracting lens frame, and the second lens group frame.

Also, as shown in FIGS. 46B and 47B, the portion of the shutter frame 335 that is opposite the first linking portion 407 at the face of a shutter frame main body 336 on the front side in the optical axis direction is locally made thinner, and the first linking portion 407 goes into this thinner part 350. Specifically, at least part of the shutter frame 335 and at least part of the first linking portion 407 overlap in the optical axis direction. This allows the lens barrel 20 to be even smaller in the optical axis direction.

The protrusions 404 (see FIG. 48A) used to center the OIS frame 400 substantially at an optical axis position protrude in the radial direction from the side faces of the OIS frame 400. The side wall holes 351 are provided in the shutter frame main body 336 side walls as shown in FIG. 47A in order to insert these protrusions 404 into the side walls of the shutter frame main body 336. The OIS frame 400 comprises side walls 417 that substantially cover the side wall holes 351 in the shutter frame main body 336. This prevents light from leaking through the side wall holes 351 in the shutter frame main body 336.

As shown in FIG. 46B, three light blocking walls 352 that protrude in the radial direction are formed on the side faces of the shutter frame main body 336. The peripheral direction positions of the three light blocking walls 352 correspond to the peripheral direction positions of the three rectilinear grooves a6 of the third rectilinear frame 130. The peripheral direction width of the three light blocking walls 352 is substantially the same as or less than the peripheral direction width of the three rectilinear grooves a6 of the third rectilinear frame 130. This prevents light from leaking out through the three rectilinear grooves a6 of the third rectilinear frame 130.

As shown in FIG. 48A, the OIS frame 400 has the shunting protrusions 404 that engage with the shunting grooves a9 of the third rectilinear frame 130. The shunting protrusions 404 are formed integrally with the main body portion 405 of the OIS frame 400. More specifically, the two shunting protrusions 404 are formed on the main body portion 405 so as to protrude outward from the outer peripheral part of the main body portion. Also, the two shunting protrusions 404 are formed integrally with the main body portion 405, spaced apart by a specific distance, around the outer peripheral part of the main body portion 405. The two shunting protrusions 404 are specially fitted into and guided by the two shunting grooves a9 of the third rectilinear frame 130.

More specifically, when the OIS frame 400 moves closer to the third rectilinear frame 130 in a state in which the OIS frame 400 has been mounted to the shutter frame 335, the shunting protrusions 404 formed on the OIS frame 400 are introduced from the flange 132 side of the third rectilinear frame 130 into the first grooves a91 of the third rectilinear frame 130. In a state in which the shunting protrusions 404 are disposed in the first grooves a91, the OIS frame 400 is movable within a plane perpendicular to the third rectilinear frame 130 or the shutter frame 335.

Then, when the OIS frame 400 moves further in the optical axis direction on the inner peripheral side of the third rectilinear frame 130 in a state in which the OIS frame 400 has been mounted to the shutter frame 335, the shunting protrusions 404 are guided into the third grooves a93. As a result, the OIS frame 400 transitions from a state of being movable within a plane perpendicular to the optical axis with respect to the third rectilinear frame 130 or the shutter frame 335, to a state of being gradually restricted in the radial direction and the peripheral direction.

When the shunting protrusions 404 are then introduced into the second grooves a92, the second grooves a92 press the shunting protrusions 404 away from the inner peripheral face 130S of the third rectilinear frame 130. Consequently, movement of the OIS frame 400 is restricted in a plane perpendicular to the optical axis with respect to the third rectilinear frame 130 or the shutter frame 335. This centers the OIS frame 400.

When the shunting protrusions 404 are then introduced into the second grooves a92, the second grooves a92 press the shunting protrusions 404 away from the inner peripheral face 130S of the third rectilinear frame 130. Consequently, movement of the OIS frame 400 is restricted in a plane perpendicular to the optical axis with respect to the third rectilinear frame 130 or the shutter frame 335. This centers the OIS frame 400.

When the shunting protrusions 404 are guided by the third grooves a93 of the third rectilinear frame 130, the third rectilinear frame 130 is positioned away from the shunting grooves a9. The retraction of the retracting lens frame 401 begins in this state. Specifically, the driven portion 411 of the retracting lens frame 401 is guided by the guide groove a7 of the third rectilinear frame 130. The drive force received by the driven portion 411 of the retracting lens frame 401 from the guide groove a7 then acts in the direction of pressing on the shunting grooves a9. This reliably restricts looseness between the shunting protrusions 404 and the shunting grooves a9. That is, the OIS frame 400 is reliably centered.

The centering of the OIS frame 400 in this embodiment is carried out before the retracting lens frame 401 begins to retract, but what is important is that the centering be completed by the time the retraction operation is complete.

In a state in which the OIS frame 400 has been mounted to the shutter frame 335, the first linking portion 407 is disposed above the magnets 521 and the coil 522 (actuator) that are discussed below.

The second linking portion 408 is provided to increase the strength of the main body portion 405 and to block light to the imaging element side. That is, the second linking portion 408 is also used as a light blocking portion. The second linking portion 408 is formed integrally with the main body portion 405. More specifically, the second linking portion 408 is formed integrally with the main body portion 405, spanning to the first cut-out 405b, on the subject side of the main body portion 405.

The second linking portion 408 is provided at a position that is a specific distance away from the main body portion 405. Also, the second linking portion 408 is provided at a position that is a specific distance away from the first linking portion 407.

When the retracting lens frame 401 is in its retracted state (housed state), the third lens support 420 that supports the third lens group L3 is disposed in the cut-out 405b between the first linking portion 407 and the second linking portion 408.

The OIS frame 400 is movable in a plane perpendicular to the optical axis. More specifically, the magnets 521 are fixed to the OIS frame 400, and the coil 522 is fixed to the shutter frame 335 at a position opposite the magnets 521. In this state, when power is supplied from a camera circuit (not shown) to the coil 522 of the shutter frame 335, current flows to the coil 522 and a magnetic field is generated. This magnetic field drives the magnets 521 of the OIS frame 400, and this drive force causes the OIS frame 400 to move within a plane perpendicular to the optical axis.

As shown in FIG. 48A, the OIS frame 400 further has three rail portions 503. The three rail portions 503 (503a to 503c) are formed on the main body portion 405. The rail portions 503 are formed on one face of the substantially disk-shaped main body portion 405. The rail portions 503 are formed on the main body portion 405 at positions opposite a contact portion 603 formed on the retracting lens frame 401 (the first contact face 603A discussed below).

The rail portions 503 are formed on the portion of the main body portion 405 excluding the range where the third lens group L3 supported by the retracting lens frame 401 moves. Furthermore, the rail portions 503 are formed in a shape corresponding to the path over which the contact face 603 discussed below (the first contact face 603A) moves when the lens barrel 20 transitions from the imaging enabled state to the retracted state.

Figure 48B:
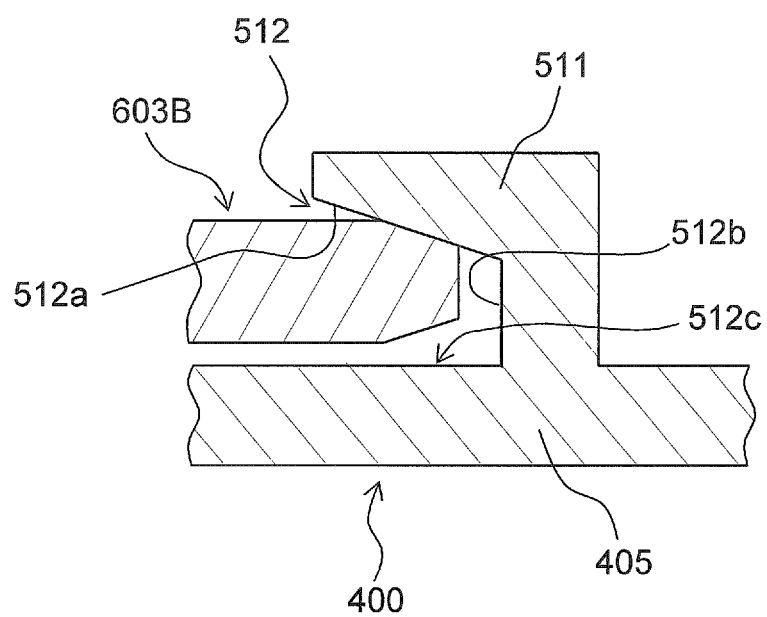
FIG. 48B is a detail cross section of the state when the retracting lens frame has been engaged with the anti-rotation portion of the OIS frame.

As shown in FIGS. 48A and 48B, the OIS frame 400 further has an anti-rotation portion 511. The anti-rotation portion 511 is used to position the retracting lens frame 401 in the imaging enabled state. The anti-rotation portion 511 is formed integrally with the outer peripheral part of the main body portion 405.

As shown in FIG. 48B, a recess 512 is formed in the anti-rotation portion 511. A second contact face 603B of the retracting lens frame 401 (discussed below) comes into contact with one of two side walls 512a of the recess 512. More specifically, the side walls 512a are formed at positions a specific distance away from the surface of the main body portion 405. These side walls 512a are sloped so that they move closer to the opposite side wall (the surface of the main body portion 405) as they move toward the bottom of the recess 512. This sloping pushes the second contact face 603B of the retracting lens frame 401 toward the OIS frame 400, and presses the second contact face 603B of the retracting lens frame 401 against the contact face 512c of the OIS frame 400.

As shown in FIG. 47A, the retracting lens frame 401 is supported by the OIS frame 400 so as to be movable around the retraction shaft 501b, which is substantially parallel to the optical axis. The retracting lens frame 401 supports the third lens group L3 used to image blur correction with the third lens support 420. The third lens group L3 is made up of one or more lenses.

The term "retraction shaft" as used below will sometimes be used in the sense of "the axis of the retraction shaft."

As shown in FIG. 47A, the retracting lens frame 401 has the main body portion 401a, the bearing 410, the driven portion 411, the positioning portion 412 (see FIGS. 50A and 52), the third lens support 420, and an engagement portion 413. The bearing 410 is formed integrally with the main body portion 401a.

Figure 49A:
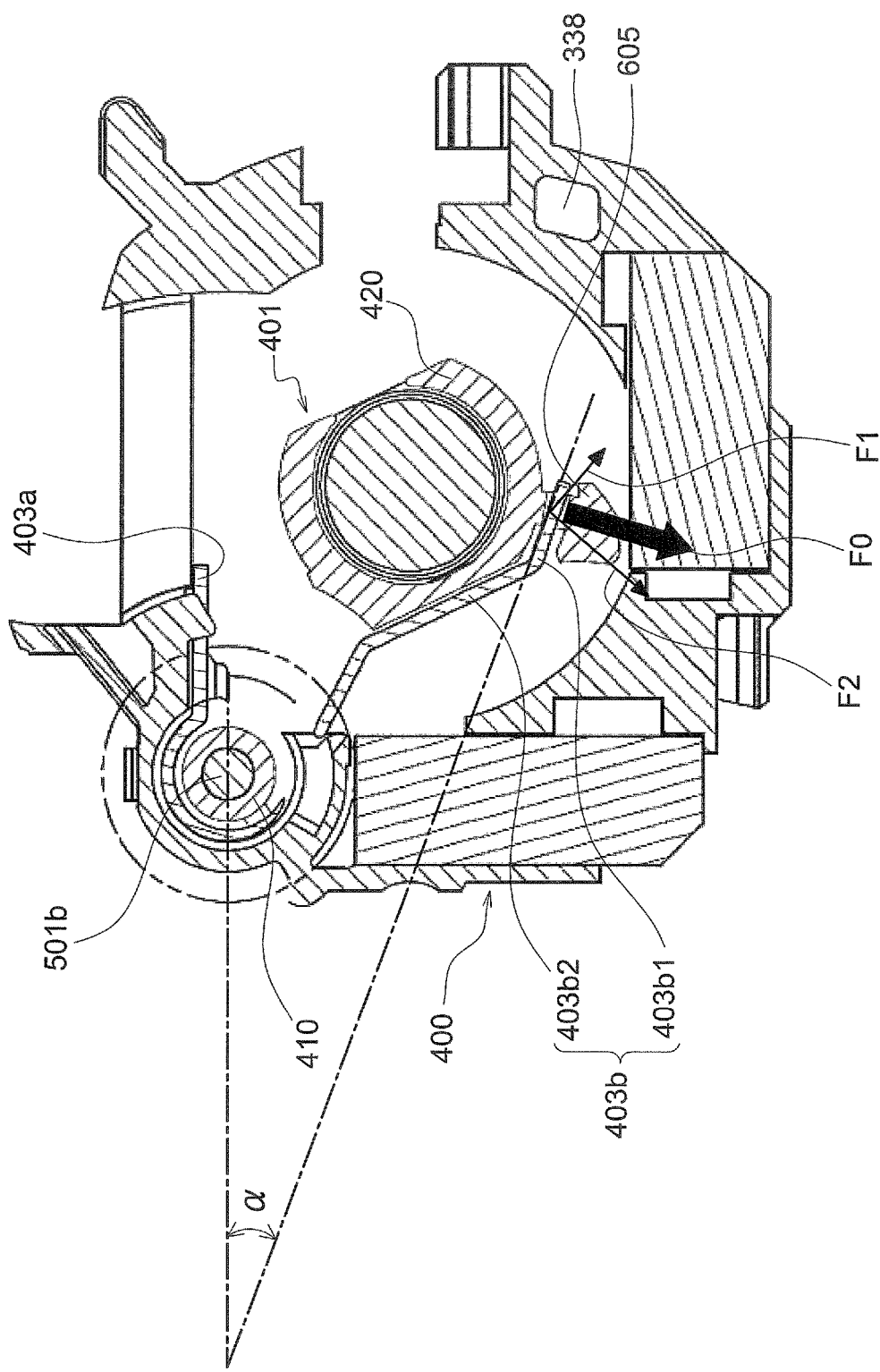
FIG. 49A is a cross section of the state when a rotary spring biases the retracting lens frame to the OIS frame.
Figure 49B:
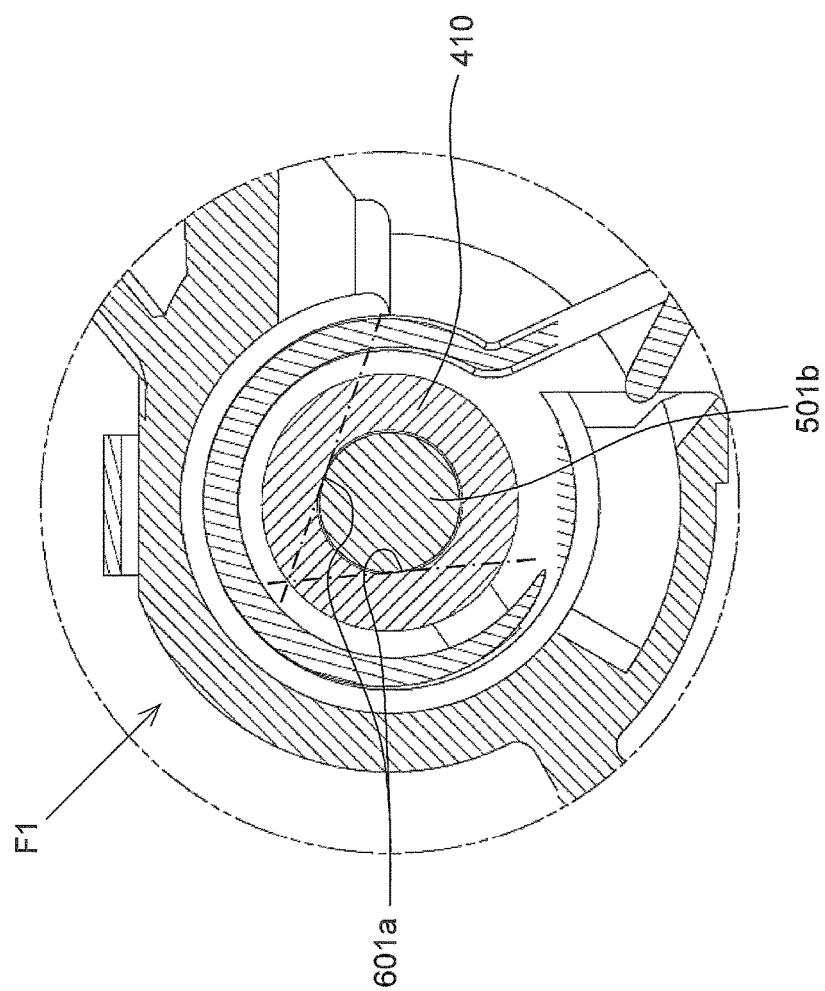
FIG. 49B is a detail cross section of the contact state between a retraction shaft and a contact face.

As shown in FIGS. 47A and 48A, the bearing 410 is rotatably mounted to the support shaft 501b (retraction shaft) provided to the OIS frame 400. As shown in FIGS. 49A and 49B, a hole into which the retraction shaft 501b is inserted is formed in the bearing 410. At least two contact faces 601a that come into contact with the retraction shaft 501b are formed in the hole of the bearing 410. In other words, the two contact faces 601a are formed in the inner peripheral face of the bearing 410.

The two contact faces 601a are formed on the proximal end side of the retraction shaft 501b, that is, on the inner peripheral face of the bearing 410 on the opening side of the bearing 410 (hole). The two contact faces 601a are formed on the inner peripheral face of the bearing 410 so as to be in a mutually non-parallel relation. More specifically, when the bearing 410 (hole) is viewed in the depth direction, the two contact faces 601a are formed on the inner peripheral face of the bearing 410 so as to form an angle.

As shown in FIG. 49B, the two contact faces 601a (hereinafter referred to as V-faces) come into contact with the outer peripheral face of the retraction shaft 501b. More specifically, the retracting lens frame 401 is biased by the biasing force F0 of the rotary spring 403 (see FIG. 49A), and the component force F1 of this biasing force F0 brings the V-faces 601a of the bearing 410 into contact with the outer peripheral face of the retraction shaft 501b.

As discussed below, in this embodiment, the other end 403b of the rotary spring 403 is bent. When the other end 403b of the rotary spring 403 is thus formed, the component force F1, that is, the force at which the contact faces 601a of the bearing 410 are brought into contact with the outer peripheral face of the retraction shaft 501b, is increased over that when the other end 403b of the rotary spring 403 is formed straight.

This allows the retraction shaft 501b to be reliably positioned with respect to the bearing 410 of the retracting lens frame 401. More precisely, accuracy with respect to eccentricity of the retraction shaft 501b can be increased. The component forces of the biasing force F0 in FIG. 49A are F1 and F2.

Figure 52:
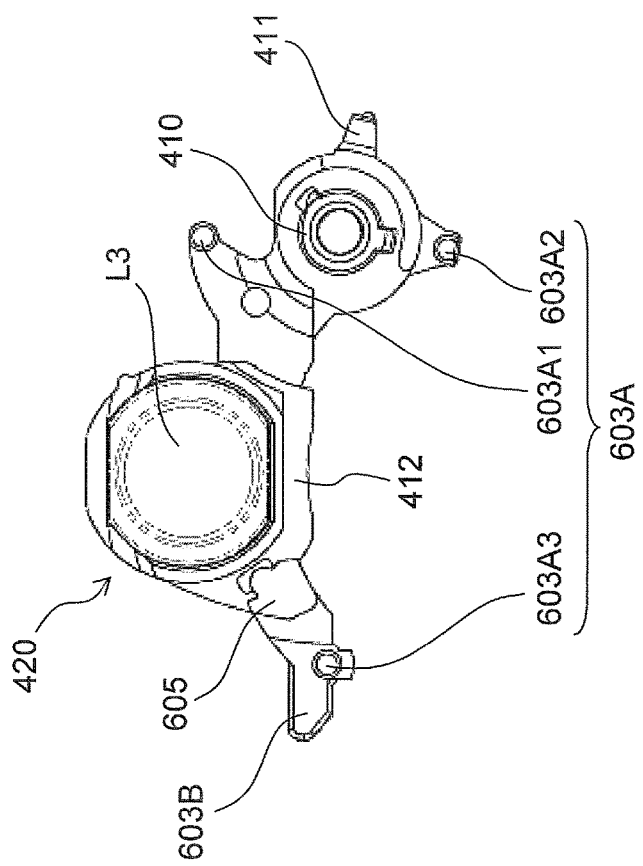
FIG. 52 is a diagram of the retracting lens frame as viewed from the imaging element side.

The driven portion 411 is the portion that is driven against the biasing force of the rotary spring 403 (discussed below) during the transition period between the imaging enabled state and the housed state. As shown in FIGS. 47A and 52, the driven portion 411 is formed integrally and protruding outward from the main body portion 401a. The driven portion 411 engages with the guide groove a7 formed in the inner peripheral face of the third rectilinear frame 130. More precisely, the driven portion 411 engages with the guide groove a7 of the third rectilinear frame 130 via an opening SK1 (discussed below) in the shutter frame 335. The driven portion 411 moves relatively in the optical axis direction with respect to the retracting lens frame 401, and is thereby guided in the guide groove a7 of the third rectilinear frame 130. This changes the orientation of the retracting lens frame 401 between the imaging enabled state and the retracted state.

The positioning portion 412 is formed on the portion (the third lens support 420) of the retracting lens frame 401 that supports the third lens group L3. The positioning portion 412 is positioned in the housing receptacle 322 of the second lens group frame 320 during the transition period between the imaging enabled state and the housed state.

The positioning portion 412 is formed so that the distance between the positioning portion 412 and the retraction shaft 501b becomes greater than the distance between the driven portion 411 and the retraction shaft 501b. More precisely, as shown in FIG. 47A, the positioning portion 412 is formed so that the distance LK1 between the axis of the retraction shaft 501b and the position where the positioning portion 412 comes into contact with the housing receptacle 322 becomes greater than the distance LK2 between the axis of the retraction shaft 501b and the proximal end of the driven portion 411.

Figure 50A:
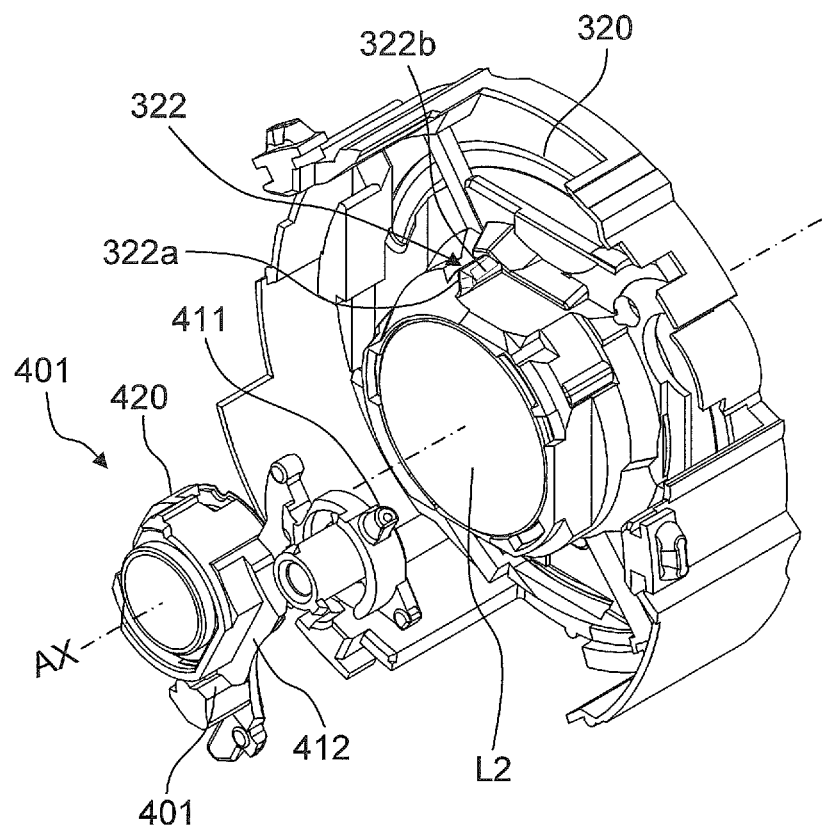
FIG. 50A is an oblique view of the relation between the second lens group frame and the retracting lens frame (imaging enabled state)
Figure 50B:
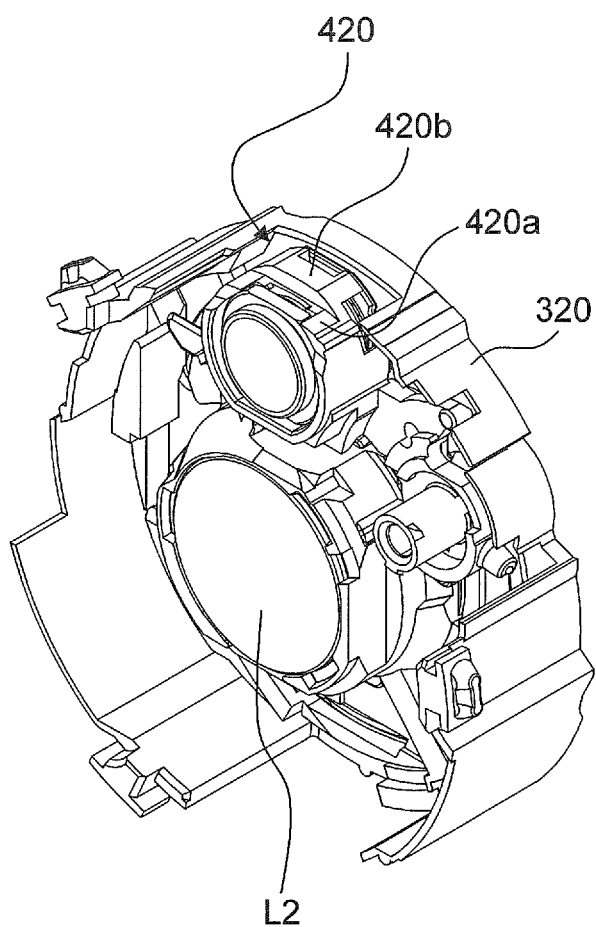
FIG. 50B is an oblique view of the relation between the second lens group frame and the retracting lens frame (retracted state)

As shown in FIGS. 47A, 50A, and 50B, the third lens support 420 is the portion that supports the third lens group L3. The third lens support 420 is in the form of a cylinder. The third lens group L3 is mounted on the inside of the third lens support 420.

As shown in FIG. 50B, the third lens support 420 has a second cut-out 420a. The second cut-out 420a is provided to the outer peripheral part of the third lens support 420. More specifically, the second cut-out 420a is a portion that is partially cut away from the outer peripheral part of the third lens support 420. More precisely, at the second cut-out 420a, the side of the outer peripheral part of the third lens support 420 that is away from the optical axis in the imaging enabled state when the retracting lens frame 401 is in the retracted state is cut away. The cut-out 420a is disposed opposite a light blocking portion 357 (see FIG. 47A) of the shutter frame 335 (discussed below) during the transition period between the imaging enabled state and the housed state.

Figure 51A:
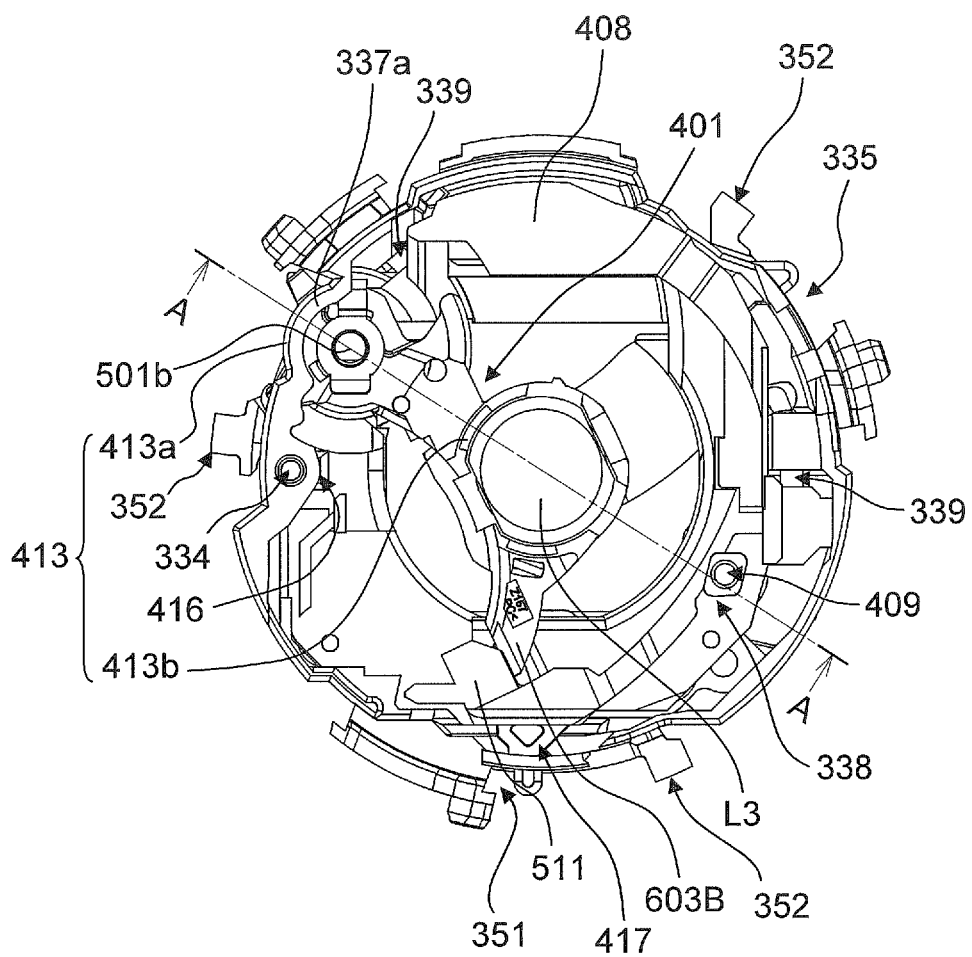
FIG. 51A is a diagram of the relation between the shutter frame and the retracting lens frame (imaging enabled state)
Figure 51B:
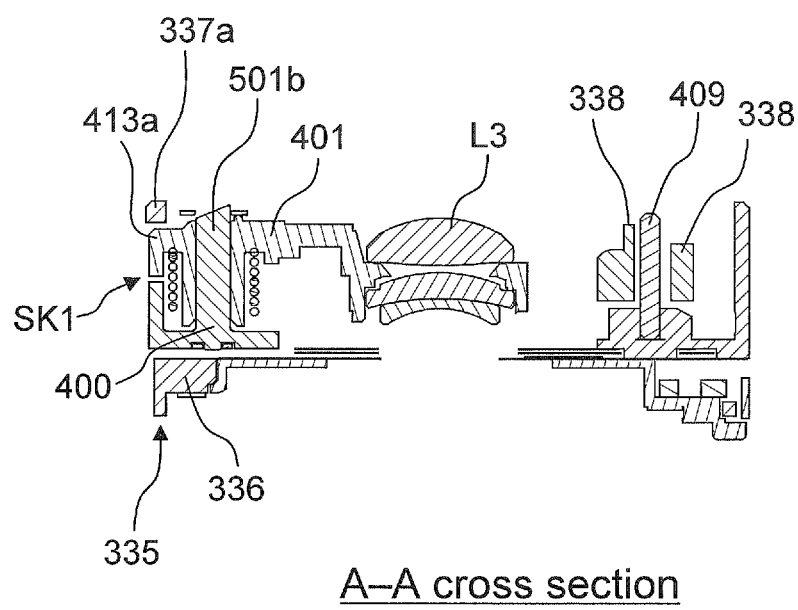
FIG. 51B is a cross section of the relation between the shutter frame and the retracting lens frame (imaging enabled state)
Figure 51C:
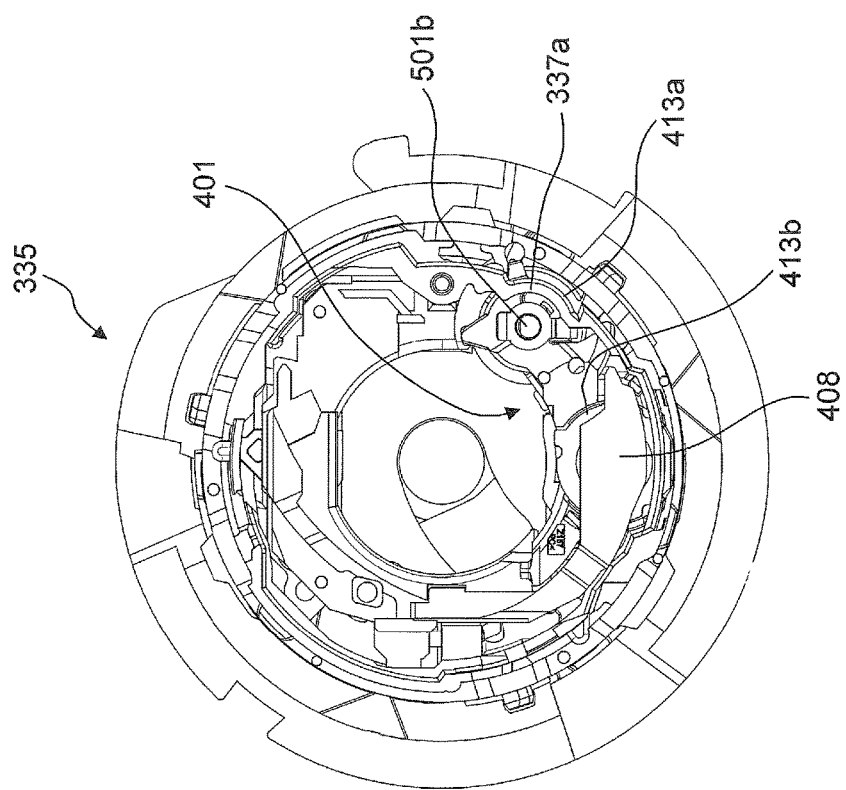
FIG. 51C is a diagram of the relation between the shutter frame and the retracting lens frame (retracted state)

As shown in FIGS. 47A and 51C, the third lens support 420 is disposed between the second linking portion 408 and the face on the front side in the optical axis direction of the shutter frame main body 336 of the shutter frame 335 during the transition period between the imaging enabled state and the housed state. Also, the third lens support 420 is disposed between the second linking portion 408 and the first linking portion 407 when it has entered the thinner part 350 of the face on the front side in the optical axis direction of the shutter frame main body 336. At least part of the shutter frame 335 overlaps at least part of the first linking portion 407 in the optical axis direction. This allows the lens barrel 20 to be smaller in the optical axis direction in its housed state.

As shown in FIGS. 51A to 51C, a first engagement portion 413a is a portion capable of engaging with a first restrictor 337a of the shutter frame 335 (discussed below). Also, a second engagement portion 413b is a portion capable of engaging with the second linking portion 408 of the OIS frame 400 (discussed below). The engagement portions here constitute the first engagement portion 413a that engages with the first restrictor 337a (discussed below), and the second engagement portion 413b that engages with the second linking portion 408, which acts as a restrictor during the transition period between the imaging enabled state and the housed state.

As shown in FIGS. 51A and 51B, the first engagement portion 413a is formed near the retraction shaft 501b. As shown in FIG. 51B, the first engagement portion 413a is disposed between the first restrictor 337a and the OIS frame 400. The second engagement portion 413b is formed on the third lens support 420 that supports the third lens group L3. The second engagement portion 413b is disposed opposite the second linking portion 408 formed on the OIS frame 400, during the transition period between the imaging enabled state and the housed state.

As shown in FIG. 52, the retracting lens frame 401 further has the plurality of contact portions 603 (603A and 603B). The contact portions 603 are formed integrally with the main body portion 401a of the retracting lens frame 401. The contact portions 603 are made up of three first contact portions 603A (603A1, 603A2, and 603A3) and a second contact portion 603B.

The three first contact portions 603A and the second contact portion 603B are formed integrally with the main body portion 401a at a different position from the bearing 410. In other words, the three first contact portions 603A and the second contact portion 603B are formed on the main body portion 401a at a different position from that of the retraction shaft 501b supported by the bearing 410. Also, the three first contact portions 603A and the second contact portion 603B are formed on the main body portion 401a at a different position from that of the retraction shaft 501b so as to be capable of contact with the OIS frame 400.

More precisely, the two contact portions 603A1 and 603A2 out of the three first contact portions 603A are formed on the main body portion 401a near the retraction shaft 501b. The two contact portions 603A1 and 603A2 are formed on the main body portion 401a so that the retraction shaft 501b is disposed between the two contact portions 603A1 and 603A2. The other first contact portion 603A3 besides these two contact portions 603A1 and 603A2, and the second contact portion 603B are formed on the main body portion 401a at a position that is away from the retraction shaft 501b.

The three first contact portions 603A (603A1, 603A2, and 603A3) are able to come into contact with the OIS frame 400. Specifically, movement of the retracting lens frame 401 in the optical axis direction is restricted when the three first contact portions 603A come into contact with the OIS frame 400.

More precisely, when the three first contact portions 603A come into contact with the rail portions 503 of the OIS frame 400 (see FIG. 48A), movement of the retracting lens frame 401 in the optical axis direction is restricted. More specifically, when the lens barrel 20 is in its imaging enabled state, the three first contact portions 603A1, 603A2, and 603A3 come into contact with the rail portions 503a, 503b, and 503c of the OIS frame 400. The first contact portion 603A1 comes into contact with the rail portion 503a, the first contact portion 603A2 comes into contact with the rail portion 503b, and the first contact portion 603A3 comes into contact with the rail portion 503c.

When the three first contact portions 603A thus come into contact with the rail portions 503 of the OIS frame 400, this restricts movement of the retracting lens frame 401 in the optical axis direction.

The second contact portion 603B shown in FIG. 52 is used to position the retracting lens frame 401 on the OIS frame 400. The second contact portion 603B comes into contact with the anti-rotation portion 511 of the OIS frame 400 in the imaging enabled state. The outer peripheral part of the second contact portion 603B is formed so as to be able to mate with the anti-rotation portion 511 of the OIS frame 400. For example, the outer peripheral part of the second contact portion 603B is formed in a tapered shape (see FIG. 48B). When the second contact portion 603B is fitted into the recess 512 of the anti-rotation portion 511 of the OIS frame 400, the retracting lens frame 401 is reliably positioned in the imaging enabled state.

As shown in FIG. 47A, the thrust spring 402 is a spring that biases the retracting lens frame 401 in the optical axis direction with respect to the OIS frame 400. The thrust spring 402 is formed in an approximate C shape. One end of the thrust spring 402 is mounted to the OIS frame 400, and the other end of the thrust spring 402 is mounted to the retracting lens frame 401. Consequently, the retracting lens frame 401 and the OIS frame 400 are clamped by the thrust spring 402 in the optical axis direction.

As shown in FIG. 47A, the rotary spring 403 is a spring that biases the retracting lens frame 401 around a retraction shaft 510, that is, in a direction perpendicular to the optical axis. The rotary spring 403 is supported by the OIS frame 400. The rotary spring 403 is a torsion coil spring, for example. The coil part of the rotary spring 403 is disposed on the outer periphery of the bearing 410.

One end 403a of the rotary spring 403 is clamped by latching portions 504a and 504b (see FIG. 48A) formed on the OIS frame 400. As shown in FIG. 49A, the other end 403b of the rotary spring 403 is mounted in a groove 605 formed in the retracting lens frame 401. The other end 403b of the rotary spring 403 is bent in two stages.

As shown in FIG. 49A, the other end 403b of the rotary spring 403 has a first bent part 403b1 formed on the distal end side, and a second bent part 403b2 formed in the middle. The first bent part 403b1 and the second bent part 403b2 are bent so as to conform to the outer shape of the third lens support 420 of the retracting lens frame 401. In this case, the first bent part 403*b*1 is mounted in the groove 605 formed in the retracting lens frame 401.

As shown in FIG. 49A, the first bent part 403*b*1 and the second bent part 403*b*2 are bent so that a specific angle α is formed by a specific straight line (horizontal line) passing through the axis of the retraction shaft 501*b*, and the first bent part 403*b*1 of the other end 403*b* of the rotary spring 403.

Thus forming the other end 403*b* of the rotary spring 403 increases the force (component force F1) at which the contact faces 601*a* of the bearing 410 come into contact with the outer peripheral face of the retraction shaft 501*b*, as discussed above. This allows the retraction shaft 501*b* to the reliably positioned with respect to the bearing 410 of the retracting lens frame 401.

Because the rotary spring 403 biases the retracting lens frame 401 as discussed above, the second contact portion 603B of the retracting lens frame 401 comes into contact with the anti-rotation portion 511 of the OIS frame 400 (see FIGS. 46A and 46B). The retracting lens frame 401 is positioned with respect to the OIS frame 400 when the retracting lens frame 401 is mounted to the retraction shaft 501*b* of the OIS frame 400, and the second contact portion 603B comes into contact with the anti-rotation portion 511 of the OIS frame 400.

As shown in FIGS. 50A and 50B, the position of the retracting lens frame 401 is changed from a correction enabled position in which the third lens group L3 executes image blur correction (first orientation), to a retracted position in which the third lens group L3 has been retracted from the optical axis (second orientation). The retracting lens frame 401 supports the third lens group L3, which is made up of at least one lens.

As shown in FIG. 50A, when the retracting lens frame 401 is in the correction enabled position, the center of the second lens group L2 and the center of the third lens group L3 are located on the optical axis AX.

When the retracting lens frame 401 begins to retract, the retracting lens frame 401 and the second lens support 321L of the second lens frame 320 move closer together while the retracting lens frame 401 rotates. This causes the positioning portion 412 of the retracting lens frame 401 to come into contact with the guide portion 322*a* of the second lens frame 320. The positioning portion 412 then moves over the guide portion 322*a* and reaches the support portion 322*b*, and is supported by the support portion 322*b*. Thus, the retracting lens frame 401 is thus supported by the second lens frame 320.

FIG. 50B shows this state. That is, as shown in FIG. 50B, when the retracting lens frame 401 is in the retracted position, the retracting lens frame 401 comes into contact with the support portion 322*b* of the second lens group frame 320, and is housed in the space of the second lens group frame 320, that is, in the space between the second lens support 321L and the outer peripheral face 320T (see FIG. 45A). More specifically, the retracting lens frame 401 is supported and housed in a state of being in contact with the support portion 322*b* of the second lens frame 320 within the space on the outside in the radial direction of the second lens group L2.

10. Configuration of Shutter Frame 335

The configuration of the shutter frame 335 will now be described through reference to FIGS. 46A, 47A, and 51A to 51C. As shown in FIG. 46A, the shutter frame 335 has the shutter frame main body 336, the three rectilinear protrusions A6, and the three cam protrusions B5. Also, as shown in FIG. 47A, the shutter frame 335 has the opening 356, the light blocking portion 357, and the first restrictor 337*a*.

The shutter frame main body 336 is formed in a cylindrical shape, and has an outer peripheral face 335T.

The three rectilinear protrusions A6 are formed on the outer peripheral face 335T, and are disposed at a substantially constant pitch in the peripheral direction. The three rectilinear protrusions A6 are engaged with the three rectilinear grooves a6 of the third rectilinear frame 130.

The three cam protrusions B5 are provided to the front end of the three rectilinear protrusions A6. The three cam protrusions B5 are engaged with the three cam grooves b5 of the second rotary frame 220.

The opening 356 is a portion that houses a part 420*b* of the third lens support 420 during the transition period between the imaging enabled state and the housed state. As shown in FIG. 47A, the part 420*b* of the third lens support 420 is the portion adjacent to the second cut-out 420*a* during the transition period between the imaging enabled state and the housed state. More precisely, the light blocking portion 357 is provided to the opening 356 in order to block light rays.

As shown in FIGS. 51A to 51C, the restrictor is a portion that is configured to restrict movement of the retracting lens frame 401 in the optical axis direction. The restrictor has a first restrictor 337*a* formed near the retraction shaft 501*b*, and a second linking portion 408 that acts as a second restrictor and is formed at a position that is away from the retraction shaft 501*b*.

The first restrictor 337*a* is formed integrally with the shutter frame main body 336 on the front side (the subject side) of the first engagement portion 413*a*. More specifically, the first restrictor 337*a* spans the space SK1 (see FIG. 51B) that houses the members near the retraction shaft 501*b*, on the front side (the subject side) of the first engagement portion 413*a*. The first restrictor 337*a* restricts movement of the retracting lens frame 401 in the optical axis direction near the retraction shaft 501*b*, in the imaging enabled state and the retracted state.

The second linking portion 408 is formed integrally with the OIS frame 400. More specifically, when the retracting lens frame 401 is in the retracted state, the second linking portion 408 spans to the front side (the subject side) of the space SK2 (see FIG. 47A) that houses the third lens group L3. The second linking portion 408 restricts movement of the retracting lens frame 401 in the optical axis direction near the third lens group L3 in the retracted state.

During normal operation, that is, when no strong force is acting on the retracting lens frame 401, such as during an imaging operation, or when the power is switched on or off, the retracting lens frame 401 is clamped to the OIS frame 400 by the thrust spring 402, which restricts its position in the optical axis direction. Therefore, the first restrictor 337*a* and the second linking portion 408 do not individually come into contact with the first engagement portion 413*a* and the second engagement portion 413*b*. However, if a strong force (such as when the camera is dropped) is exerted in the optical axis direction, the retracting lens frame 401 moves in the optical axis direction with respect to the OIS frame 400 against the force of the thrust spring 402.

When a strong force (such as when the camera is dropped) is exerted in the optical axis direction in the imaging state, the retracting lens frame 401 moves in the optical axis direction with respect to the OIS frame 400, and the first restrictor 337*a* comes into contact with the first engagement portion 413*a*. Accordingly, the thrust spring 402 always is operated in its elastic range. Here, the engagement of a contact portion 414 with the retraction shaft 501b contributes to keeping the thrust spring 402 in its elastic range.

When a strong force (such as when the camera is dropped) is exerted in the optical axis direction in the retracted state, the retracting lens frame 401 moves in the optical axis direction with respect to the OIS frame 400, and the first restrictor 337a and the second linking portion 408 come into contact with the first engagement portion 413a and the second engagement portion 413b. Consequently, the thrust spring 402 always is operated in its elastic range.

11. Engagement of Frames

Figure 53:
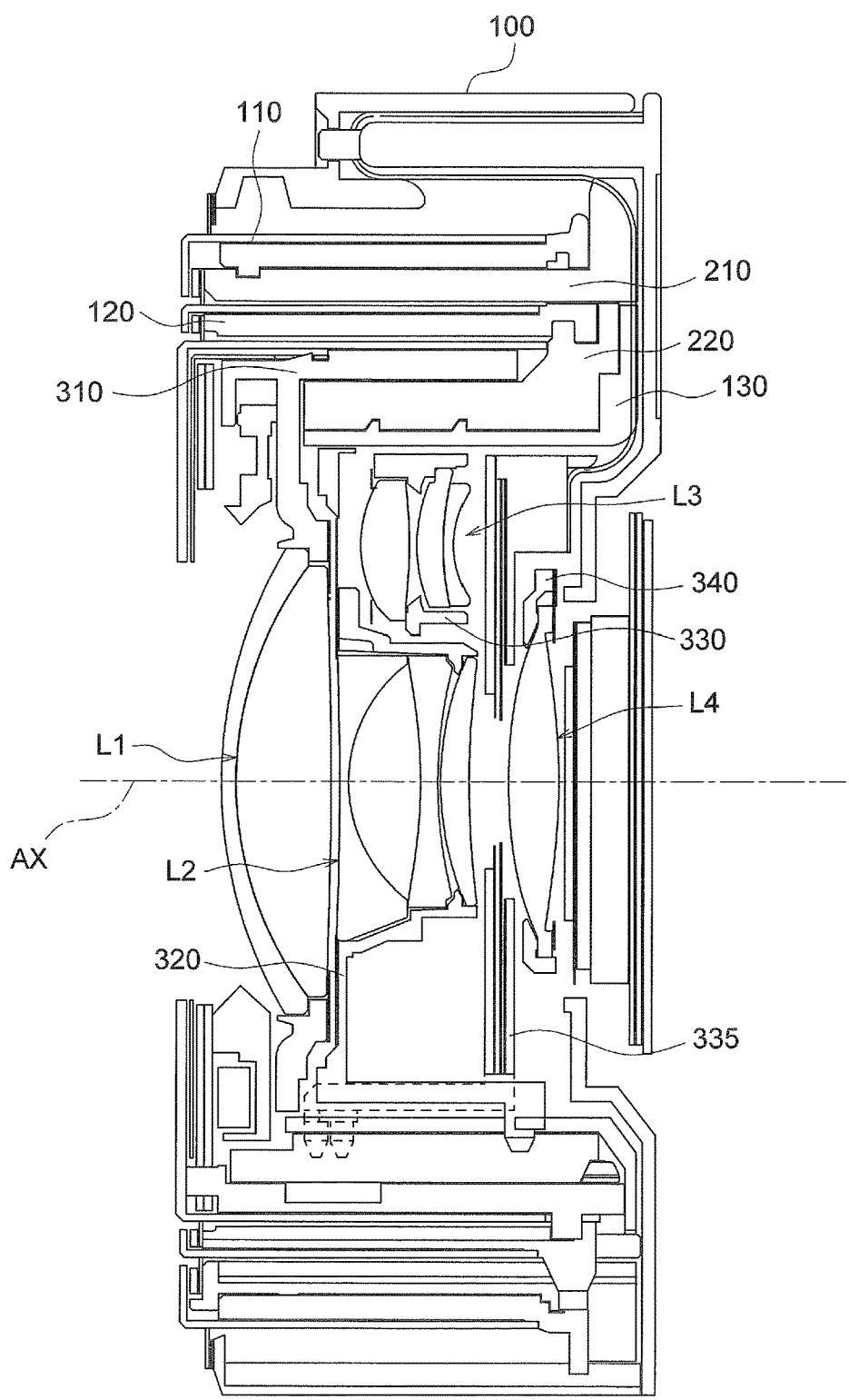
FIG. 53 is a simplified cross section of the lens barrel in its retracted state.
Figure 54:
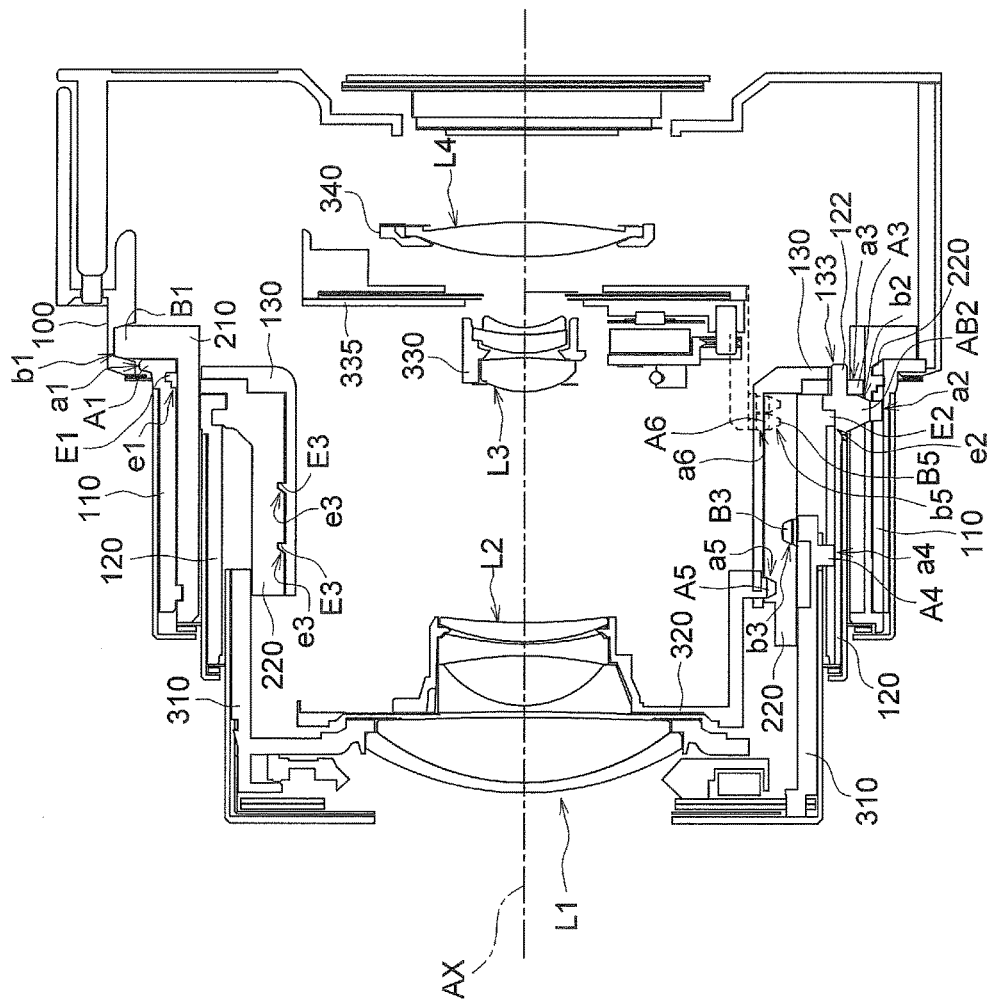
FIG. 54 is a simplified cross section of the lens barrel in its wide angle state.
Figure 55:
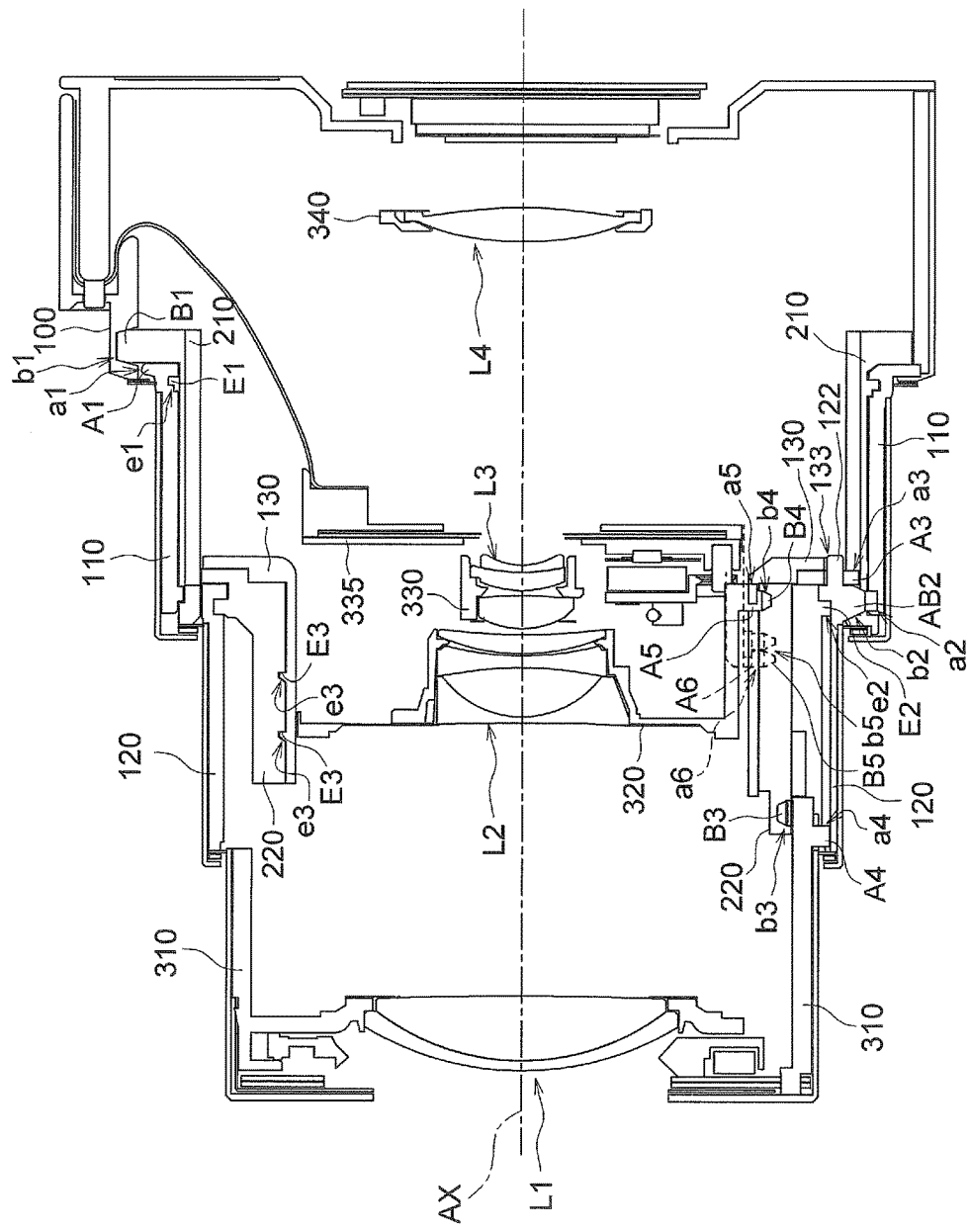
FIG. 55 is a simplified cross section of the lens barrel in its telephoto state.

FIGS. 53 to 55 are cross sections of the lens barrel 20. However, FIGS. 53 to 55 are schematics that combine a plurality of cross sections passing through the optical axis AX. The lens barrel 20 is shown in its retracted state in FIG. 53, in its wide angle state in FIG. 54, and in its telephoto state in FIG. 54. In this embodiment, the "imaging enabled state" of the digital camera 1 means a state from the wide angle state to the telephoto state of the lens barrel 20.

The gear portion 212 of the first rotary frame 210 meshes with the zoom gear 242 (not shown). The cam followers B1 of the first rotary frame 210 are engaged with the cam grooves b1 of the stationary frame 100. Therefore, the first rotary frame 210 is movable in the optical axis direction while rotating in the peripheral direction under the drive force of the zoom motor 241.

The rectilinear protrusions A1 of the first rectilinear frame 110 are engaged with the rectilinear grooves a1 of the stationary frame 100. The bayonet protrusions E1 of the first rotary frame 210 are engaged with the bayonet groove e1 of the first rectilinear frame 110. Therefore, the first rectilinear frame 110 is movable rectilinearly in the optical axis direction along with the first rotary frame 210.

The rectilinear cam followers AB2 of the second rectilinear frame 120 are inserted into the cam grooves b2 of the first rotary frame 210, and are engaged with the rectilinear grooves a2 of the first rectilinear frame 110. Therefore, the second rectilinear frame 120 is movable rectilinearly in the optical axis direction according to the rotation of the first rotary frame 210.

The rectilinear protrusions A3 of the second rotary frame 220 are engaged with the rectilinear grooves a3 of the first rotary frame 210. The bayonet protrusions E2 of the second rotary frame 220 are engaged with the bayonet groove e2 of the second rectilinear frame 120. Therefore, the second rotary frame 220 is movable in the optical axis direction along with the second rectilinear frame 120 while rotating in the peripheral direction along with the first rotary frame 210.

The latching portions 122 of the second rectilinear frame 120 are latched to the latching recesses 133 of the third rectilinear frame 130. The bayonet protrusions E3 of the third rectilinear frame 130 are engaged with the bayonet grooves e3 of the second rotary frame 220. The spacing of at least two of the three rectilinear protrusions A3 of the second rotary frame 220 is approximately 120° or more, the spacing of the two latching portions 122 of the second rectilinear frame 120 is approximately 120° or more, and the relative rotational angle between these during zoom drive is approximately 120° or less. Accordingly, the third rectilinear frame 130 is movable rectilinearly in the optical axis direction along with the second rectilinear frame 120 without interfering with the rotation of the second rotary frame 220.

One of the two latching portions 122 is formed longer in the peripheral direction than the other one, and correspondingly, one of the latching recesses 133 is formed longer in the peripheral direction than the other one, but the third rectilinear frame 130 is preferably made longer in the peripheral direction to the extent that it does not interfere with the rotation of the second rotary frame 220.

The spacing of at least two of the three rectilinear protrusions A3 of the second rotary frame 220 is approximately 150°, the spacing of the two latching portions 122 of the second rectilinear frame 120 is approximately 150°, and the relative rotational angle between these during zoom drive is approximately 150° or less. Therefore, the third rectilinear frame 130 does not interfere with the rotation of the second rotary frame 220. The same applies to the other angles.

The rectilinear protrusions A4 of the first lens group frame 310 are engaged with the rectilinear grooves a4 of the second rectilinear frame 120. Also, the cam protrusions B3 of the first lens group frame 310 are engaged with the cam grooves b3 of the second rotary frame 220. Therefore, the first lens group frame 310 is movable rectilinearly in the optical axis direction according to the rotation of the second rotary frame 220.

The rectilinear protrusions A5 of the second lens group frame 320 are engaged with the rectilinear grooves a5 of the third rectilinear frame 130. Also, the cam protrusions B4 of the second lens group frame 320 are engaged with the cam grooves b4 of the second rotary frame 220. Therefore, the second lens group frame 320 is movable rectilinearly in the optical axis direction according to the rotation of the second rotary frame 220.

The rectilinear protrusions A6 of the shutter frame 335 are engaged with the rectilinear grooves a6 of the third rectilinear frame 130. Also, the cam protrusions B5 of the shutter frame 335 are engaged with the cam grooves b5 of the second rotary frame 220. Therefore, the shutter frame 335 is movable rectilinearly in the optical axis direction according to the rotation of the second rotary frame 220.

The third lens group frame 330 is mounted to the shutter frame 335, and when the shutter frame 335 moves rectilinearly in the optical axis direction with respect to the third rectilinear frame 130, the retracting lens frame 401 of the third lens group frame 330 is rotated by a retraction mechanism (the guide groove a7 of the third rectilinear frame 130 and the driven portion 411 of the retracting lens frame 401). Consequently, in a transition from the retracted state to the imaging enabled state, the retracting lens frame 401 moves from its retracted position to a correction enabled position. Also, in a transition from the imaging enabled state to the retracted state, the retracting lens frame 401 moves from the correction enabled position to the retracted position. When the retracting lens frame 401 is disposed in the correction enabled position, the third lens group L3 is movable within a plane perpendicular to the optical axis. That is, image blur correction is possible in this state.

Thus, the rotation of the first rotary frame 210 and the second rotary frame 220 under the drive force of the zoom motor 241 results in rectilinear motion of the lens group frames 310, 320, and 335 and the first to third rectilinear frames 110 to 130.

Method for Assembling the Lens Barrel 20

The method for assembling the lens barrel 20 will now be described.

First, the third rectilinear frame 130 is inserted from the rear of the second rotary frame 220. The third rectilinear frame 130 is then rotated in the peripheral direction into the telephoto state.

Next, the second lens group frame 320 is inserted from the rear of the third rectilinear frame 130.

Next, the retracting lens frame 401 is inserted from the front of the OIS frame 400, and the retracting lens frame 401 is rotatably attached to the OIS frame 400.

Next, the OIS frame 400 is inserted from the front of the shutter frame 335.

Next, the shutter frame 335 is inserted from the rear of the third rectilinear frame 130. The second rotary frame 220 is then rotated in the peripheral direction into the retracted state.

Next, the second rotary frame 220 is inserted from the rear of the first lens group frame 310.

Next, the second rectilinear frame 120 is installed from the front of the first lens group frame 310.

Next, the first rotary frame 210 is inserted from the rear of the first rectilinear frame 110. The second rectilinear frame 120 is then inserted from the rear of the first rotary frame 210.

Next, the first rectilinear frame 110 is inserted from the rear of the stationary frame 100.

Finally, the first rotary frame 210 is rotated with respect to the stationary frame 100 into the retracted state.

Operation and Orientation of Retracting Lens Frame

The operation and orientation of the retracting lens frame 401 will now be described in detail.

When the lens barrel 20 transitions from the imaging enabled state to the retracted state, the retracting lens frame 401 is moved by a retraction mechanism (the guide groove a7 of the third rectilinear frame 130 and the driven portion 411 of the retracting lens frame 401) from the correction enabled position to the retracted position. Specifically, the retraction mechanism changes the orientation of the retracting lens frame 401 between an imaging enabled state and a retracted state. When the lens barrel 20 transitions from the retracted state to the imaging enabled state, the above operation is performed in reverse to change the orientation of the retracting lens frame 401 between the imaging enabled state and the retracted state.

The retraction mechanism will now be described in detail. The retracting lens frame 401 moves relatively in the optical axis direction with respect to the third rectilinear frame 130 from the imaging enabled state to the retracted state. In the course of this transition from the imaging enabled state to the retracted state, the driven portion 411 engages with the guide groove a7 and moves along the path of the guide groove a7. The guide groove a7 is a cam mechanism formed in the inner face of the third rectilinear frame 130. The driven portion 411 is a cam follower. As shown in FIG. 42A, a portion (sloped part) that is sloped with respect to the optical axis and a portion (parallel part) that is parallel to the optical axis are formed on the guide groove a7. When the driven portion 411 moves along this sloped part, the retracting lens frame 401 rotates around the retraction shaft 501b. The retracting lens frame 401 transitions between an image blur correction position and a retracted position by rotating around the retraction shaft 501b.

The retracting lens frame 401 integrally engages with the OIS frame 400 in the optical axis direction, and the OIS frame 400 integrally engages with the shutter frame 335 in the optical axis direction. Accordingly, the movement of the retracting lens frame 401 with respect to the third rectilinear frame 130 in the optical axis direction is the same as the movement of the shutter frame 335 with respect to the third rectilinear frame 130 in the optical axis direction. The rectilinear protrusions A6 of the shutter frame 335 are engaged with the rectilinear grooves a6 of the third rectilinear frame 130. Also, the cam protrusions B5 of the shutter frame 335 are engaged with the cam grooves b5 of the second rotary frame 220. Therefore, the shutter frame 335 is movable rectilinearly in the optical axis direction according to the rotation of the second rotary frame 220.

The OIS frame 400 supported by the shutter frame 335 is centered by the third rectilinear frame 130 before the retracting lens frame 401 begins to retract. For example, if there is a transition from the imaging enabled state to the housed state, when the shutter frame 335 moves rectilinearly in the optical axis direction, the shunting protrusions 404 of the OIS frame 400 supported by the shutter frame 335 are mated with the shunting grooves a9 of the third rectilinear frame 130 from the flange 132 side of the third rectilinear frame 130. When the shutter frame 335 then moves rectilinearly further in the optical axis direction, the shunting protrusions 404 are pressed by the shunting grooves a9, and the OIS frame 400 is restricted with respect to the shutter frame 335. Thus, the centering of the OIS frame 400 is executed before the retracting lens frame 401 begins its retraction operation.

When the retracting lens frame 401 supported by the shutter frame 335 moves from the image blur correction enabled position to the retracted position, the retracting lens frame 401 is rotated by a retraction mechanism consisting of the driven portion 411 of the retracting lens frame 401 and the guide groove a7 of the third rectilinear frame main body 131, on the inside of the third rectilinear frame main body 131. During this time, the retracting lens frame 401 and the second lens support 321L of the second lens frame 320 move closer together. The positioning portion 412 of the retracting lens frame 401 is then guided by the guide portion 322a of the second lens frame 320 and comes into contact with the support portion 322b (see FIG. 50A). Consequently, in a state of having come into contact with the support portion 322b of the second lens frame 320, the retracting lens frame 401 is housed in the space of the second lens frame 320, that is, in the space between the second lens support 321L and the outer peripheral face 320T. More specifically, the retracting lens frame 401 is supported and housed in a state of being in contact with the support portion 322b of the second lens frame 320 within the space on the outside in the radial direction of the second lens group L2.

At this point, the second linking portion 408 of the OIS frame 400 is housed in the first housing portion 323a of the second lens frame 320, and the retraction shaft 501b is housed in the second housing portion 323b of the second lens frame 320 (see FIGS. 45A to 45C).

Also, at this point, the first linking portion 407 of the OIS frame 400 is housed in the thinner part 350 of the face of the shutter frame main body 336 on the front side in the optical axis direction.

As shown in FIG. 50B, in this state, the second lens support 321L of the second lens frame 320 is housed in the space ST of the OIS frame 400 (see FIG. 47A).

Also, in this state, one end of the thrust spring 402 is mounted to the OIS frame 400, and the other end of the thrust spring 402 is mounted to the retracting lens frame 401. Consequently, the retracting lens frame 401 and the OIS frame 400 are clamped and positioned in the optical axis direction by the thrust spring 402.

Also, in this state, the third lens support 420 of the retracting lens frame 401 is disposed between the first linking portion 407 and the second linking portion 408. Also, the first engagement portion 413a (first engagement portion) near the drive axis of the retracting lens frame 401 is disposed between the first restrictor 337a and the OIS frame 400. Consequently, as discussed above, movement of the retracting lens frame 401 in the optical axis direction is restricted in the event that a powerful force (such as when the camera is dropped) is exerted in the optical axis direction.

Also, in this state, the cut-out 420a formed in the third lens support 420 of the retracting lens frame 401 is disposed opposite the light blocking portion 357 of the shutter frame 335. Also, the opening 356 in the shutter frame 335 houses the part 420b of the third lens support 420.

Meanwhile, when the lens barrel is in the imaging enabled state, the bearing 410 of the retracting lens frame 401 is mated with the retraction shaft 501b of the OIS frame 400, and the contact portion 414 of the retracting lens frame 401 comes into contact with the anti-rotation portion 511 of the OIS frame 400, which positions the retracting lens frame 401 with respect to the OIS frame 400 (see FIG. 46A).

Also, in this state, one end of the thrust spring 402 is mounted to the OIS frame 400, and the other end of the thrust spring 402 is mounted to the retracting lens frame 401. Consequently, the retracting lens frame 401 and the OIS frame 400 are clamped and positioned by the thrust spring 402 in the optical axis direction.

Also, in this state, image blur correction on the OIS frame 400 can be accomplished by using the third lens group L3 of the retracting lens frame 401.

Also, in this state, the first engagement portion 413a (first engagement portion) near the drive axis of the retracting lens frame 401 is disposed between the first restrictor 337a and the OIS frame 400. Consequently, as discussed above, movement of the retracting lens frame 401 in the optical axis direction is restricted in the event that a powerful force (such as when the camera is dropped) is exerted in the optical axis direction.

Action and Effect (1) This lens barrel 20 comprises the shutter frame 335, the OIS frame 400, and the retracting lens frame 401. The OIS frame 400 is supported by the shutter frame 335, and is movable within a plane that is perpendicular to the optical axis with respect to the shutter frame 335. The retracting lens frame 401 is supported by the OIS frame 400, and moves around the retraction shaft 501b, which is substantially parallel to the optical axis, during the transition period between the imaging enabled state and the housed state. The shutter frame 335 has the shutter frame main body 336 and the first restrictor 337a (an example of a first restrictor). The first restrictor 337a is provided a specific distance away from the shutter frame main body 336. The retracting lens frame 401 has the first engagement portion 413a that engages with the first restrictor 337a. Because the first engagement portion 413a is disposed between the shutter frame main body 336 and the first restrictor 337a, movement of the retracting lens frame 401 in the optical axis direction is restricted.

Thus, with this lens barrel 20, movement of the retracting lens frame 401 in the optical axis direction is restricted by the first restrictor 337a in the imaging enabled state. Accordingly, even if the lens barrel is subjected to an impact force, such as when the camera is dropped, movement of the retracting lens frame 401 in the optical axis direction is reliably restricted. Specifically, the retracting lens frame 401 is reliably supported with respect to the OIS frame 400. That is, the retracting lens frame 401 is operated stably.

(2) With this lens barrel 20, the first restrictor 337a is formed near the retraction shaft 501b. The OIS frame 400 has the second linking portion 408, which is formed away from the retraction shaft 501b. The retracting lens frame 401 further has a second engagement portion 337b that engages with the second linking portion 408 during the transition period between the imaging enabled state and the housed state.

Thus, with this lens barrel 20, movement of the retracting lens frame 401 in the optical axis direction is restricted by the first restrictor 337a in the imaging enabled state. Also, in the housed state, movement of the retracting lens frame 401 in the optical axis direction is restricted by the first restrictor 337a and the second linking portion 408. Accordingly, even if the lens barrel is subjected to an impact force, such as when the camera is dropped, movement of the retracting lens frame 401 in the optical axis direction is reliably restricted by the above-mentioned configuration. Specifically, the retracting lens frame 401 is more reliably supported with respect to the OIS frame 400. That is, the retracting lens frame 401 is operated more stably.

Other Embodiments (A) In the above embodiment, the lens barrel 20 had a three-stage telescoping design made up of the first rectilinear frame 110, the second rectilinear frame 120, and the first lens group frame 310, but this is not the only option. The lens barrel 20 may instead have a two-stage telescoping design made up of the first rectilinear frame 110 and the second rectilinear frame 120. In this case, the lens barrel 20 need not comprise the second rotary frame 220 or the third rectilinear frame 130. The lens barrel 20 may also have a four-stage or higher telescoping design.

(B) In the above embodiment, the cam grooves b were formed on one of two frames, and the cam protrusions B were formed on the other frame, but this is not the only option. The frames on which the cam protrusions B and the cam grooves b are formed may be switched around. Also, the cam grooves b and the cam protrusions B may both be formed in each of the two frames.

(C) In the above embodiment, the rectilinear grooves a were formed in one of two frames, and the rectilinear protrusions A were formed in the other frame, but this is not the only option. The frames on which the rectilinear protrusions A and the rectilinear grooves a are formed may be switched around. Also, the rectilinear grooves a and the rectilinear protrusions A may both be formed in each of the two frames.

(D) In the above embodiment, the bayonet grooves e were formed in one of two frames, and the bayonet protrusions E were formed in the other frame, but this is not the only option. The frames on which the bayonet protrusions E and the bayonet grooves e are formed may be switched around. Also, the bayonet grooves e and the bayonet protrusions E may both be formed in each of the two frames.

(E) In the above embodiment, the third lens group frame 330 was retracted toward the second lens group frame 320 in the retracted state, but this is not the only option. The third lens group frame 330 may be disposed to the rear of the second lens group frame 320 in the retracted state.

Figure 56A:
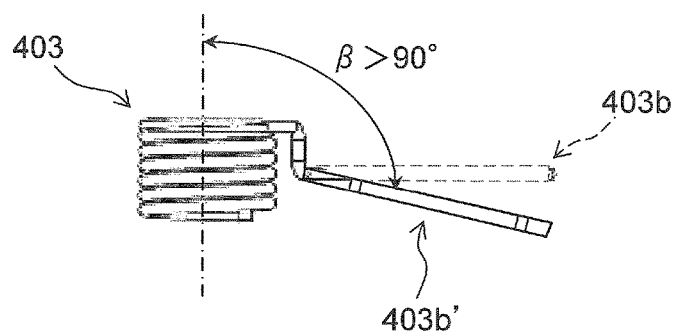
FIG. 56A is a side view of the rotary spring pertaining to another embodiment.

(F) In the above embodiment, as shown by the broken line in FIG. 56A, the other end 403b of the rotary spring 403 is formed so as to extend away from the axis KJ of the coil part at a position of 90 degrees with reference to the axis KJ of the coil part of the rotary spring 403 (the axis of the coil part, the axis of the retraction shaft 501b). Instead, as shown by the solid line in FIG. 56A, the other end 403b' of the rotary spring 403 may be formed so as to extend away from the axis KJ of the coil part at a position of greater than 90 degrees with reference to the axis KJ of the coil part.

Figure 56B:
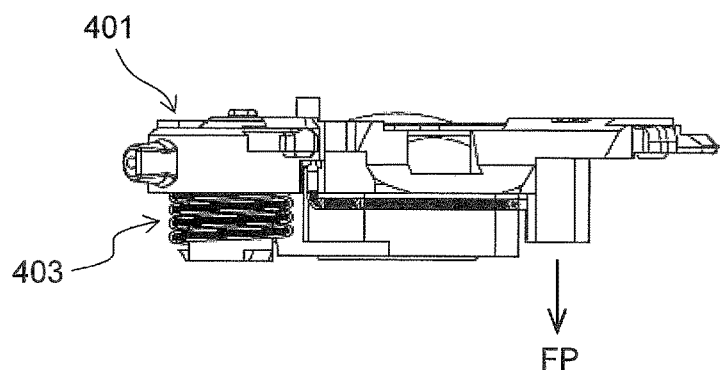
FIG. 56B is a side view of the state when the rotary spring pertaining to another embodiment has been mounted to the retracting lens frame.

In this case, just as in the above embodiment, if the rotary spring 403 is mounted to the OIS frame 400 and the retracting lens frame 401, the force FP at which the retracting lens frame 401 is pressed against the OIS frame 400 is generated, as shown in FIG. 56B. This allows the three first contact portions 603A (603A1, 603A2, and 603A3) of the retracting lens frame 401 to be reliably brought into contact by the OIS frame 400.

(G) In the above embodiment, an example was given in which, when the second rotary frame 220 (third frame body) rotated, the shutter frame 335 and the OIS frame 400 (second frame body) moved in the optical axis direction with respect to the third rectilinear frame 130 (first frame body) via the third rectilinear frame 130 (first frame body).

Instead, the first and second frame bodies may be configured to be capable of relative rotation, and the second and third frame bodies may be configured to be incapable of relative rotation. In this case, the through-groove of the first frame body extends in the optical axis direction and the peripheral direction.

With this configuration, when the first frame body rotates, the second frame body (such as the shutter frame 335 and/or the OIS frame 400) and the retracting lens frame moves in the direction of the guide grove of the third frame body, such as the optical axis direction. Also, at this point the retracting lens frame 401 moves in a direction perpendicular to the optical axis, with respect to the second frame body.

Thus, even when the lens barrel 20 is configured so that the second frame body, such as the shutter frame 335 and/or the OIS frame 400, moves in the optical axis direction with respect to the third frame body, the driven portion 411 and the guide groove a7 are provided, and the retracting lens frame 401 is operated, just as in the above embodiment. This gives the same effect as above.

Figure 57:
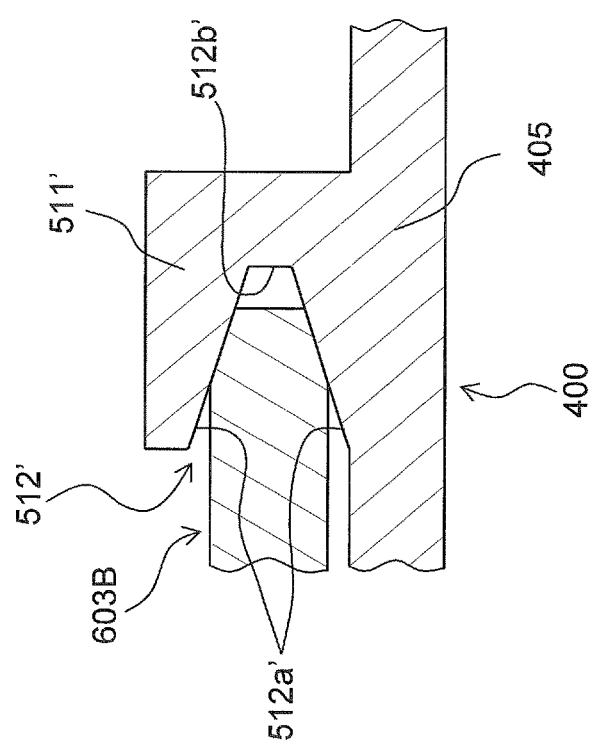
FIG. 57 is a detail cross section of the state when the retracting lens frame is engaged with the anti-rotation portion of the OIS frame in another embodiment.

(H) In the above embodiment, an example was given in which the anti-rotation portion 511 of the OIS frame 400 was formed in a concave shape, and the upper face of the second contact portion 603B of the retracting lens frame 401 came into contact with the recess 512. Instead, as shown in FIG. 57, the second contact portion 603B of the retracting lens frame 401 may come into contact with two side faces 512a' of a recess 512' of an anti-rotation portion 511'. In this case, the two side faces 512a' of the recess 512' are inclined and opposite each other. More specifically, the two side faces 512a' of the recess 512' are formed so as to move closer together toward the bottom 512b' of the recess 512'. Consequently, the retracting lens frame 401 is be more reliably positioned with respect to the OIS frame 400.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel. Accordingly, these terms, as utilized to describe the present technology should be interpreted relative to the lens barrel.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

INDUSTRIAL APPLICABILITY

The technology disclosed herein can be widely applied to lens barrels.

What is claimed is:
1. A lens barrel, comprising:
a first frame body including a groove formed along a direction substantially parallel to an optical axis on an inner circumferential surface;
a second frame body configured to be engaged by the first frame body;
a support frame configured to be supported by the second frame body and move with respect to the second frame body within a first plane for image blur correction in an imaging enabled state, the first plane being perpendicular to an optical axis, the support frame having a protrusion protruding outwardly in a radial direction; and
a retracting lens frame configured to be supported by the support frame and move around a retraction shaft during a transition period between an imaging enabled state and a housed state, the retraction shaft being substantially parallel to the optical axis,
the second frame body, the support frame, and the retracting lens frame are configured to move in the optical axis direction with respect to the first frame body during the transition period between the imaging enabled state and the housed state, and
the protrusion comes into contact with the groove and restricts a movable range of the support frame in the first plane so that the movable range of the support frame in the transition period is narrower than the movable range in the imaging enabled state, and the protrusion engages the groove to restrict a movement of the support frame within a second plane that is parallel to the first plane, during the transition period between the imaging enabled state and the housed state, the first plane is a plane in the imaging enabled state, the second plane is a plane in the transition period between the imaging enabled state and the housed state, the first plane and the second plane are located at a distance from each other or include a single plane located at a distance away from the first frame body in the optical direction, the groove includes a first groove having a first width and a second groove having a second width which is smaller than the first width in a circumferential direction, and the protrusion comes into contact with the first groove to make the movable range of the support frame to be narrower, and the protrusion comes into engagement with the second groove to restrict the movable range of the support frame, during the transition period between the imaging enabled state and the housed state.

2. The lens barrel according to claim 1, the groove further includes a third groove having a width that is larger than the first width in the circumferential direction, the movable range within the first plane for image blur correction in a range of the support frame is restricted to a range in which the protrusion comes into contact with the third groove in the imaging enabled state.

3. A lens barrel, comprising:

a first frame body including a groove formed along a direction substantially parallel to an optical axis on an inner circumferential surface;

a second frame body configured to be engaged by the first frame body;

a support frame configured to be supported by the second frame body and move with respect to the second frame body within a first plane for image blur correction in an imaging enabled state, the first plane being perpendicular to an optical axis, the support frame having a protrusion protruding outwardly in a radial direction; and a retracting lens frame configured to be supported by the support frame and move around a retraction shaft during a transition period between an imaging enabled state and a housed state, the retraction shaft being substantially parallel to the optical axis, the second frame body, the support frame, and the retracting lens frame are configured to move in the optical axis direction with respect to the first frame body during the transition period between the imaging enabled state and the housed state, the protrusion comes into contact with the groove and restricts a movable range of the support frame in the first plane so that the movable range of the support frame in the transition period is narrower than the movable range in the imaging enabled state, and the protrusion engages the groove to restrict a movement of the support frame within a second plane that is parallel to the first plane, during the transition period between the imaging enabled state and the housed state, the first plane is a plane in the imaging enabled state, the second plane is a plane in the transition period between the imaging enabled state and the housed state, and the first plane and the second plane are located at a distance from each other or include a single plane located at a distance away from the first frame body in the optical direction, and wherein the groove includes a first groove having a first depth and a second groove having a second depth which is smaller than the first depth in a radial direction, and the protrusion comes into contact with the first groove to make the movable range of the support frame to be narrower, and the protrusion comes into engagement with the second groove to restrict the movable range of the support frame, during the transition period between the imaging enabled state and the housed state.

4. The lens barrel according to claim 3, the groove further includes a fourth groove having a depth that is larger than the first depth in the radial direction, the movable range within the first plane for image blur correction in a range of the support frame is restricted to a range in which the protrusion comes into contact with the fourth groove in the imaging enabled state.

* * * * *